United States Patent
Cheon et al.

(10) Patent No.: US 9,836,266 B2
(45) Date of Patent: Dec. 5, 2017

(54) DISPLAY APPARATUS AND METHOD OF CONTROLLING DISPLAY APPARATUS

(71) Applicant: Samsung Electronics Co., Ltd., Suwon-si, Gyeonggi-do (KR)

(72) Inventors: Ka-won Cheon, Seoul (KR); Choon-kyoung Moon, Yongin-si (KR); Hyun-jin Kim, Seoul (KR); Min-kyoung Yoon, Seoul (KR); Seong-hoon Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/365,253

(22) Filed: Nov. 30, 2016

(65) Prior Publication Data

US 2017/0083271 A1    Mar. 23, 2017

Related U.S. Application Data

(63) Continuation of application No. 14/495,106, filed on Sep. 24, 2014, now Pat. No. 9,536,493.

(30) Foreign Application Priority Data

Sep. 25, 2013  (KR) .................. 10-2013-0113698
Jul. 30, 2014  (KR) .................. 10-2014-0097416

(51) Int. Cl.
*G06F 3/14*        (2006.01)
*G09G 5/00*        (2006.01)
*G09G 3/00*        (2006.01)
*G09G 5/14*        (2006.01)
*G06F 3/0481*      (2013.01)
*G06F 3/0482*      (2013.01)
*G06F 3/0488*      (2013.01)

(52) U.S. Cl.
CPC .......... *G06F 3/1423* (2013.01); *G06F 3/0482* (2013.01); *G06F 3/04817* (2013.01); *G06F 3/04883* (2013.01); *G09G 3/002* (2013.01); *G09G 5/003* (2013.01); *G09G 5/14* (2013.01); *G09G 2330/022* (2013.01); *G09G 2354/00* (2013.01)

(58) Field of Classification Search
CPC ............... G06F 3/04817; G06F 3/0482; G06F 3/04883; G09G 3/002; G09G 5/003; G09G 5/14
See application file for complete search history.

(56) References Cited

U.S. PATENT DOCUMENTS 6,346,929 B1   2/2002   Fukushima et al.
7,881,901 B2   2/2011   Fein et al.
(Continued)

FOREIGN PATENT DOCUMENTS

JP   10-145661 A    5/1998
JP   2003-141573 A  5/2003
(Continued)

*Primary Examiner* — Kevin M Nguyen
(74) *Attorney, Agent, or Firm* — Jefferson IP Law, LLP

(57) ABSTRACT

A display apparatus and a method of controlling the display apparatus are provided. The method includes detecting a user when the display apparatus keeps a standby mode, in response to the detecting of the user, activating an area of a display unit to display at least one object, and in response to selection of one of the at least one object, controlling the display apparatus according to the selected object.

20 Claims, 62 Drawing Sheets

(56) References Cited

U.S. PATENT DOCUMENTS

| | | |
|---|---|---|
| 8,130,330 B2 | 3/2012 | Tan et al. |
| 2002/0063855 A1 | 5/2002 | Williams |
| 2008/0235749 A1 | 9/2008 | Jain et al. |
| 2011/0113445 A1 | 5/2011 | Lee |
| 2011/0138416 A1 | 6/2011 | Kang et al. |
| 2012/0011211 A1 | 1/2012 | Smith |
| 2012/0223885 A1 | 9/2012 | Perez |
| 2012/0262494 A1 | 10/2012 | Choi et al. |
| 2013/0076622 A1 | 3/2013 | Cheng et al. |

FOREIGN PATENT DOCUMENTS

| | | |
|---|---|---|
| JP | 2009-198698 A | 9/2009 |
| JP | 4548413 B | 9/2010 |
| JP | 2012-22720 A | 2/2012 |
| KR | 10-1001856 B1 | 12/2010 |
| KR | 10-2011-0130955 A | 12/2011 |
| KR | 10-2012-0006115 A | 1/2012 |
| KR | 10-2013-0010625 A | 1/2013 |

DISPLAY APPARATUS AND METHOD OF CONTROLLING DISPLAY APPARATUS

CROSS-REFERENCE TO RELATED APPLICATION(S)

This application is a continuation application of prior application Ser. No. 14/495,106, filed on Sep. 24, 2014, and claimed the benefit under 35 U.S.C. §119(a) of a Korean patent application filed on Sep. 25, 2013 in the Korean Intellectual Property Office and assigned Serial number 10-2013-0113698, and of a Korean patent application filed on Jul. 30, 2014, in the Korean Intellectual Property Office and assigned Serial number 10-2014-0097416, the entire disclosure of each of which is hereby incorporated by reference.

TECHNICAL FIELD

The present disclosure relates to providing a display apparatus and a method of controlling the display apparatus. More particularly, the present disclosure relates to providing a display apparatus that displays an object for controlling the display apparatus in an area of a display unit, and a method of controlling the display apparatus.

BACKGROUND

A display apparatus has recently provided various functions to a user. For example, the display apparatus has provided the user with various functions such as a general broadcasting content providing function, a content playing function provided by an external apparatus, a video on demand (VOD) providing function, a social network service (SNS) providing function, a web browsing function, and/or the like.

In particular, the display apparatus displays an object corresponding to various functions to provide various functions to the user. In addition, the user may select the object to perform a desired function.

However, according to the related art, the object corresponding to the various functions is displayed only if the display apparatus is turned on. In other words, when power is not applied to the display apparatus (or the display apparatus keeps a standby mode), the object is not displayed. Therefore, the display apparatus is turned on to perform a function of the display apparatus by using the object.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a display apparatus that, if a user is detected when the display apparatus keeps a standby mode, displays an object for controlling the display apparatus in an area of a display unit, and a method of controlling the display apparatus.

In accordance with an aspect of the present disclosure, a method of controlling a display apparatus is provided. The method includes detecting a user when the display apparatus is in a standby mode, in response to detecting the user, activating an area of a display unit to display at least one object, and in response to selection of one of the at least one object, controlling the display apparatus according to the selected object.

In accordance with another aspect of the present disclosure, the display apparatus may include a first display unit and a second display unit that displays an image outside the first display unit. When the user is detected, the second display unit may be activated to display the at least one object on the second display unit.

In accordance with another aspect of the present disclosure, the display apparatus may include a main controller and a sub controller that displays the at least one object. When the user is detected in the standby mode, the sub controller may be activated to display the at least one object on the second display unit.

In accordance with another aspect of the present disclosure, when one of the at least one object is selected, the main controller may be activated to control the first display unit in order to display an image related to the selected object.

In accordance with another aspect of the present disclosure, the method may further include when the display apparatus keeps an activated normal mode, and an external apparatus is connected to the display apparatus, displaying an object for controlling the connected external apparatus on the second display unit.

In accordance with another aspect of the present disclosure, the method may further include when the display apparatus stores reserved viewing information, and a reserved viewing time included in the stored reserved viewing information arrives, displaying an object showing reserved viewing on the second display unit.

In accordance with another aspect of the present disclosure, the second display unit may display an image outside the first display unit through a projector apparatus.

In accordance with another aspect of the present disclosure, the method may further include determining whether the detected user is a user registered in the display apparatus. The displaying of the at least one object may include acquiring user information of the detected user and displaying the at least one object based on the acquired user information.

In accordance with another aspect of the present disclosure, the user information may include at least one of preferred channel information, reserved viewing information, content use information using an external apparatus, recommendation content information, and social network service (SNS) information.

In accordance with another aspect of the present disclosure, the displaying of the at least one object may include determining whether a message corresponding to the detected user is stored and when the message corresponding to the detected user is stored, displaying an object corresponding to the message. When the object corresponding to the message is selected, the display apparatus may be controlled to play the message.

In accordance with an aspect of the present disclosure, a display apparatus is provided. The apparatus includes a sensor configured to detect a user, a display unit configured to display an image, an input unit configured to receive a user command, and a controller configured to, in response to detecting the user through the sensor when the display apparatus keeps a standby mode, control the display unit to activate an area of the display unit in order to display at least one object, and in response to selection of one of the at least one object through the input unit, control the display apparatus according to the selected object.

In accordance with another aspect of the present disclosure, the display unit may include a first display unit and a second display unit that displays an image outside the first display unit. When the user is detected through the sensor, the controller may control the second display unit to be activated in order to display the at least one object on the second display unit.

In accordance with another aspect of the present disclosure, the controller may include a main controller and a sub controller that displays the at least one object. When the user is detected in the standby mode, the sub controller may be activated and may control the second display unit to display the at least one object.

In accordance with another aspect of the present disclosure, when one of the at least one object is selected, the main controller may be activated and may control the first display unit to display an image related to the selected object.

In accordance with another aspect of the present disclosure, the display apparatus may further include a communicator configured to communicate with an external apparatus. When the display apparatus keeps the standby mode, and the external apparatus is connected to the display apparatus, the controller may control the second display unit to display an object for controlling the connected external apparatus.

In accordance with another aspect of the present disclosure, the display apparatus may further include a storage unit configured to store reserved viewing information. When a reserved viewing time included in the storage reserved viewing information arrives, the controller may control the second display unit to display an object showing reserved viewing.

In accordance with another aspect of the present disclosure, the second display unit may display an image outside the first display unit through a projector apparatus.

In accordance with another aspect of the present disclosure, the display apparatus may further include a storage unit configured to store user information. The controller may determine whether the detected user is a user registered in the display apparatus, acquire user information corresponding to the detected user through the storage unit, and control the second display unit to display the at least one object based on the acquired user information.

In accordance with another aspect of the present disclosure, the user information may include at least one of preferred channel information, reserved viewing information, content use information using an external apparatus, recommendation content information, and SNS information.

In accordance with another aspect of the present disclosure, the controller may determine whether a message corresponding to the detected user is stored in the storage unit, if the message corresponding to the detected user is stored in the storage unit, control the second display unit to display an object corresponding to the message, and if the object corresponding to the message is selected, control the first display unit to play the message.

In accordance with another aspect of the present disclosure, a method of controlling a display apparatus including a first display unit and a second display unit is provided. The method includes connecting communication with at least one mobile terminal, in response to connection of communication with the at least one mobile terminal, activating a second display unit and displaying on the second display unit a plurality of thumbnail images of a plurality of content stored in the at least one mobile terminal, and in response to selection of one of the thumbnail images of the plurality of content, activating a first display unit and displaying on the first display unit the selected thumbnail image.

In accordance with another aspect of the present disclosure, a display apparatus is provided. The display apparatus includes a communicator configured to perform communication with at least one mobile terminal, a first display unit configured to display an image, a second display unit disposed outside the first display unit configured to display an image, an input unit configured to receive a user command, and a controller configured to, in response to connection of the at least one mobile terminal while the display apparatus is in a standby mode, control the second display unit by activating the second display unit to display the thumbnail images of the plurality of content stored in the at least one mobile terminal, and in response to selection of one of the plurality of thumbnail images of the plurality of content, control the first display unit by activating the first display unit to display the selected thumbnail image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
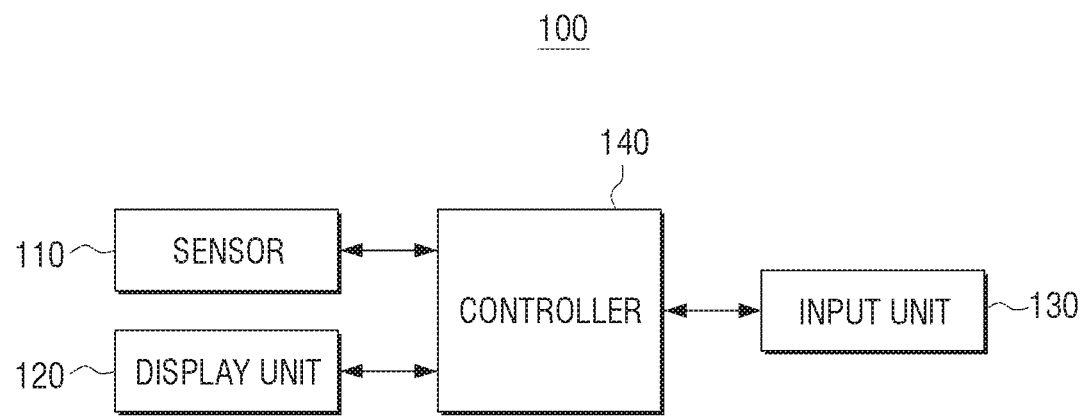
FIG. 1 is a schematic block diagram illustrating a structure of a display apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, the same drawing reference numerals are used for the same elements even in different drawings. The matters defined in the description, such as detailed construction and elements, are provided to assist in a comprehensive understanding of the various embodiments. Thus, it is apparent that the various embodiments can be carried out without those specifically defined matters. In addition, well-known functions or constructions are not described in detail because such a description would obscure the various embodiments with unnecessary detail.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, the display apparatus may be an electronic device.

Figure 2:
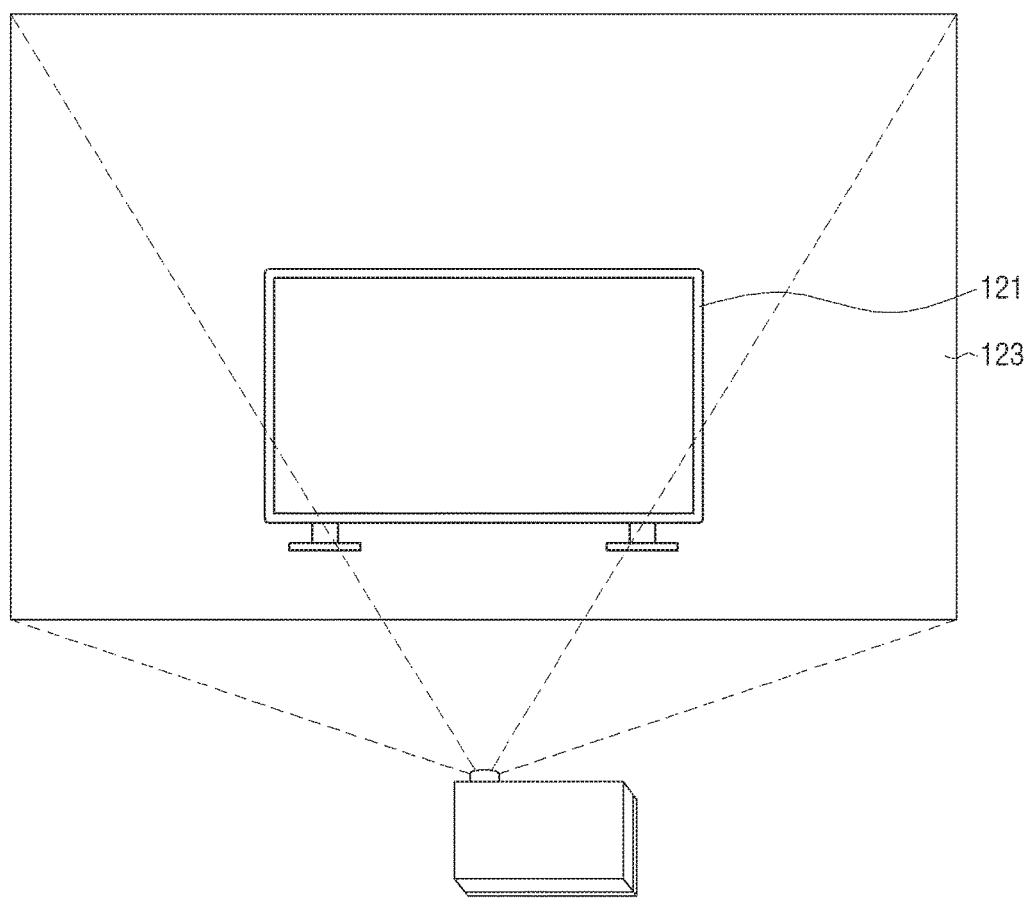
FIG. 2 is a view illustrating a display apparatus according to an embodiment of the present disclosure.

FIG. 1 is a schematic block diagram illustrating a structure of a display apparatus according to an embodiment of the present disclosure. FIG. 2 is a view illustrating a display apparatus according to an embodiment of the present disclosure.

Referring to FIG. 1, a display apparatus 100 includes a sensor 110, a display unit 120, an input unit 130, and a controller 140. The display apparatus 100 may be realized as a smart TV, but this is only an example. The display apparatus 100 may be realized as various types of apparatuses (e.g., electronic devices) such as a desktop personal computer (PC), a notebook PC, a monitor, and/or the like.

The sensor 110 detects whether a user approaches the display apparatus 100. In detail, the sensor 110 may capture a preset area around the display apparatus 100 by using a camera and, when the user goes into the captured preset area, detect whether the user approaches the display apparatus 100.

The display unit 120 outputs image data under control of the controller 140. In particular, if the user is detected by the sensor 110 when the display apparatus 100 keeps a standby mode, the display unit 120 may display at least one object in an area thereof under control of the controller 140. The at least one object may be a display item for controlling the display apparatus 100.

In particular, the display unit 120 may include a first display unit that displays a general image content and a second display unit that displays an image or an object outside the first display unit. For example, as illustrated in FIG. 2, a first display unit 121 may be realized as a liquid crystal display (LCD) that displays an image, and a second display unit 123 may be realized as a projector display that displays an image outside the LCD.

According to various embodiments of the present disclosure, if the user is detected by the sensor 110 when the display apparatus 100 keeps the standby mode (e.g., in response to detecting the user when the display apparatus 100 is in standby mode), then the second display unit 123 may display at least one object. If an object is selected (e.g., in response to selection of the object), then the first display unit 121 may display an image corresponding to the selected object.

The input unit 130 receives a user command for controlling the display apparatus 100. In particular, the input unit 130 may be realized as a hand motion detecting module that detects a hand motion of the user, but this is only example. The input unit 130 may be realized as various types of input devices such as a pointing device, a mouse, a remote controller, and/or the like.

The controller 140 controls an overall operation of the display apparatus 100 according to the user command input through the input unit 130. In particular, if the user is detected through the sensor 110 when the display apparatus 100 keeps the standby mode (e.g., in response to detecting the user when the display apparatus 100 is in standby mode), then the controller 140 may control the display unit 120 to activate an area of the display unit 120 in order to display at least one object.

In detail, if the user is detected through the sensor 110 when the display apparatus 100 keeps the standby mode (e.g., in response to detecting the user when the display apparatus 100 is in standby mode), then the controller 140 may control the display unit 120 to activate the second display unit 123 in order to display at least one object for controlling the display apparatus 100.

The controller 140 determines whether the detected user is a user registered in the display apparatus 100. In detail, the controller 140 may determine whether a detected user is a user registered in the display apparatus 100 by using a face recognition, an iris recognition, a fingerprint recognition, near field communication (NFC) tagging, and/or the like.

If the detected user is the user registered in the display apparatus 100 (e.g., in response to determining that the detected user is registered with the display apparatus 100), then the controller 140 may control the second display unit 123 to acquire user information corresponding to the detected user stored in the display apparatus 100 and display at least one object based on the acquired user information. The user information may be at least one of preferred channel information, reserved viewing information, content use information using an external apparatus, recommendation content information, and SNS information.

In other words, the display apparatus 100 may store reserved viewing information, content use information using an external apparatus, recommendation content information, and SNS information according to users, and the controller 140 may provide different objects to the detected user. For example, if there is a broadcasting program that is reserved by user A, then the controller 140 may control the second display unit 123 to display an object for viewing the broadcasting program reserved by the user A.

If one of the at least one objects displayed on the second display unit 123 is selected through the input unit 130 (e.g., in response to selection of one of the at least one objects), then the controller 140 may control the display unit 120 according to the selected object. For example, if an object corresponding to providing of a recommendation content is selected from the at least one object displayed on the second display unit 123 through the input unit 130 (e.g., in response to selection of the object corresponding to providing of a recommendation content), then the controller 140 may control the first display unit 121 to display a user interface (UI) that shows the recommendation content for the detected user.

The controller 140 may be realized as one chip, but this is only an example. The controller 140 may be realized as a chip of each of a main controller that controls an overall function of the display apparatus 100 and a sub controller that displays at least one object.

In detail, if the user is detected through the sensor 110 when the display apparatus 100 keeps the standby mode (e.g., in response to detecting the user when the display apparatus 100 is in the standby mode), then the sub controller may be activated and may control the second display unit 123 to display at least one object. If one of the at least one object is selected (e.g., in response to selection of one of the at least one object), then the sub controller may be inactivated, and the main controller may be activated. The main controller may control the first display unit 121 to display an image related the selected object.

As described above, the controller 140 may be classified into a sub controller and a main controller, and thus the display apparatus 100 may minimize power for displaying an object in the standby mode.

If an external apparatus is connected to the display apparatus 100 when the display apparatus 100 keeps an activated normal mode (e.g., in response to an external apparatus being connected to the display apparatus 100 when the display apparatus 100 is in an activated normal mode), then the controller 140 may control the second display unit 123 to display an object for controlling the external apparatus. If the object for controlling the external apparatus is selected through the input unit 130 (e.g., in response to selection of the object for controlling the external apparatus), then the controller 140 may control the first display unit 121 to display a UI for controlling the external apparatus.

If the display apparatus 100 stores reserved viewing information about a particular broadcasting program, and a reserved viewing time included in the stored reserved viewing information arrives, then the controller 140 may control the second display unit 123 to display an object that shows reserved viewing. For example, at a reserved viewing time (e.g., a broadcast time associated with the particular broadcasting program associated with the corresponding reserved viewing information), the controller 140 may control the second display unit 123 to display an object that shows the reserved viewing associated with reserved viewing information that includes the reserved viewing time. If the object that shows the reserved viewing is selected through the input unit 130 (e.g., in response to selection of the object that shows the reserved viewing), then the controller 140 may control the first display unit 121 to select and display a reserved broadcasting program.

If a message corresponding to the user detected through the sensor 110 is stored in the display apparatus 100, then the controller 140 may control the second display unit 123 to display an object corresponding to the message. If the object corresponding to the message is selected through the input unit 130 (e.g., in response to selection of the object corresponding to the message), then the controller 140 may control the first display unit 121 to play the message.

Through the display apparatus 100 described above, the user may easily and conveniently perform a function of the display apparatus 100 by using an object displayed in an area of a display unit even when the display apparatus 100 keeps the standby mode.

The display apparatus 100 will now be described in more detail with reference to FIGS. 3 through 8.

Figure 3:
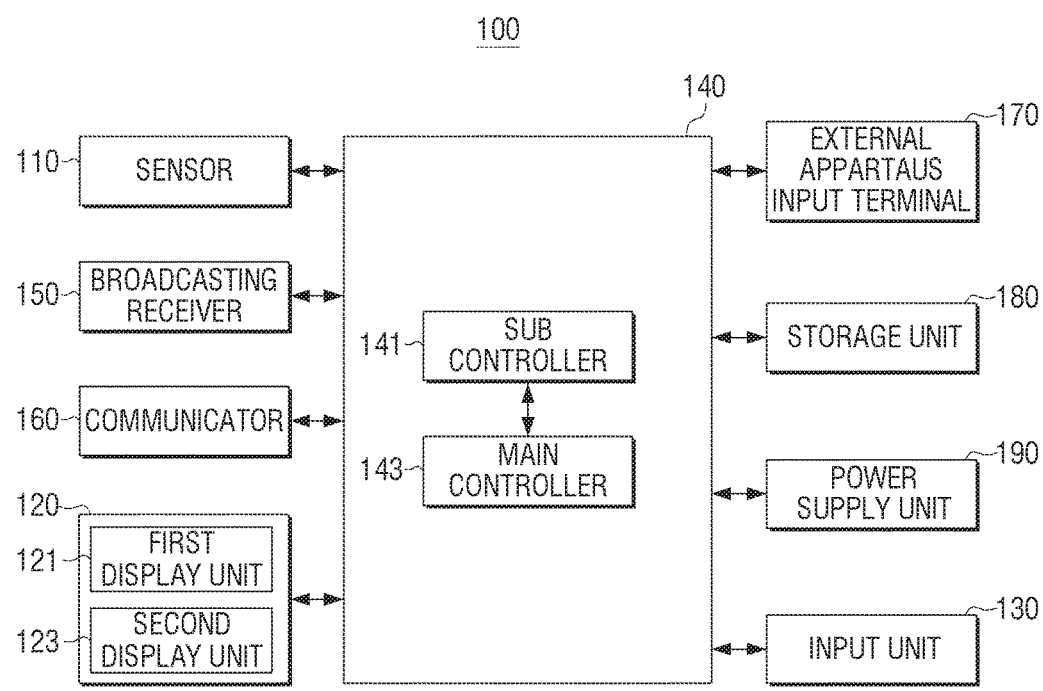
FIG. 3 is a block diagram illustrating a detailed structure of a display apparatus according to an embodiment of the present disclosure.

FIG. 3 is a block diagram illustrating a detailed structure of the display apparatus according to an embodiment of the present disclosure.

Referring to FIG. 3, the display apparatus 100 includes the sensor 110, the display unit 120, the input unit 130, the controller 140, a broadcasting receiver 150, a communicator 160, an external apparatus input terminal 170, a storage unit 180, and a power supply unit 190.

FIG. 3 illustrates various types of elements of the display apparatus 100 that is realized as an apparatus having various functions such as a content providing function, a user recognizing function, a displaying function, an SNS providing function, and/or the like. Therefore, according to various embodiments of the present disclosure, some of the elements of FIG. 3 may be omitted or changed, or other types of elements may be further added.

The sensor 110 detects whether the user approaches the display apparatus 100. In detail, the sensor 110 may capture a preset area around the display apparatus 100 by using a camera. If the user is detected when capturing the preset area, then the sensor 110 may determine that the user approaches the display apparatus 100.

The determination of the sensor 110 as to whether the user approaches the display apparatus 100 by using the camera is only an example. Therefore, the sensor 110 may determine whether the user approaches the display apparatus 100, by using at least one of an NFC module, an infrared sensor, and an audio sensor.

The broadcasting receiver 150 may receive a broadcasting content from an external broadcasting station in real time. In particular, the broadcasting receiver 150 may select a broadcasting channel selected by the user and receive a broadcasting channel of the selected broadcasting channel.

The communicator 160 communicates with various types of external apparatuses according to various types of communication methods. The communicator 160 may include various types of chips such as a WiFi chip, a Bluetooth chip, an NFC chip, a wireless communication chip, and/or the like. The WiFi chip, the Bluetooth chip, and the NFC chip respectively perform communications by using a WiFi method, a Bluetooth method, and an NFC method. The NFC chip operates according to an NFC method using a band of 13.56 MHz among various radio frequency identification (RFID) frequency bands such as 135 KHz, 13.56 MHz, 433 MHz, 860~960 MHz, 2.45 GHz, and/or the like. If the WiFi chip or the Bluetooth chip is used, then the communicator 160 may transmit and receive various types of connection information such as subsystem identification (SSID), a session key, and/or the like to perform communication connections by using the various types of connection information in order to transmit and receive various types of information. The wireless communication chip may perform communication according to various types of communication standards such as IEEE, 3rd Generation (3G), 3rd Generation Partnership Project (3GPP), Long Term Evolution (LTE), and/or the like.

The display unit 120 controls an overall operation of the display apparatus 100 under control of the controller 140. In particular, the display unit 120 includes the first display unit 121 that displays an image received from the broadcasting receiver 150, the communicator 160, and the external apparatus input terminal 170, and the second display unit 123 that displays an object for controlling the display apparatus 100 outside the display unit 121.

Referring to FIG. 2, the first display unit 121 may be realized as an LCD, and the second display unit 123 may be realized as a projector display, but this is only an example. Therefore, the first display unit 121 may be realized as various types of displays such as an organic light-emitting diode (OLED), a plasma display panel (PDP), and/or the like, and the second display unit 123 may be realized as various types of displays such as a transparent display, and/or the like disposed outside the display unit 121.

The external apparatus input terminal 170 is connected to an external apparatus. For example, the external apparatus input terminal 170 may be connected to an external apparatus to receive an image content from the external apparatus. The external apparatus input terminal 170 may transmit a user command input through the input unit 130 to the external apparatus.

The storage unit 180 stores various types of modules for driving the display apparatus 100. For example, the storage unit 180 may store software including a base module, a detecting module, a communication module, a presentation module, a web browser module, a service module, and/or the like. The base module processes a signal transmitted from each hardware included in the display apparatus 100 and transmits the processed signal to an upper layer module. The detecting module may collect information from various types of sensors, analyze and manage the collected information, and include a face recognition module, a voice recognition module, a motion recognition module, an NFC recognition module, and/or the like. The presentation module constitutes a display screen and may include a multimedia module that plays and outputs a multimedia content and a UI rendering module that processes a UI and a graphic. The communication module communicates with the external apparatus. The web browser module performs web browsing to access a web server. The service module includes various types of applications for providing various services.

As described above, the storage unit 180 may include various types of program modules, and some of the various types of program modules may be omitted, changed, or added according to a type and a characteristic of the display apparatus 100. For example, if the display apparatus 100 is realized as a smartphone, the base module may further include a position determination module that determines a global positioning system (GPS)-based position, and the detecting module may further include a detecting module that detects a motion of the user.

The storage unit 180 may store user information according to users. The user information may include at least one of preferred channel information, reserved viewing information, content use information using an external apparatus, recommendation information, and/or the like. In detail, the controller 140 may periodically check a reservation function execution to store reserved viewing information (e.g., a broadcasting time, a broadcasting program image, reserver information, and/or the like) of the user in the storage unit 180. If the external apparatus is connected to the display apparatus 100, the controller 140 may store file information and play time information of a content provided by the external apparatus, and information about the connected external information in the storage unit 180. The controller 140 may analyze a content using pattern of the user to store information about a recommendation content of the user (e.g., a recommendation content genre, a recommendation content-related image, information about an object to be recommended, and/or the like) in the storage unit 180.

The storage unit 180 may store a message written by the user.

The power supply unit 190 supplies power to elements of the display apparatus 100. In particular, when the display apparatus 100 keeps the standby mode, the power supply unit 190 may supply power only to the sensor 110 not to the other elements. If the user is detected through the sensor 110, then the power supply unit 190 may supply power to a sub controller 141 to activate the sub controller 141. In addition, when the display apparatus 100 normally operates in a normal mode, the power supply unit 190 may supply power to all elements of the display apparatus 100. According to various embodiments of the present disclosure, the display apparatus 100 may only supply power to elements required to detect a user when the display apparatus 100 is in a standby mode. According to various embodiments of the present disclosure, when the display apparatus 100 is in a standby mode, the display apparatus 100 may supply power only to essential elements such as elements required to detect a user.

The input unit 130 receives a user command for controlling the display apparatus 100. In particular, the input unit 130 may be realized as a motion input unit that inputs a user command by using a hand gesture of the user.

In particular, the input unit 130 may divide an image (e.g., consecutive frames) corresponding to a motion of the user input through the camera into a background area and a hand area (e.g., spreading fingers or closing fists) by using a motion recognition module and recognize consecutive motions of a hand.

In detail, if a motion of the user is captured, then the input unit 130 stores the received image in the frame unit and detects an object of the motion of the user (e.g., a hand of the user) by using the stored frames. The input unit 130 detects at least one of a shape, a color, and a motion of an object included in a frame to detect the object. The input unit 130 may trace a motion of the detected object by using positions of objects included in a plurality of frames.

The input unit 130 determines a motion according to the shape and the motion of the traced object. For example, the input unit 130 determines a motion of the user by using at least one of a change of a shape of an object, a speed of the object, a position of the object, a direction of the object, and/or the like. The motion of the user includes grabbing that corresponds to a motion of grabbing a hand, a pointing move that corresponds to a motion of moving a marked cursor with a hand, a slapping that corresponds to a motion of moving a hand in one direction at a preset speed or more, a shaking that corresponds to a motion of shaking the hand to the left and/or right or upwards and downwards, a rotating that corresponds to a motion of rotating the hand, and/or the like. Various embodiments of the present disclosure may be applied to other motions besides motions described in the above embodiment. For example, a spreading motion, and/or the like of spreading a hand may be further included.

The input unit 130 determines whether an object gets out of a determined area (e.g., a square of 40 cm×40 cm) within a determined time (e.g., 800 ms) to determine whether a motion of the user is a pointing move or slapping. If the object does not get out of (e.g., does not exit) the determined area within the determined time, then the input unit 130 may determine that the motion of the user is the pointing move. If the object gets out of (e.g., exits) the determined area within the determined time, then the input unit 130 may determine that the motion of the user corresponds to a slapping. As another example, if the speed of the object is determined to be slower than or equal to a preset speed (e.g., 30 cm/s), then the input unit 130 determines that the motion of the user corresponds to the pointing move. If the speed of the object is determined to exceed the preset speed, then the input unit 130 determines that the motion of the user corresponds to a slapping. As described above, the input unit 130 performs a function or a task of the display apparatus 100 by using the recognized hand gesture.

However, inputting of the user command through the input unit 130 by using the hand gesture of the user is only an example. Therefore, the user command may be input by using various types of input devices such as a pointing device, a voice recognizing device, a mouse, a touch panel, a remote controller, and/or the like.

The controller 140 controls an overall function of the display apparatus 100 according to the user command input through the input unit 130. In particular, the controller 140 includes the sub controller 141 and a main controller 143 as illustrated in FIG. 3

If the user is detected when the display apparatus 100 keeps the standby mode (e.g., in response to detecting the user when the display apparatus 100 is in the standby mode), then the sub controller 141 may be supplied with power from the power supply unit 190 to be activated and control the second display unit 123 to display at least one object for controlling the display apparatus 100. If the display apparatus 100 is changed from the standby mode into the normal mode (e.g., in response to the display apparatus 100 being changed from the standby mode into the normal mode), then the main controller 143 may be supplied with power from the power supply unit 190 to be activated and control an overall operation of the display apparatus 100. If the main controller 143 is activated (e.g., in response to activation of the main controller 143), then the sub controller 141 may be changed into an inactivation state. Detailed operations of the sub controller 141 and the main controller 143 will now be described in detail with reference to FIGS. 4A through 8.

The display apparatus 100 keeps the standby mode. The standby mode refers to a mode in which power is not supplied to other elements of the display apparatus 100 except the sensor 110.

If the user is detected through the sensor 110 when the display apparatus 100 keeps the standby mode (e.g., in response to detecting the user when the display apparatus 100 is in the standby mode), then the power supply unit 190 supplies power to the sub controller 141 to activate the sub controller 141.

Figure 4A:
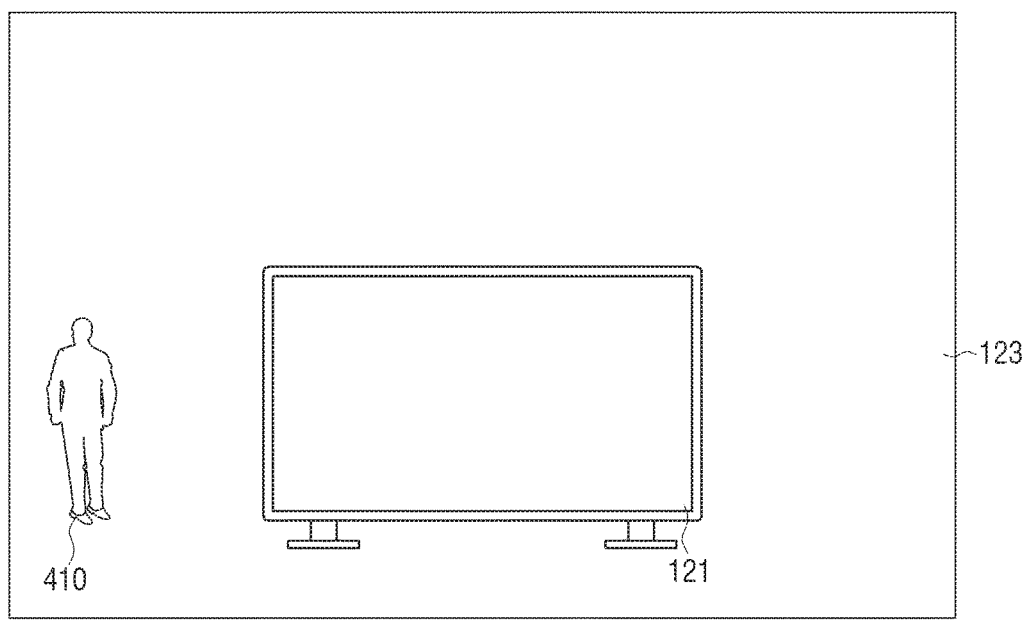
FIGS. 4A, 4B, 4C, 5A, 5B, 5C, 5D, 5E, 6A, 6B, 7A, 7B, and 8 are views illustrating an object that is displayed on a second display unit according to an embodiment of the present disclosure.
Figure 4A:
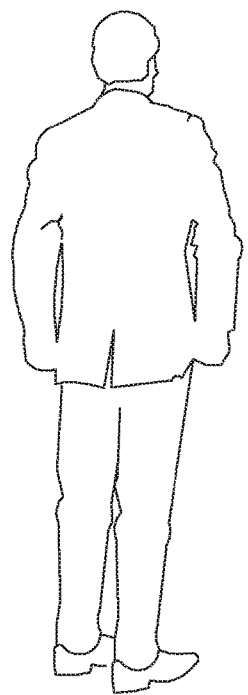

The sub controller 141 that is activated may control the second display unit 123 to display a display item 410 corresponding to the detected user as illustrated in FIG. 4A. The display item 410 may be a shape of a person and may move to correspond to a motion of the user captured by the sensor 110. However, this is only an example, and the display item 410 may be realized as another type of indicator. For example, if the person is detected (e.g., in response to detecting the person), then the sub controller 141 may display a text type of display item or an icon type of display item and output a voice that notifies that the person is detected.

The sub controller 141 may output an indicator to distinguish a case according to which a plurality of persons is detected from a case according to which one person is detected. For example, the sub controller 141 may display a plurality of person shapes of display items and display a text notifying that a plurality of persons are detected or output a voice notifying that the plurality of persons are detected.

The sub controller 141 may determine whether the detected user is a user stored in the storage unit 180. In detail, the sub controller 141 may determine that the detected user is the user stored in the storage unit 180, by using various recognition methods such as a face recognition, a fingerprint recognition, an iris recognition, and/or the like.

If the detected user is determined to be the user stored in the storage unit 180 (e.g., in response to determining that the detected user corresponds to the user stored in the storage unit 180 or otherwise registered with the display apparatus 100), then the sub controller 141 may search the storage unit 180 for user information corresponding to the detected user. The sub controller 141 may also acquire user information corresponding to the detected user. The user information may include at least one of preferred channel information, reserved viewing information, content use information using an external apparatus, recommendation content information, SNS information, and/or the like.

In addition, the sub controller 141 may control the second display unit 123 to display at least one object for controlling the function of the display apparatus 100 based on the acquired user information. In detail, if user A is detected, then the sub controller 141 may acquire SNS information, preferred channel information, digital versatile disc (DVD) play information, recommendation content information, and/or the like of the user A. The SNS information may be acquired from an SNS server through the communicator 160 and may include an SNS update message, an SNS update time, and/or the like.

FIGS. 4A, 4B, 4C, 5A, 5B, 5C, 5D, 5E, 6A, 6B, 7A, 7B, and 8 are views illustrating an object that is displayed on a second display unit according to an embodiment of the present disclosure.

Figure 4B:
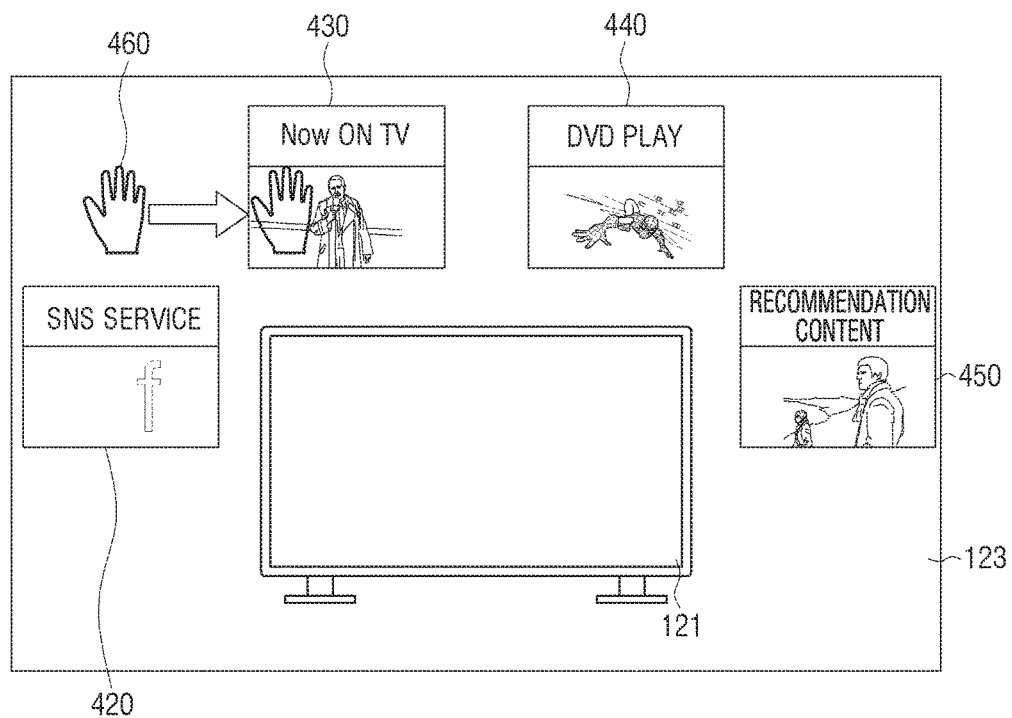
Figure 4C:
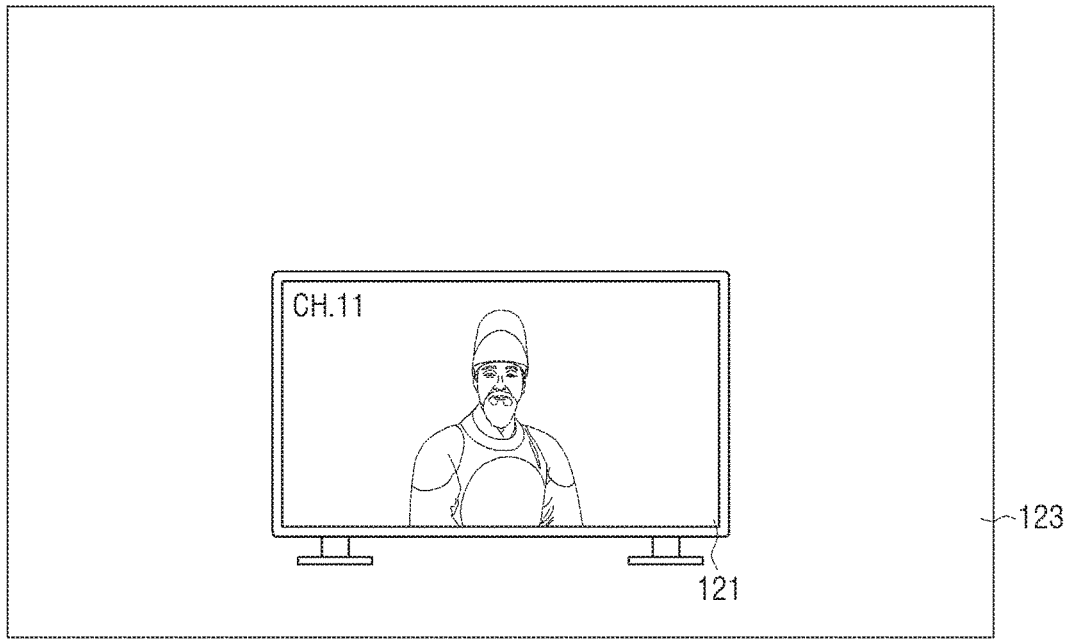

Referring to FIG. 4A, 4B, and 4C, the controller 140 (e.g., the sub controller 141) may control the second display unit 123 to display a first object for providing an SNS service, a second object 430 for providing a content (e.g., TV content) viewing service, a third object 440 for providing a media (e.g., DVD play) service, a fourth object 450 for providing a content recommendation service, and/or the like. For example, the sub controller 141 may control the second display unit 123 to display a first object 420 for performing an SNS service based on acquired SNS information, a second object 430 for immediately selecting a preferred channel based on preferred channel information, a third object 440 for continuously playing a content that is previously played based on DVD play information, and a fourth object 450 for providing a recommendation content UI based on recommendation content information.

If one of at least one displayed object is selected through the input unit 130 (e.g., in response to selection of one of the at least one displayed object), then the sub controller 141 controls the power supply unit 190 to supply power to the main controller 143, and the main controller 143 is activated. A mode of the display apparatus 100 may be changed from the standby mode into the normal mode.

The main controller 143 may perform a function of the display apparatus 100 corresponding to the selected object. In detail, as illustrated in FIG. 4B, if a user command to select the second object 430 (e.g., a command to allow the user to perform grabbing when a pointer 460 is positioned on the second object 430) is input (e.g., in response to selection of the second object 430), then the main controller 143 may control the broadcasting receiver 150 and the first display unit 121 to display a broadcasting program of channel 11 that is a preferred channel of user A as illustrated in FIG. 4C.

According to various embodiments of the present disclosure, if a user command to select the first object 420 is input (e.g., in response to selection of the first object 420), then the main controller 143 may control the communicator 160 and the first display unit 121 to display a UI including a message updated in an SNS account of the user A.

According to various embodiments of the present disclosure, if a user command to select the third object 440 is input (e.g., in response to selection of the third object 440), then the main controller 143 may control the external apparatus input terminal 170 and the first display unit 121 to continuously play a content that is previously played through a DVD device.

According to various embodiments of the present disclosure, if a user command to select the fourth object 450 is input (e.g., in response to selection of the fourth object 450), then the main controller 143 may control the first display unit 121 to display a UI including a recommendation content of the user A.

After an object is selected, at least one object displayed on the second display unit 123 may be continuously displayed, but this is only an example. Therefore, the main controller 143 may control the second display unit 123 to remove at least one object from a display screen.

As described above, when the display apparatus 100 keeps the standby mode, an object for controlling the display apparatus 100 may be displayed to the user through the second display unit 123. Therefore, the user may further easily and conveniently control the function of the display apparatus 100.

If an external apparatus is connected to the display apparatus 100 when the display apparatus 100 keeps the normal mode (e.g., in response to an external apparatus being connected to the display apparatus 100 when the display apparatus 100 is in the normal mode), then the controller 140 may control the second display unit 123 to display an object for controlling the external apparatus on the second display unit 123.

Figure 5A:
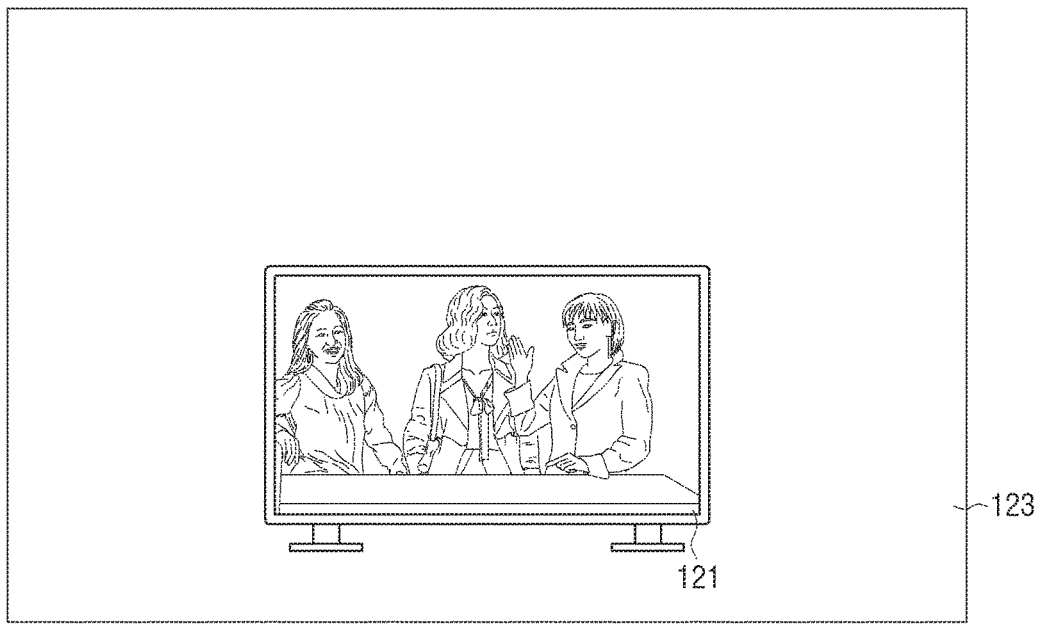

Referring to FIG. 5A, the display apparatus 100 may control the first display unit 121 to display a broadcasting program. If a smartphone is connected to the display apparatus 100 when the display apparatus 100 keeps the normal mode, the main controller 143 may determine whether the connected smartphone newly stores a content.

Figure 5B:
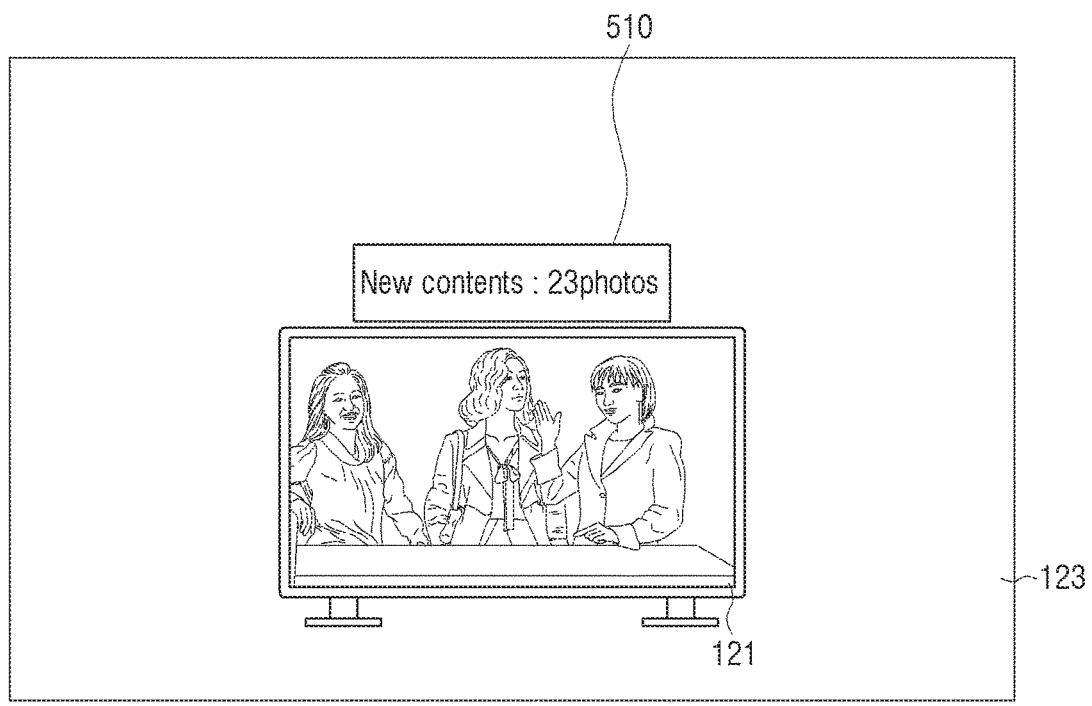

Referring to FIG. 5B, if the smartphone newly stores the content (e.g., in response to the main controller 143 determining that the connected smartphone newly stores the content), then the main controller 143 may control the second display unit 123 to display a fifth object 510 showing information about the content newly stored in the smartphone.

Figure 5C:
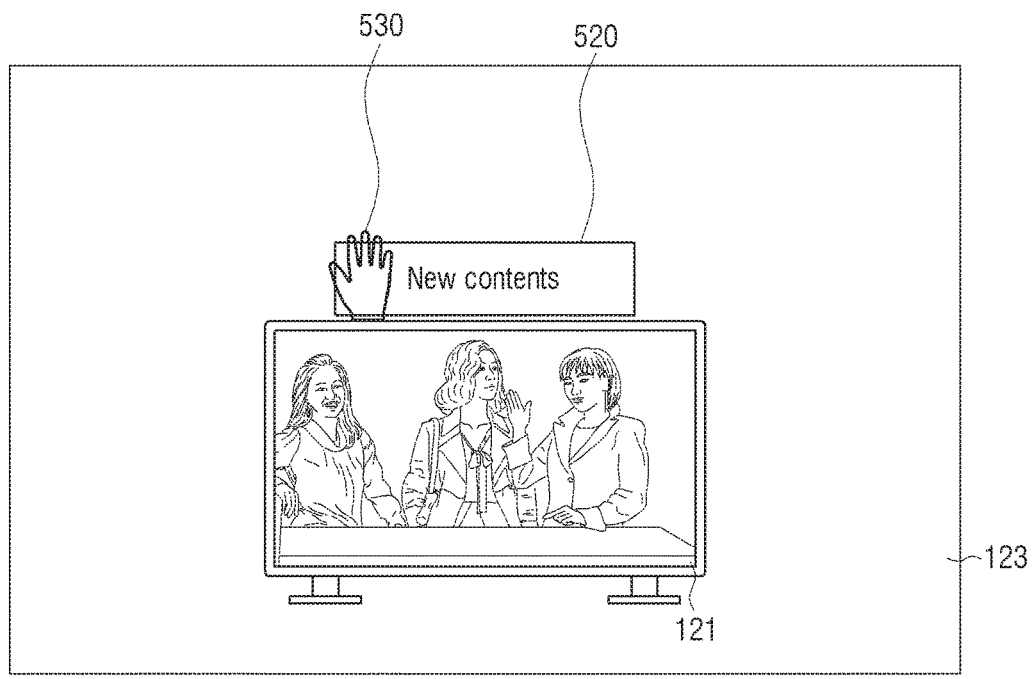

Referring to FIG. 5C, if a user command is not input for a preset time (e.g., 1 minute) after an object is displayed, then the main controller 143 may control the second display unit 123 to display a sixth object 520 smaller than the fifth object 510. In other words, if there is no input of the user after time elapses, then the main controller 143 may reduce a size of an object so as not to interrupt viewing of an image that is currently output from the first display unit 121.

Figure 5D:
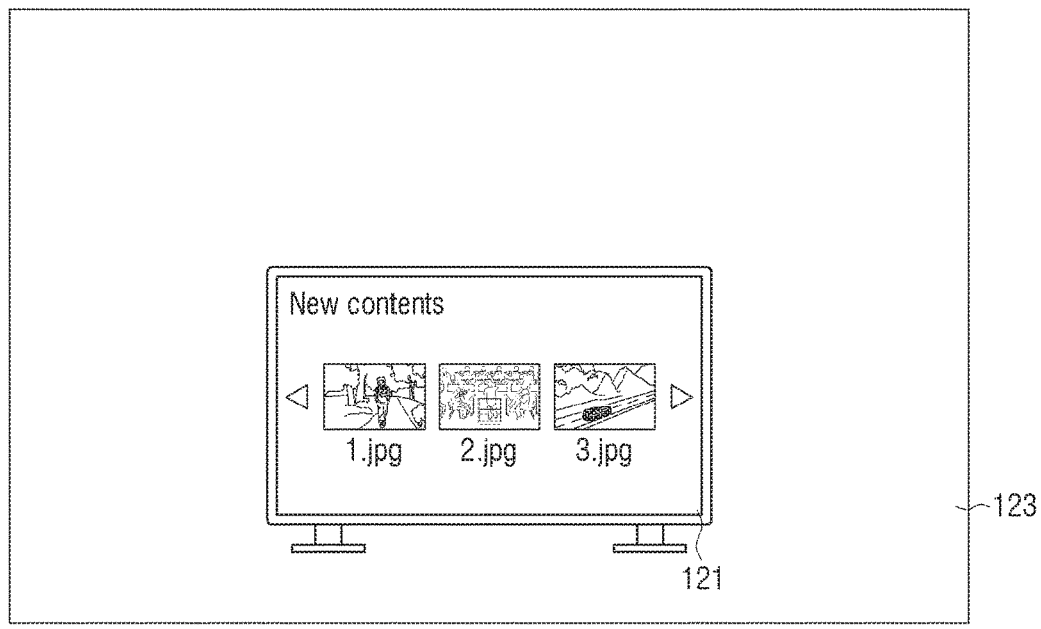

Referring to FIGS. 5C and 5D, if a user command to select the sixth object 520 (e.g., a command, and/or the like to allow the user to perform grabbing when a pointer 530 is displayed on the sixth object 520) is input when the sixth object 520 is displayed (e.g., in response to selection of the sixth object 520), then the controller 140 may control the first display unit 121 to display a UI for playing the content newly stored in the smartphone as illustrated in FIG. 5D.

As described above, an object for playing a content of an external apparatus that is newly connected may be displayed on the second display unit 123. Therefore, the user may display a UI for playing a content stored in the external apparatus without being interrupted in viewing of a content that is currently viewed.

In the above-described embodiment of the present disclosure, the main controller 143 displays the fifth object 510 on top of the second display unit 123, but this is only an example.

Figure 5E:
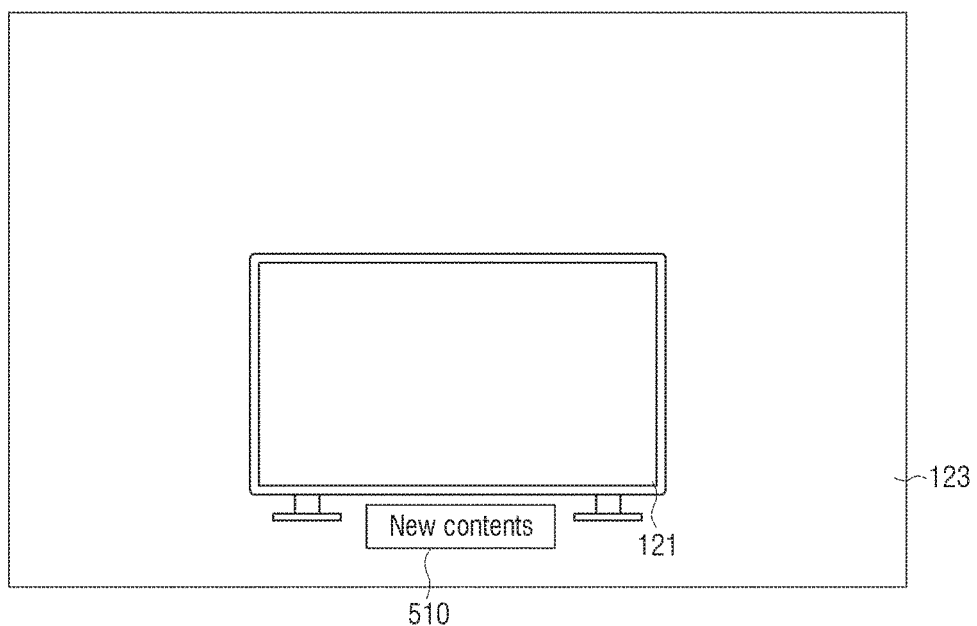

Referring to FIG. 5E, the fifth object 510 may be displayed on bottom of the second display unit 123.

If reserved viewing information is stored in the storage unit 180, and a reserved viewing time included in the stored reserved viewing information arrives, then the controller 140 may control the second display unit 123 to display an object showing reserved viewing on the second display unit 123.

Figure 6A:
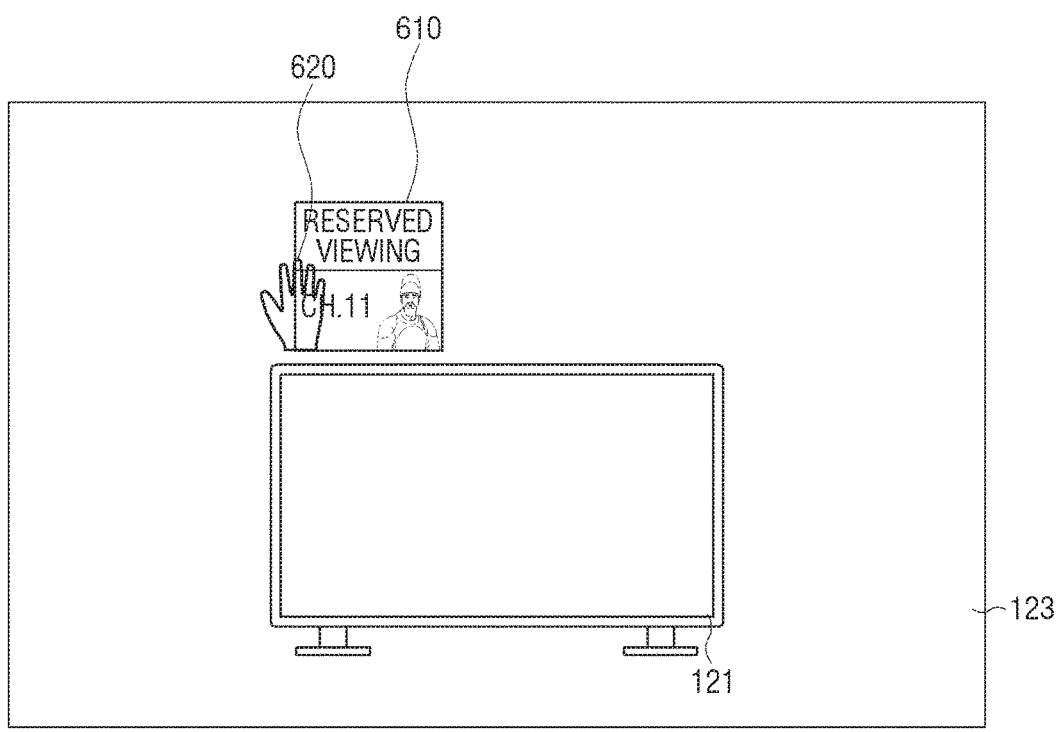
Figure 6B:
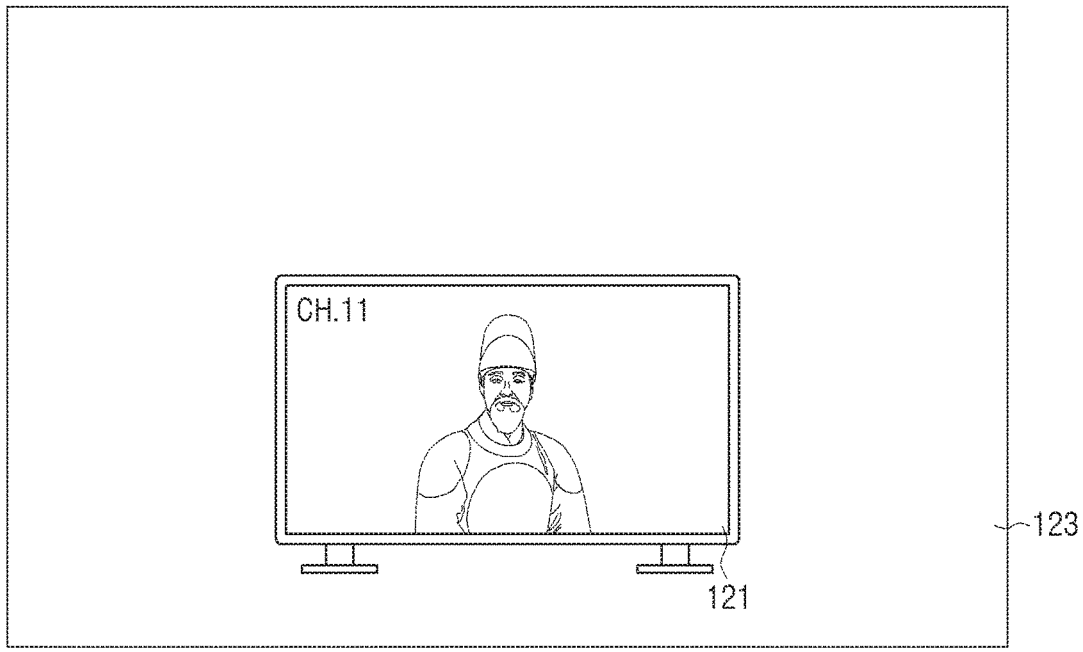

Referring to FIGS. 6A and 6B, if a reserved viewing time of pre-stored program A of channel 11 arrives when the display apparatus 100 keeps the standby mode, then the sub controller 141 may be activated and control the second display unit 123 to display a seventh object 610 showing reserved viewing. A UI showing reserved viewing may include at least one of channel information, program information, a program thumbnail image, and/or the like. If a user command to select the seventh object 610 showing the reserved viewing (e.g., a command, and/or the like to allow the user to perform grabbing when a pointer 620 is displayed on the seventh object 610) is input (e.g., in response to selection of the seventh object 610), then the main controller 143 may be activated, may control the broadcasting receiver 150 to select channel 11 corresponding to the selected seventh object 610, and may control the display unit 121 to display the program A of the channel 11.

In the above-described embodiment of the present disclosure, if a reserved viewing time arrives, then the sub controller 141 displays an object showing reserved viewing, but this is only an example. Therefore, the sub controller 141 may display an object showing reserved viewing before a preset time (e.g., 5 minutes) of the reserved viewing time. In addition, in the above-described embodiment of the present disclosure, if the reserved viewing time arrives in the standby mode, then the sub controller 141 displays an object showing reserved viewing, but this is only an example. Therefore, if the reserved viewing time arrives in the normal mode, then the main controller 143 may display the object showing the reserved viewing.

According to various embodiments of the present disclosure, the controller 140 may determine whether a message corresponding to the detected user is stored in the storage unit 180. If the message corresponding to the detected user is stored in the storage unit 180 (e.g., in response to receipt of the message corresponding to the detected user and/or in response to determining that currently displayed content has a message associated therewith stored in the storage unit 180), then the controller 140 may control the second display unit 123 to display an object corresponding to the message. If the object corresponding to the message is selected through the input unit 130, then the controller 140 may control the first display unit 121 to play the message.

Figure 7A:
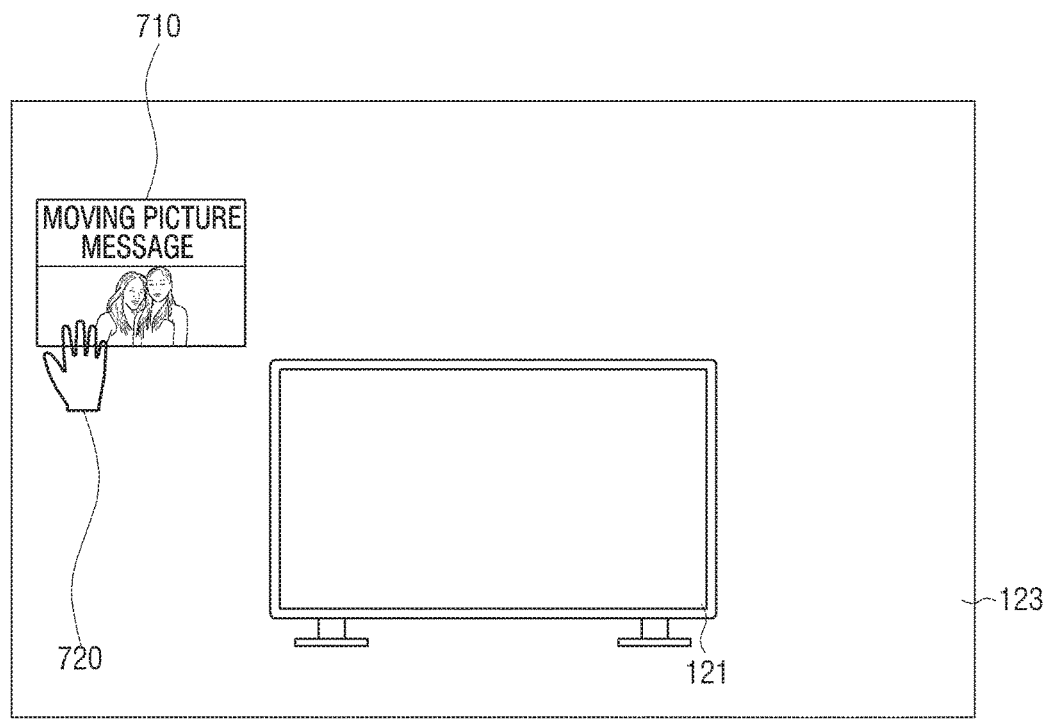
Figure 7B:
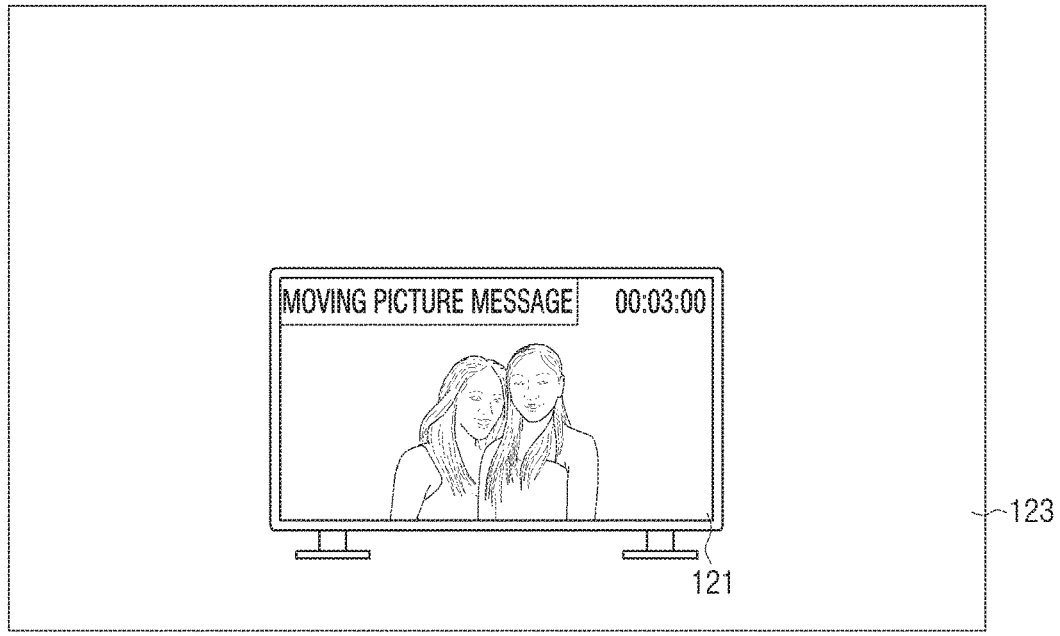

Referring to FIGS. 7A and 7B, if the user is detected through the sensor 110, then the sub controller 141 may be activated and may determine whether the detected user is a user stored in the storage unit 180. If the detected user is determined to correspond to the user stored in the storage unit 180, then the sub controller 141 may determine whether there is a message left to the determined user (e.g., the user registered with the display apparatus 100). The message may be one of a voice message, a text message, a moving picture message, and the like. As illustrated in FIG. 7I, if there is the message left to the user, then the sub controller 141 may control the second display unit 123 to display an eighth object 710 corresponding to the message. One of a type of message, information about a user leaving the message, and message play information may be displayed in the eighth object 710. If a user command to select the eighth object 710 corresponding to the message (e.g., a command, and/or the like to allow the user to perform grabbing when a pointer 720 is displayed on the eighth object 710) is input (e.g., in response to selection of the eight object 710), then the main controller 143 may be activated and may control the first display unit 121 to play the message corresponding to the selected eighth object 710 as illustrated in FIG. 7B.

Figure 8:
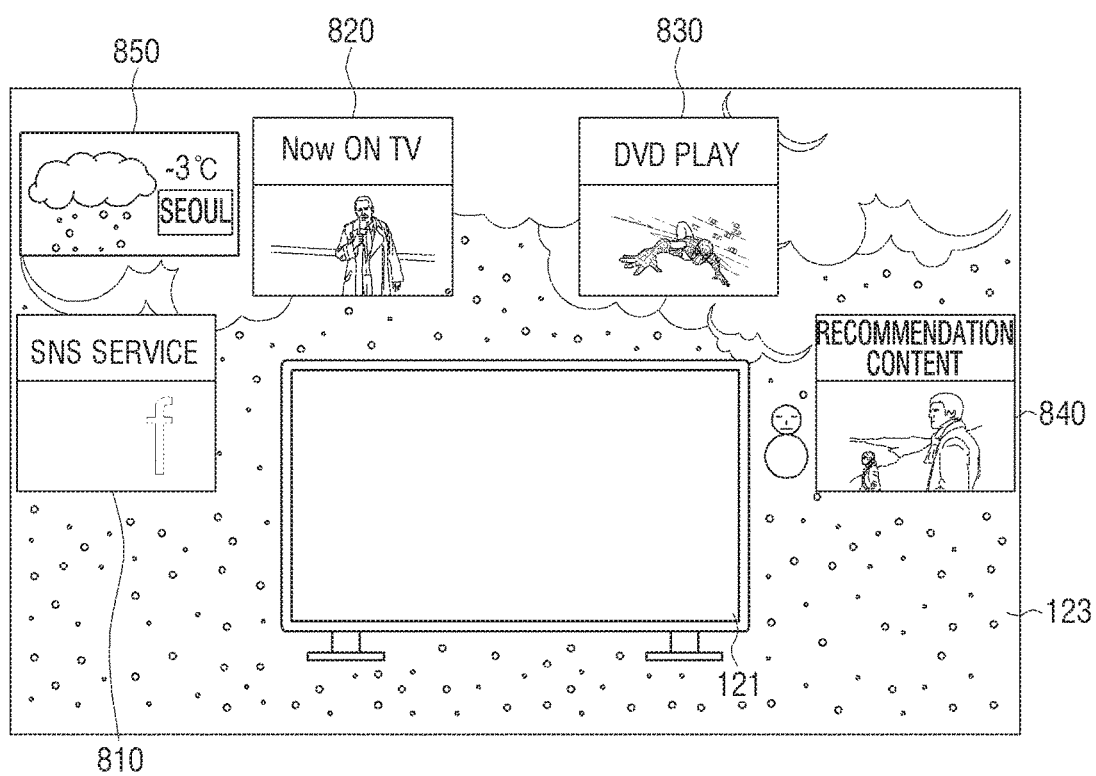

Referring to FIG. 8, the controller 140 may control the second display unit 123 to display a background screen on the second display unit 123. For example, if weather information is received through the communicator 160 in real time, the controller 140 may control the second display unit 123 to display a background screen corresponding to the received weather information as illustrated in FIG. 8. As another example, if an anniversary stored in the storage unit 180 arrives, the controller 140 may control the second display unit 123 to display a background screen corresponding to the anniversary. As another example, if the user designates a particular background screen, the controller 140 may control the second display unit 123 to display the background screen designated by the user. According to various embodiments of the present disclosure, the controller 140 may control the second display unit 123 to display a background screen on the second display unit 123 that is configurable by a user. The background screen may provide contextual information and/or information relating to the user of the display apparatus 100.

As illustrated in FIG. 8, the second display unit 123 may display a background screen that include one or more of a first object 810 for providing a SNS service, a second object 820 for providing a content service, a third object 830 for providing a media service, a fourth object 840 for providing a content recommendation service, a fifth object 850 for providing a weather service, and/or the like.

Through the display apparatus 100 as described above, the user may further conveniently and intuitively control the display apparatus 100 by using an object in the standby mode. In addition, the display apparatus 100 may display an object by using the second display unit 123 positioned outside the first display unit 121 on which a general content is played. Therefore, the user may control various functions of the display apparatus 100 without being interrupted in viewing of the general content. In addition, the display apparatus 100 may provide an object for controlling the display apparatus 100 to each user. Therefore, the user may be provided with a user-customized service.

A method of controlling the display apparatus 100 will now be described with reference to FIG. 9.

Figure 9:
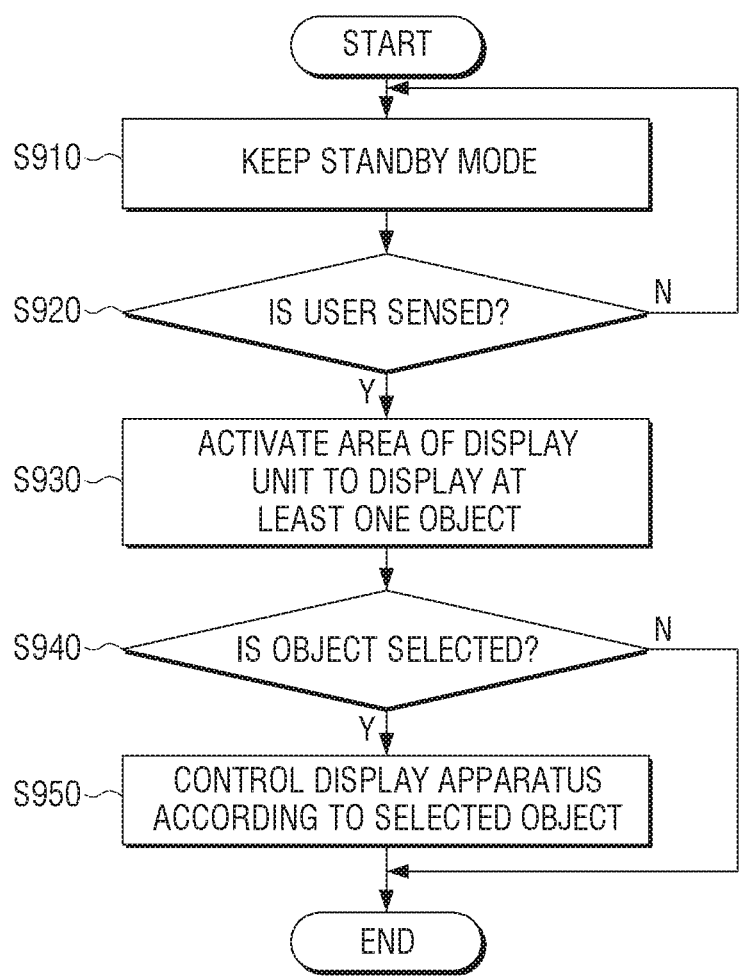
FIG. 9 is a flowchart illustrating a method of controlling a display apparatus according to an embodiment of the present disclosure.

FIG. 9 is a flowchart illustrating a method of controlling a display apparatus according to an embodiment of the present disclosure.

At operation S910, the display apparatus 100 keeps a standby mode. The standby mode refers to a mode in which power is supplied only to the sensor 110 for detecting a user not to the other elements. The standby mode may refer to a mode in which power is not supplied to elements that are not otherwise required to detect a user (e.g., whether a user is present in the environment or preset area around the display apparatus 100).

At operation S920, when the display apparatus 100 keeps the standby mode, the display apparatus 100 determines whether the user is detected. In detail, the display apparatus 100 may capture a preset area around the display apparatus 100. In addition, if the user is detected in the preset area, the display apparatus 100 may determine that the user is detected.

If the display apparatus 100 determines that the user is not detected at operation S920, then the display apparatus may return to operation S910.

In contrast, if the display apparatus 100 determines that the user is detected at operation S920, then the display apparatus may proceed to operation S930 at which the display apparatus 100 activates an area of a display unit to display at least one object. In particular, the display apparatus 100 may display at least one object for controlling a function of the display apparatus 100 on the second display unit 123 disposed outside the first display unit 121.

At operation S940, the display apparatus 100 determines whether one or more of the at least one object is selected. The user may select the object through a hand gesture input, and/or the like.

If the display apparatus 100 determines that the object is not selected at operation S940, then the display apparatus 100 may end the process for controlling the display apparatus 100.

In contrast, if the display apparatus 100 determines that one or more of the at least one object is selected at operation S940, then the display apparatus 100 may proceed to operation S950 at which the display apparatus 100 may control the display apparatus 100 according to the selected object. For example, if one of the at least one object is selected, the display apparatus 100 may display an image corresponding to the selected object on the first display unit 121.

Through the above-described method of controlling the display apparatus 100, even when the display apparatus 100 keeps the standby mode, the user may easily and conveniently perform a function of the display apparatus 100 by using an object displayed in an area of the display unit.

FIGS. 10A, 10B, 10C, 10D, 10E, and 10F are views illustrating a position of a projector apparatus according to an embodiment of the present disclosure. FIGS. 10A through 10F are views illustrating a position of a projector apparatus that realizes the second display unit 123 according to various embodiments of the present disclosure.

Figure 10A:
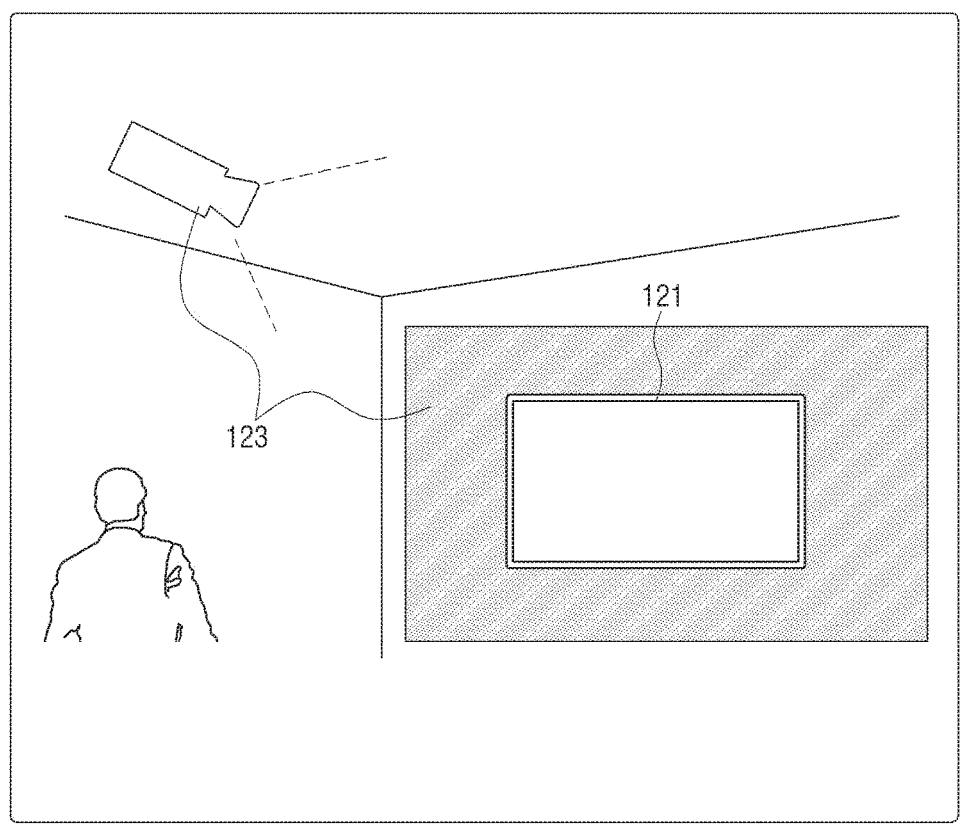
FIGS. 10A, 10B, 10C, 10D, 10E, and 10F are views illustrating a position of a projector apparatus according to an embodiment of the present disclosure.

Referring to FIG. 10A, the projector apparatus may be positioned on a ceiling that is at a long distance from the first display unit 121. For example, the projector apparatus may be positioned on a ceiling that is at a relatively long distance from the first display unit 121. The projector apparatus may be positioned on a ceiling of a same room in which the first display unit 121 is installed.

Figure 10B:
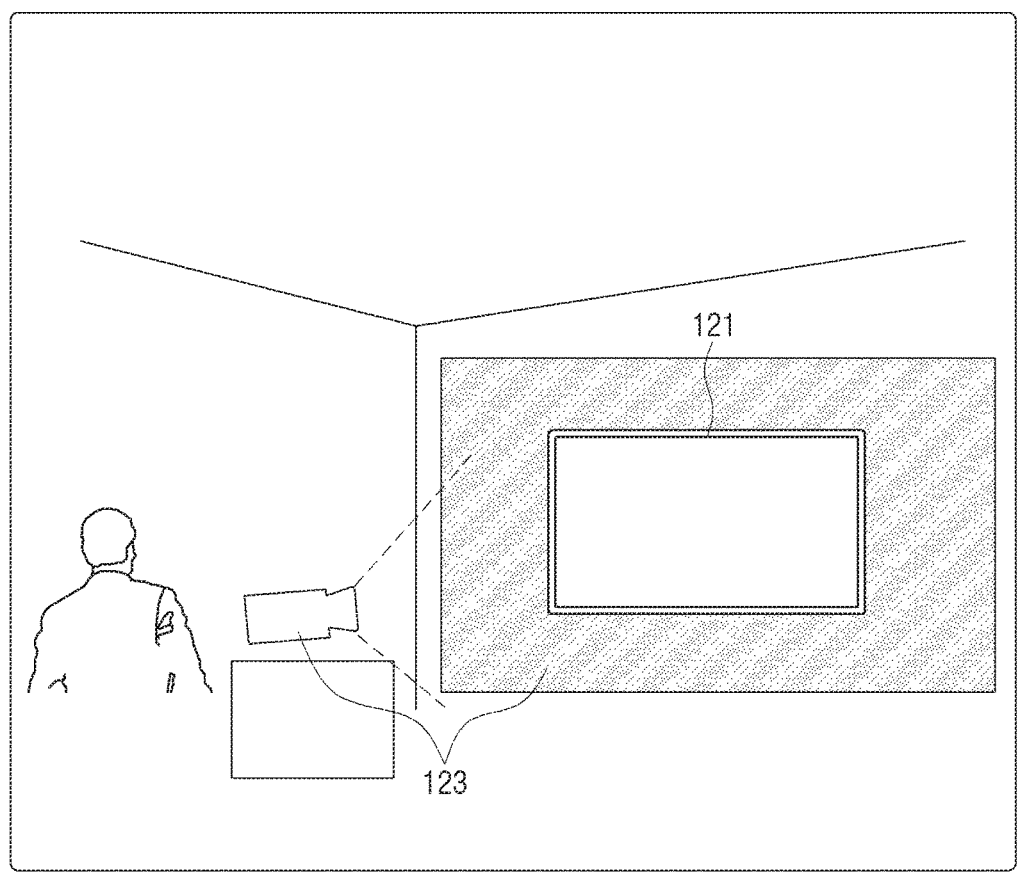

Referring to FIG. 10B, the projector apparatus may be positioned on a table that is at a long distance from the first display unit 121. For example, the projector apparatus may be positioned on a table that is at a relatively long distance from the first display unit 121. The projector apparatus may be positioned on a table in a same room in which the first display unit 121 is installed.

Figure 10C:
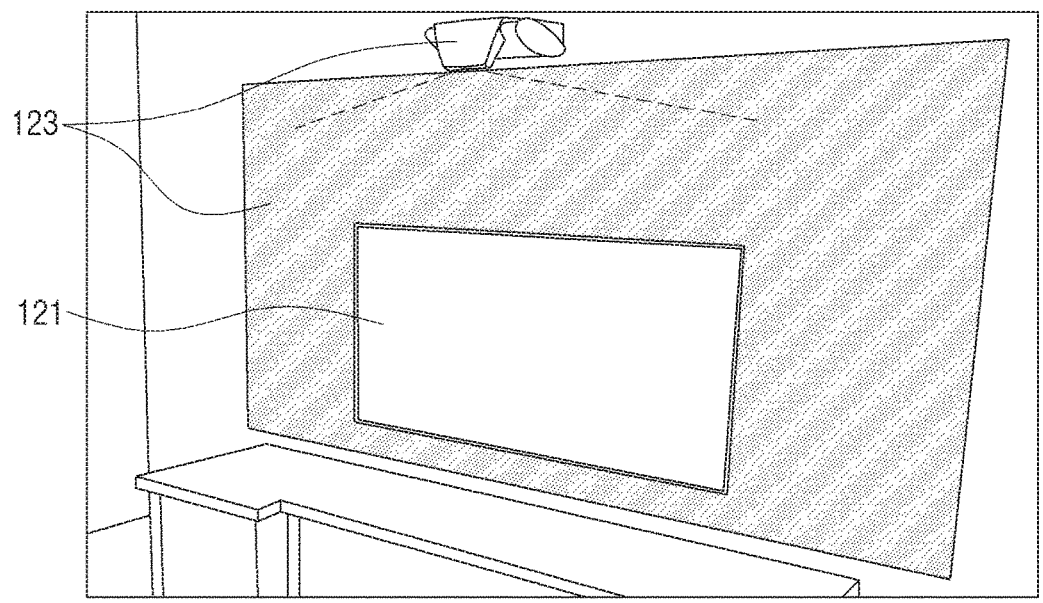

Referring to FIG. 10C, the projector apparatus may be positioned on a wall that is at a short distance from the first display unit 121. For example, the projector apparatus may be positioned on a wall at a relatively short distance from the first display unit 121. The projector apparatus may be positioned on a wall in a same room in which the first display unit 121 is installed. The projector apparatus may be positioned on the same wall on which the first display unit 121 is installed.

Figure 10D:
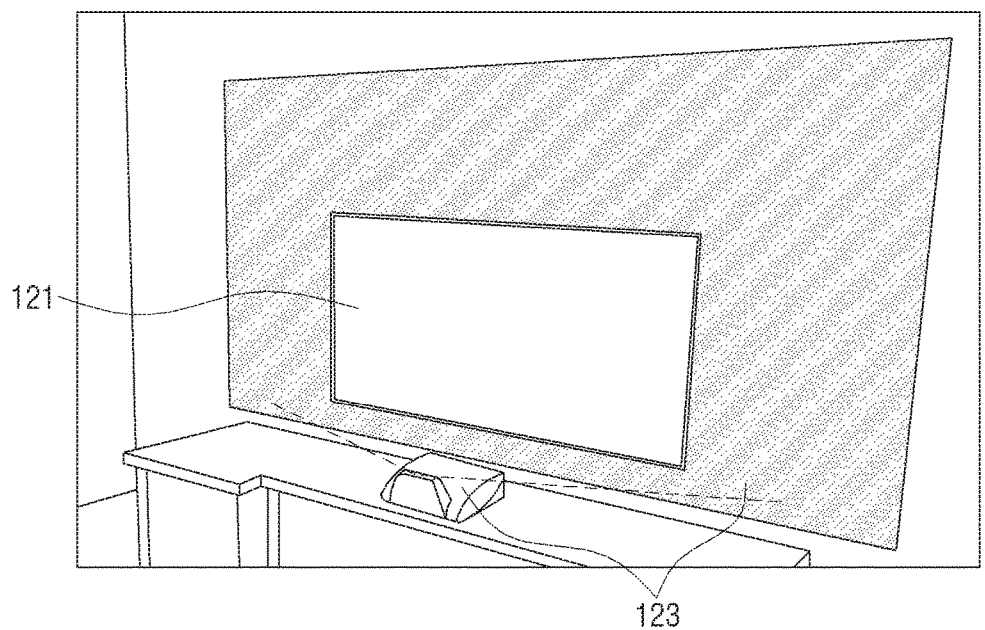

Referring to FIG. 10D, the projector apparatus may be positioned on a table that is at a short distance from the first display unit 121. For example, the projector apparatus may be positioned on a table that is at a relatively short distance from the first display unit 121. The projector apparatus may be positioned on a table in a same room in which the first display unit 121 is installed.

Figure 10E:
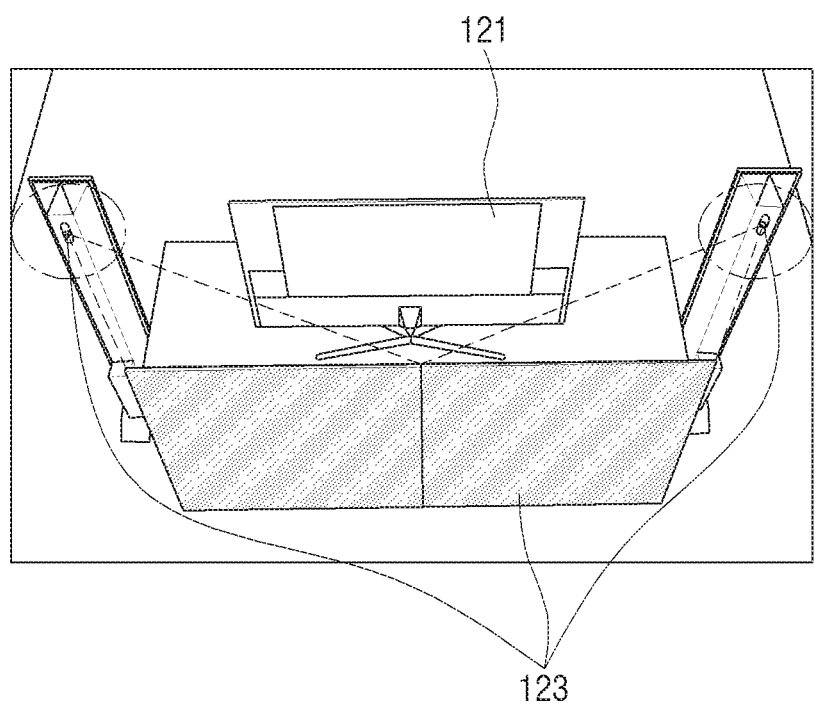

Referring to FIG. 10E, the projector apparatus may be positioned at accessories of the display apparatus 100 (e.g., at a speaker or the like).

Figure 10F:
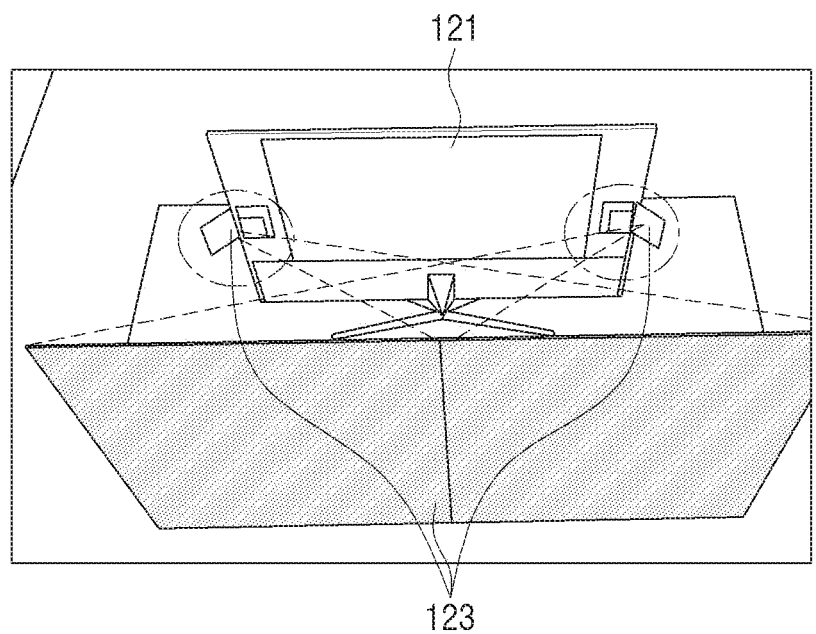

Referring to FIG. 10F, the projector apparatus may be attached on a back surface of the display apparatus 100 to be formed as a single body. In the above-described embodiment of the present disclosure, the projector apparatus may be connected to the display apparatus 100 by wired or wireless and may be controlled by the controller 140 of the display apparatus 100.

Figure 11A:
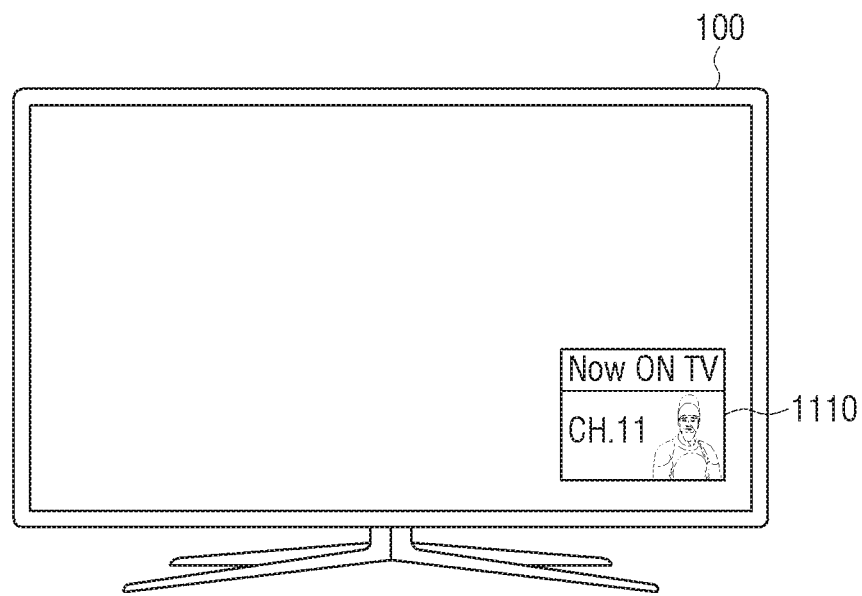
FIGS. 11A and 11B are views illustrating an object for controlling a display apparatus if a user is detected when the display apparatus keeps a standby mode according to an embodiment of the present disclosure.
Figure 11B:
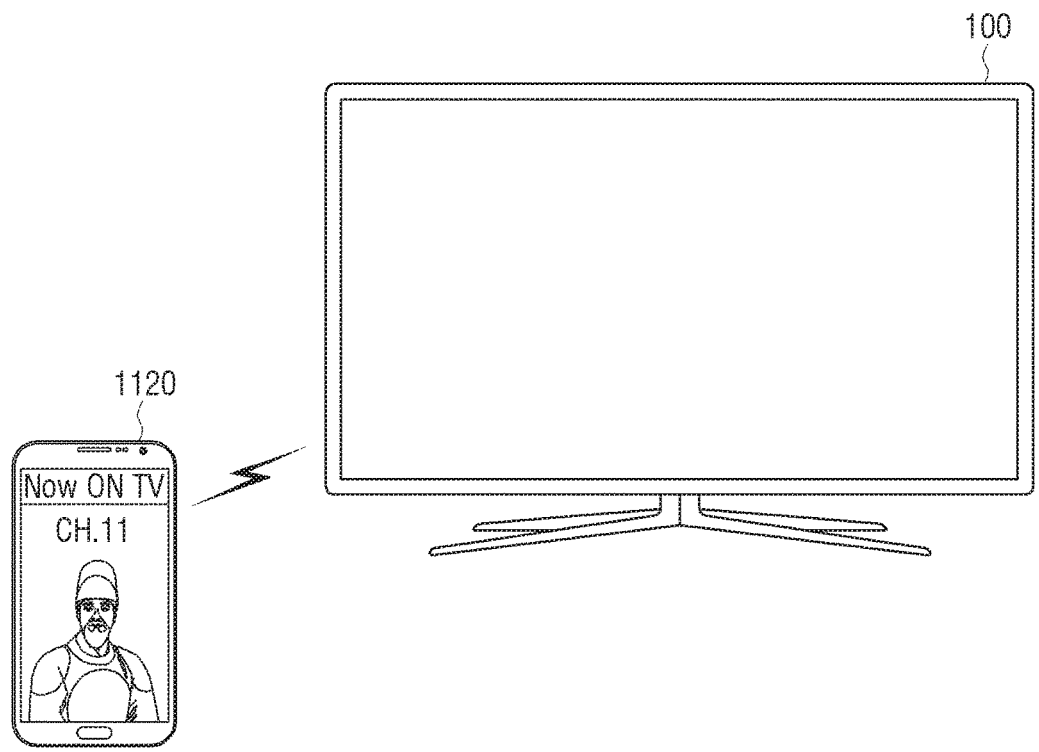

FIGS. 11A and 11B are views illustrating an object for controlling a display apparatus if a user is detected in a standby mode according to an embodiment of the present disclosure.

According to various embodiments of the present disclosure, if the user is detected when the display apparatus 100 keeps the standby mode (e.g., in response to detecting the user when the display apparatus 100 is in the standby mode), then the controller 140 may activate only an area 1110 of the display unit 120 and display an object for controlling the display apparatus 100 in the activated area 1110 as illustrated in FIG. 11A.

Referring to FIG. 11B, according to various embodiments of the present disclosure, if the user is detected when the display apparatus 100 keeps the standby mode (e.g., in response to detecting the user when the display apparatus 100 is in the standby mode), then the controller 140 may transmit information about an object to an external apparatus 1120 (e.g., a smartphone) that is used by the user. In addition, the external apparatus 1120 may display the transmitted object, and if the object displayed on the external apparatus 1120 is selected (e.g., in response to selecting of the object displayed on the external apparatus 1120), then the controller 140 may receive a control command corresponding to the selected object from the external apparatus 1120 and control the display apparatus 100 according to the received control command.

Herein below, according to various embodiments of the present disclosure with reference to FIG.12 through FIG.23C, providing a content stored in at least one mobile terminal which is connected to a display apparatus, which is another embodiment, using the second display 120 is described.

FIGS. 12, 13A, 13B, 13C, 14A, 14B, 14C, 15A, 15B, 16A, 16B, 16C, 16D, 17A, 17B, 17C, 17D, 18A, 18B, 18C, 18D, 19A, 19B, 19C, 19D, 20A, 20B, 20C, 21A, 21B, 21C, 22A, 22B, 22C, 23A, 23B, and 23C are views illustrating a process of providing content stored in at least one mobile terminal which is connected to the display apparatus using the second display according to an embodiment of the present disclosure.

Figure 12:
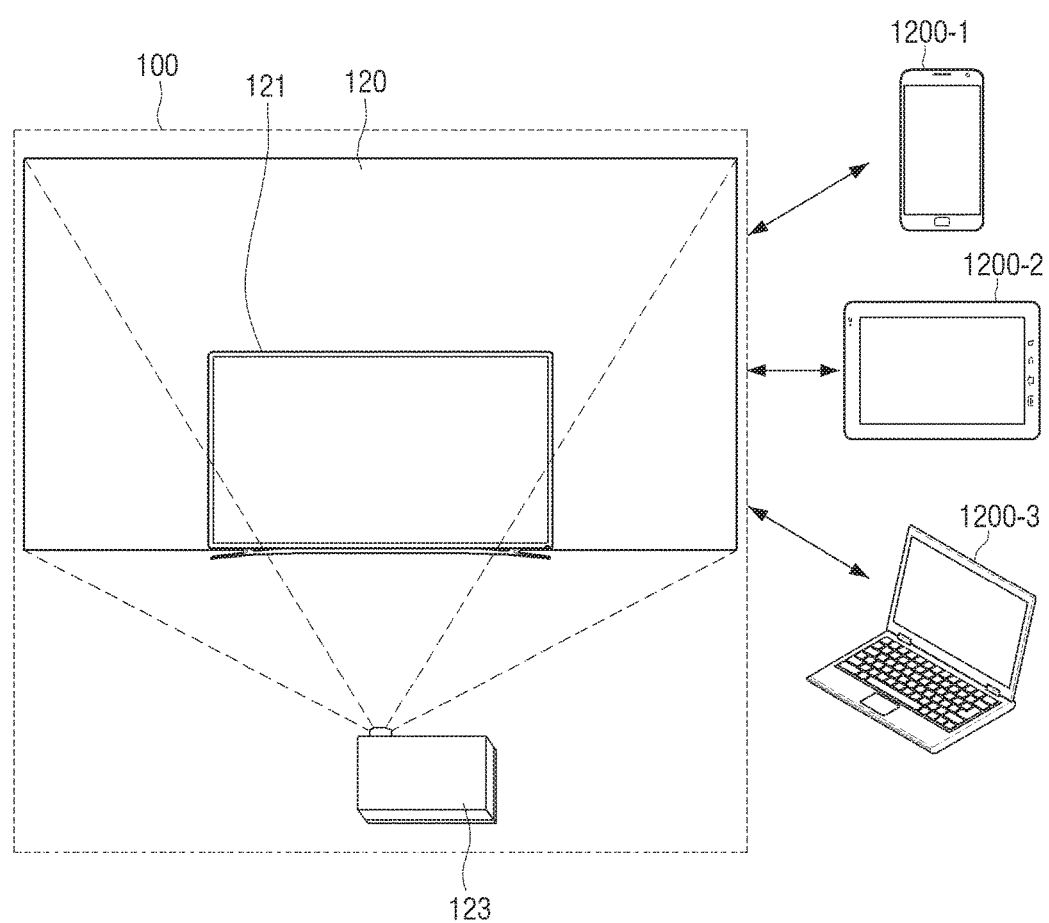
FIGS. 12, 13A, 13B, 13C, 14A, 14B, 14C, 15A, 15B, 16A, 16B, 16C, 16D, 17A, 17B, 17C, 17D, 18A, 18B, 18C, 18D, 19A, 19B, 19C, 19D, 20A, 20B, 20C, 21A, 21B, 21C, 22A, 22B, 22C, 23A, 23B, and 23C are views illustrating a process of providing content stored in at least one mobile terminal which is connected to the display apparatus using the second display according to an embodiment of the present disclosure.

Referring to FIG.12, the display apparatus 100 may perform communication with an external first mobile terminal 1200-1, a second mobile terminal 1200-2, and a third mobile terminal 1200-3. In this case, the first through third mobile terminal s 1200-1 through 1200-3, as illustrated in FIG.12, may be smartphone or a tablet PC, but this is merely an example, and may be realized as various mobile terminals such as a notebook PC, a PDA, a smart watch, and/or the like.

In this case, the display apparatus 100 may provide various content provided by mobile terminals through the first display unit 121 and the second display unit 123. In particular, while the display apparatus 100 keeps standby mode, when connected with at least one external mobile terminal, the display apparatus 100 may provide various content stored in at least one mobile terminal which is connected through the second display unit 123.

Figure 13A:
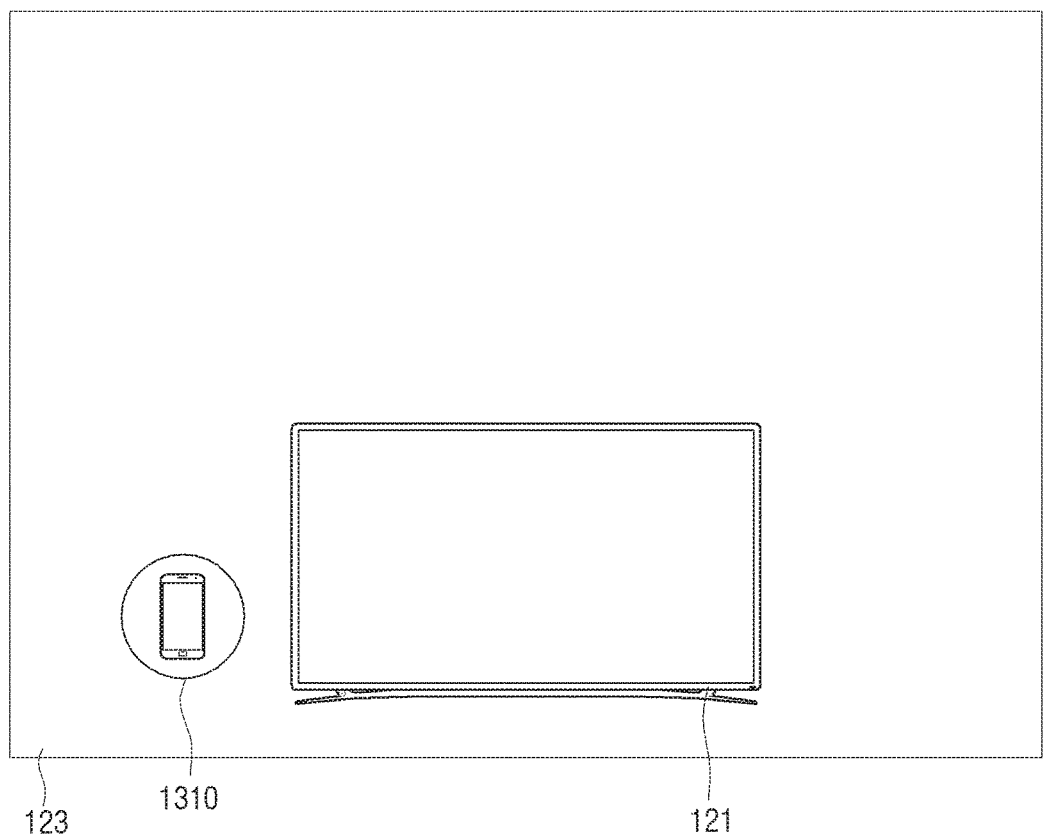

According to various embodiments of the present disclosure, as illustrated in FIG. 13A, when one mobile terminal 1200-1 is connected to the display apparatus 100 while the display apparatus 100 keeps the standby mode (e.g., in response to the mobile terminal 1200-1 being connected to the display apparatus 100 while the display apparatus 100 is in the standby mode), the controller may control the second display unit 123 so as to display a mobile terminal icon 1310 corresponding to a first mobile terminal 1200-1. In this case, the mobile terminal icon 1310 may include an image corresponding to type of the first mobile terminal, but this is merely an example, and may include various information such as user information of the first mobile terminal.

Figure 13B:
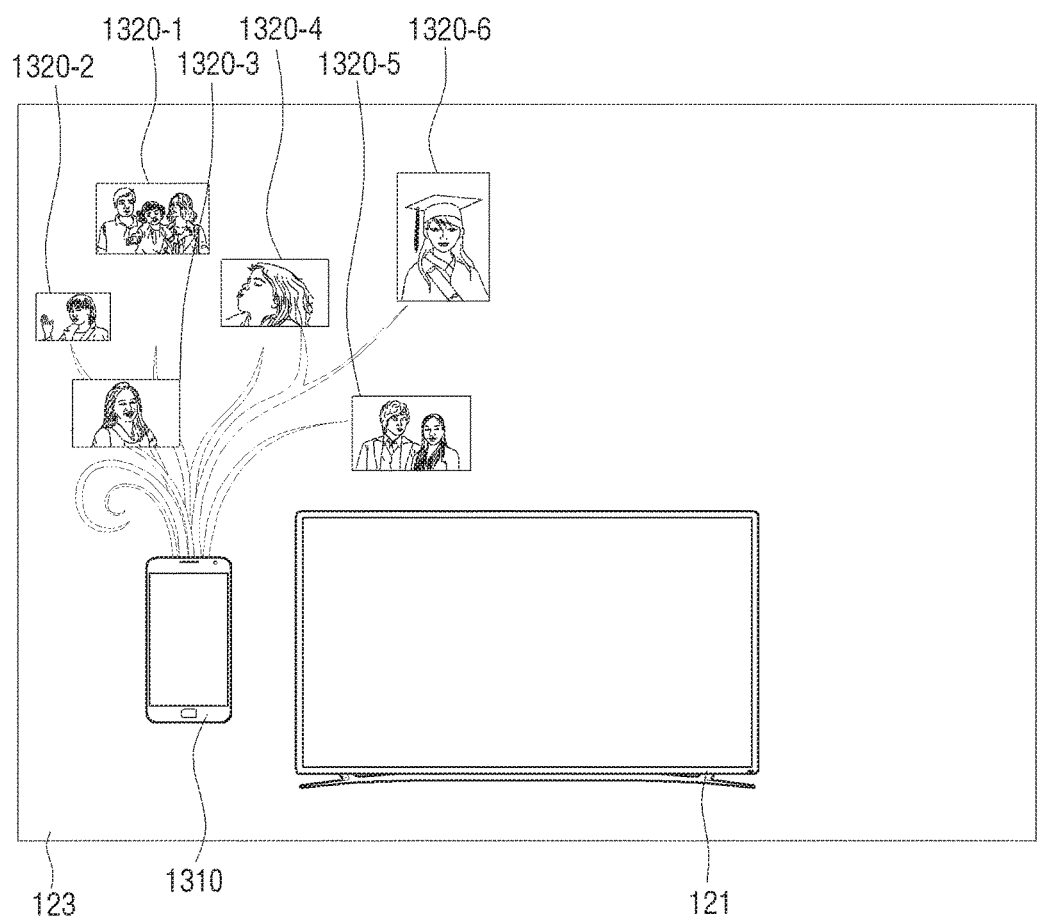

According to various embodiments of the present disclosure, as illustrated in FIG. 13B, when a user command to select the first mobile terminal icon 1310 through the input unit 130 is input (e.g., in response to selection of the first mobile terminal icon 1310), the controller 140 may control the communicator 160 to transmit to the first mobile terminal 1200-1 a request signal requesting image content information, and receive image content information (e.g., thumbnail image information, and/or the like) in response to the request signal. Further, the controller 140, based on the received image content may control the second display unit 123 to display the first mobile terminal icon 1310 at side of the second display unit 123, and display thumbnail images 1320-1 to 1320-6 of the image content stored in the first mobile terminal 1200-1 corresponding to the first mobile terminal icon 1310.

Figure 13C:
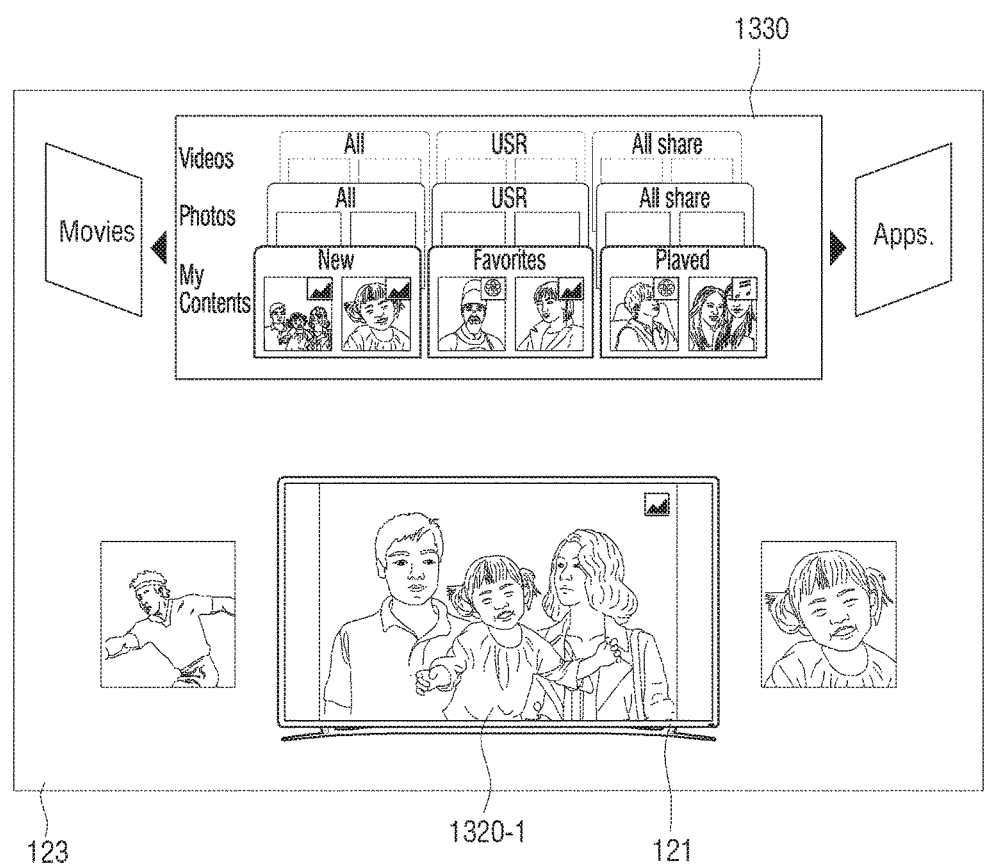

According to various embodiments of the present disclosure, as illustrated in FIG. 13C, when a user command to select the first thumbnail image 1320-1 from among the thumbnail images 1320-1 to 1320-6 stored in the first mobile terminal 1200-1 is input through the input unit 130 (e.g., in response to selection of the first thumbnail image 1320-1), the controller 140 may control the first display unit 121 to display the first thumbnail image 1320-1 on the first display 110 and control the second display 120 to display the display item 1330 including my content folder at the top of the second display unit 123.

Figure 14A:
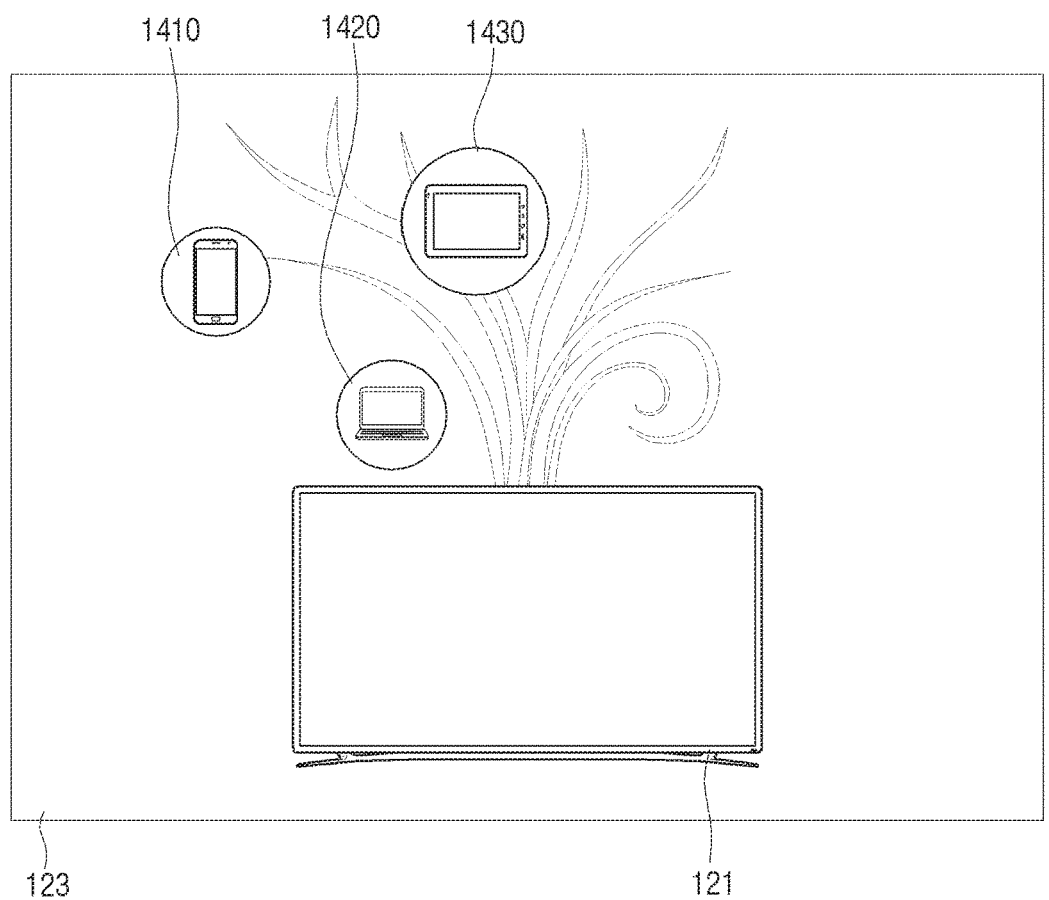

According to various embodiments of the present disclosure, as illustrated in FIG. 14A, while the display apparatus 100 keeps standby mode, when the first to third mobile terminals 1200-1 to 1200-3 are connected to the display apparatus 100 (e.g., in response to one or more of the first mobile terminal 1200-1, the second mobile terminal 1200-2, and the third mobile terminal 1200-3 being connected to the display apparatus 100), the controller 140 may control the second display unit 123 to display a plurality of mobile terminal icons 1410, 1420, and 1430 which correspond to the first to third mobile terminals 1200-1 to 1200-3. In this case, the mobile terminal icons 1410-1430 may include an image corresponding to type of the corresponding mobile terminal, but this is merely an example, and may include various information such as user information of the corresponding mobile terminal.

Figure 14B:
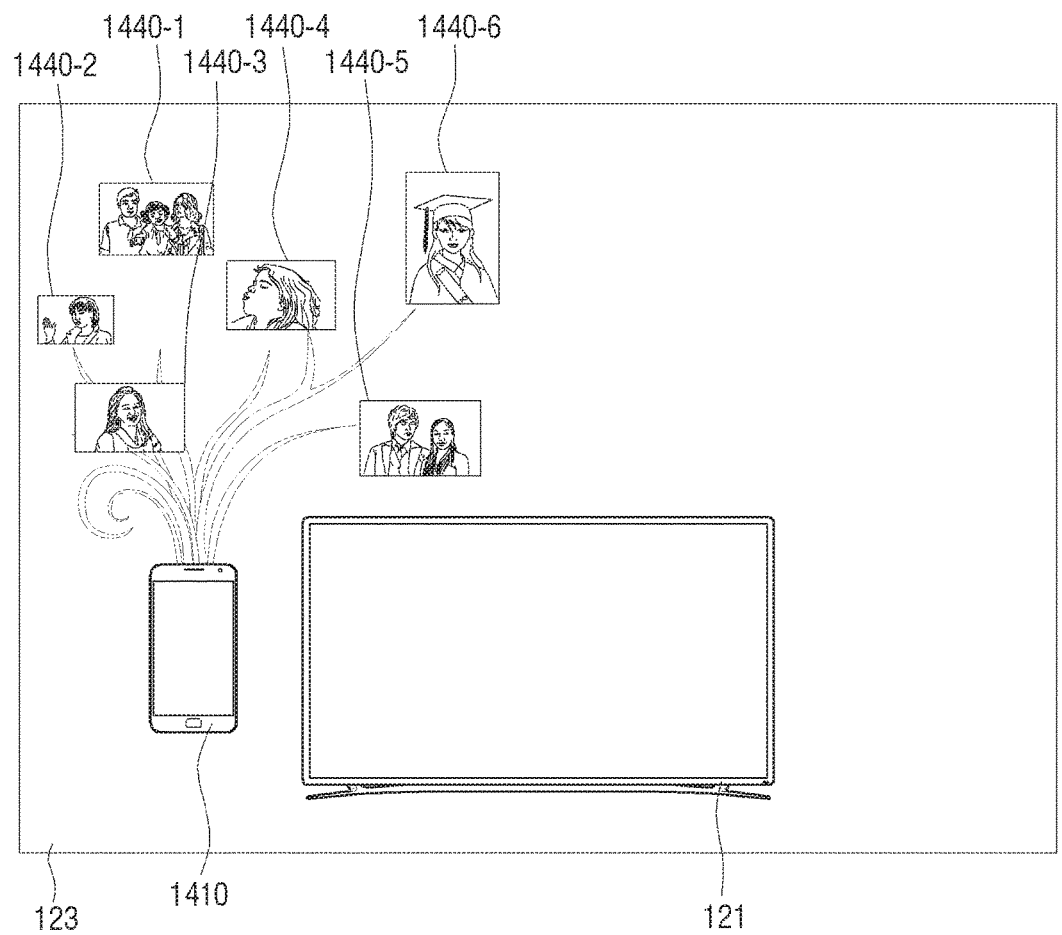

According to various embodiments of the present disclosure, as illustrated in FIG. 14B, when a user command to select the first mobile terminal icon 1410 is selected through the input unit 130 (e.g., in response to selection of the first mobile terminal icon 1410), from among a plurality of mobile terminal icons 1410-1430, the controller 140 may control the communicator 160 to transmit to the first mobile terminal 1200-2 a request signal requesting image content information, and receive image content information (e.g., thumbnail image information) responding to the request signal. Further, the controller 140, based on the received image content information may control the second display unit 123 to display the first mobile terminal icon 1410 at a side of the second display unit 123, and display the thumbnail images 1440-1 to 1440-6 of the image content stored in the first mobile terminal 1200-1 corresponding to the first mobile terminal icon 1410.

Figure 14C:
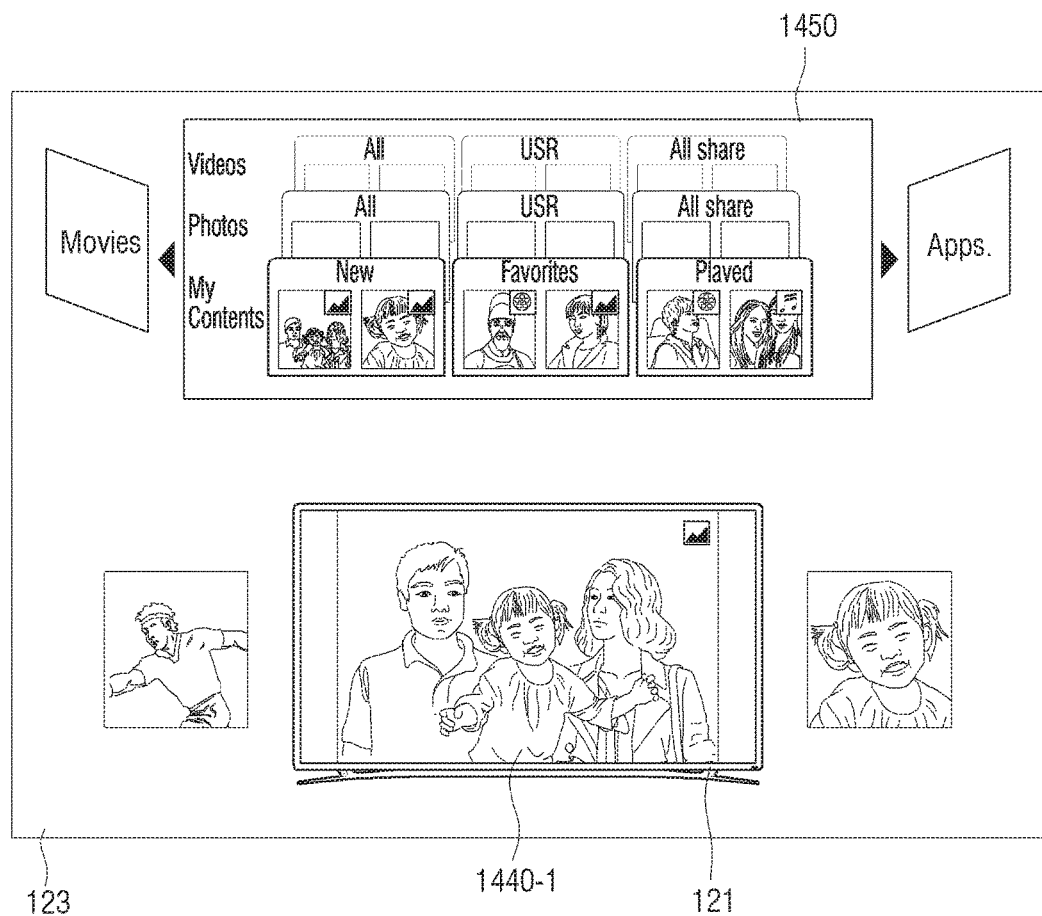

According to various embodiments of the present disclosure, as illustrated in FIG. 14C, when a user command to select the first thumbnail image 1440-1 from among the thumbnail images 1440-1 to 1440-6 of an image content stored in the first mobile terminal 1200-1 is input through the input unit 130 (e.g., in response to selection of the first thumbnail image 1440-1), the controller 140 may control the first display unit 121 to display the first thumbnail image 1440-1 on the first display unit 121, and the second display unit 123 to display the display item 1450 including my content folder at top of the second display unit 123.

In the above-mentioned various embodiments of the present disclosure, an embodiment of providing an image content stored in the mobile terminal has been described, but this is merely an example, and the display apparatus 100 may provide various content stored in the mobile terminal through the second display unit 123.

Figure 15A:
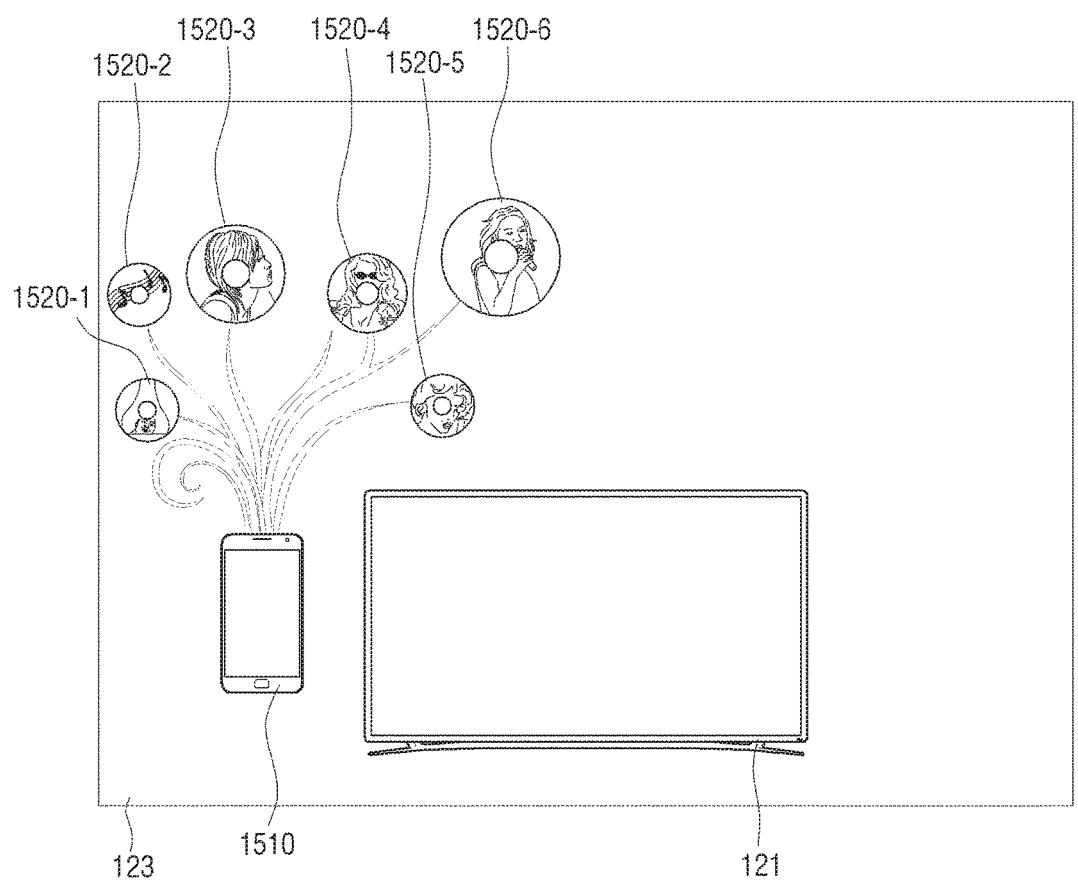

According to various embodiments of the present disclosure, as illustrated in FIG. 15A, when a plurality of music content are stored in the connected mobile terminal, the controller 140 may control the second display unit 123 to display a plurality of music icons 1520-1 to 1520-6 corresponding to music content stored in the mobile terminal. The controller 140 may control the second display unit 123 to display a mobile terminal icon 1510. The controller 140 may control the second display unit 123 to display an association between the mobile terminal icon 1510 and the plurality of music icons 1520-1 to 1520-6 corresponding to music content stored in the mobile terminal.

Figure 15B:
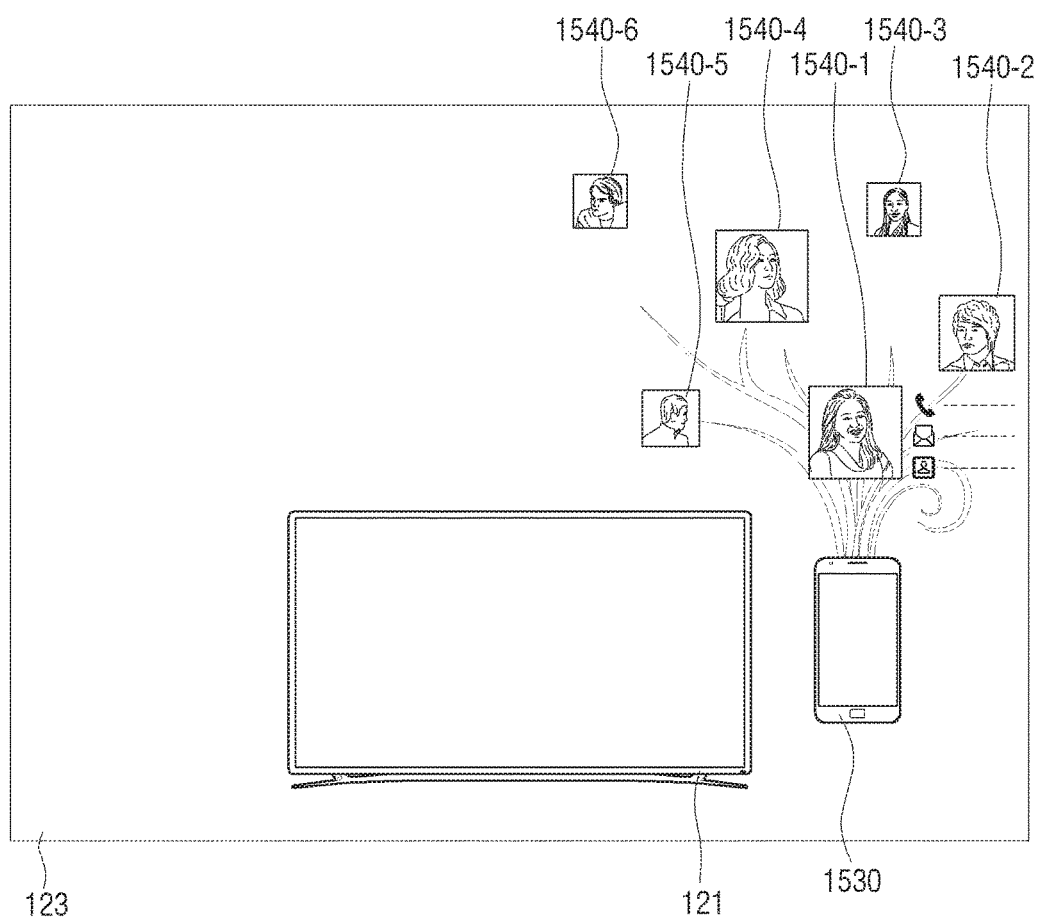

According to various embodiments of the present disclosure, as illustrated in FIG. 15B, when a plurality of SNS messages are received from the connected mobile terminal (e.g., in response to receiving a message from the connected mobile terminal), the controller 140 may control the second display unit 123 to display a plurality of icons 1540-1 to 1540-6 corresponding to the received SNS messages. The controller 140 may control the second display unit 123 to display a mobile terminal icon 1530. The controller 140 may control the second display unit 123 to display an association between the mobile terminal icon 1530 and the plurality of icons 1540-1 to 1540-6 corresponding to the received SNS messages.

In the aforementioned various embodiments, it has been described that an icon corresponding to the connected at least one mobile terminal is displayed on the second display unit 123, but this is merely an example, and, while the display apparatus 100 keeps the standby mode, an icon corresponding to at least one mobile terminal which is connected to an area of the first display unit 121 may be displayed.

Figure 16A:
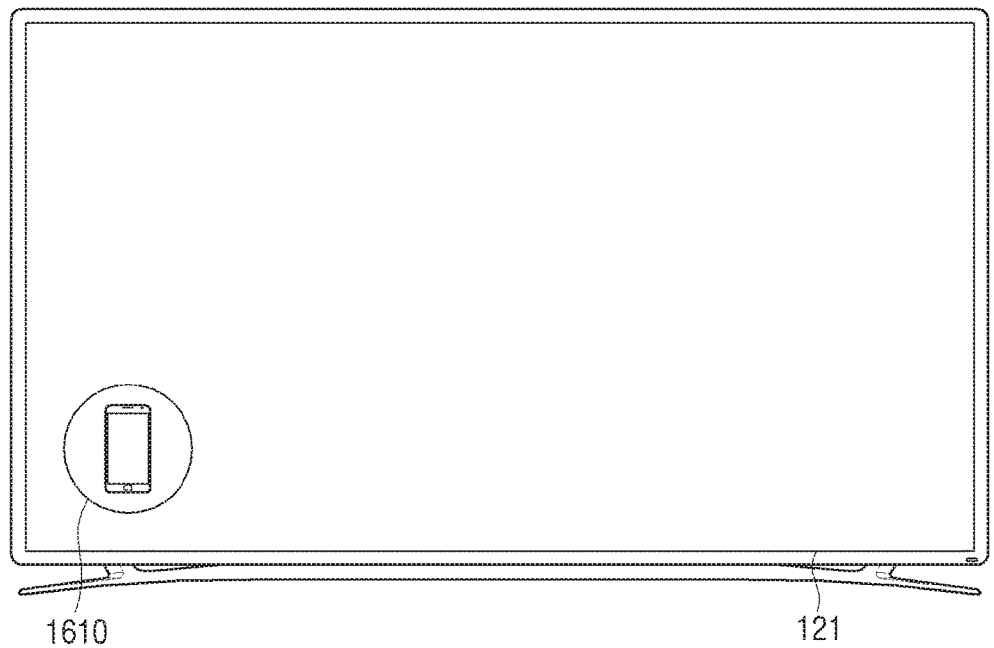

According to various embodiments of the present disclosure, as illustrated in FIG. 16A, while the display apparatus 100 keeps (e.g., is in) the standby mode, when one mobile terminal 1200-1 is connected to the display apparatus 100, the controller 140 may control the first display unit 121 to display a mobile terminal icon 1610 at bottom left of the first display unit 121. In this case, the mobile terminal icon 1610 may include an image corresponding to type of the first mobile terminal, but this is merely an example, and may include various information such as user information of the first mobile terminal.

Figure 16B:
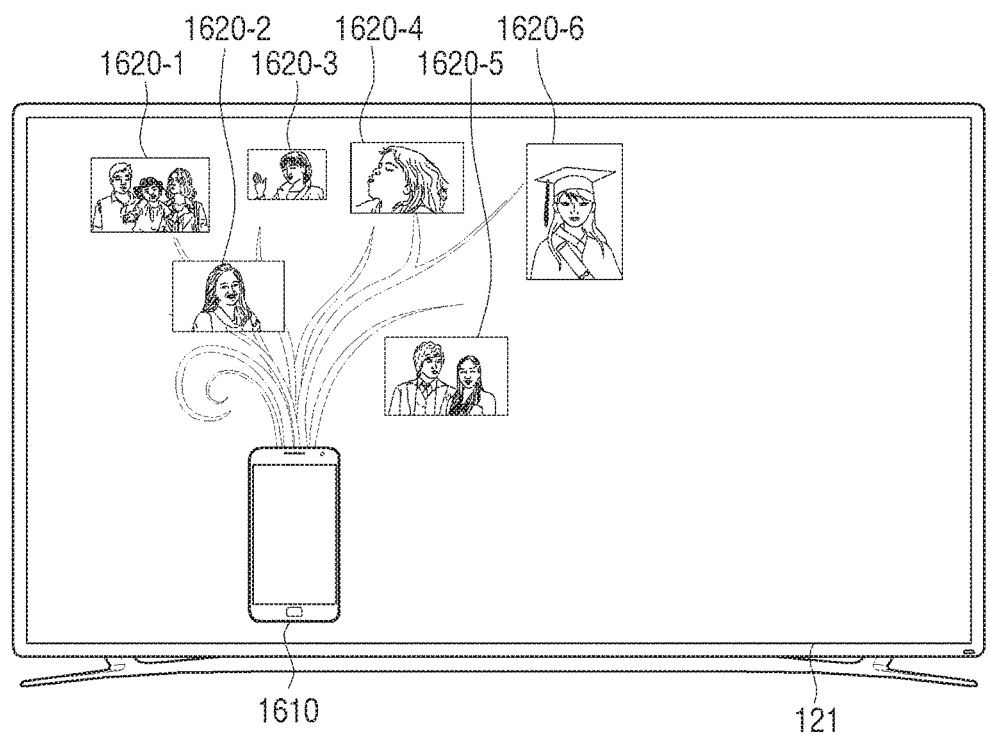

According to various embodiments of the present disclosure, when a user command to select the first mobile terminal icon 1610 is input through the input unit 130 (e.g., in response to selection of the first mobile terminal icon 1610), the controller 140 may control the communicator 160 to transmit to the first mobile terminal 1200-1 a request signal requesting image content information, and receive image content information (such as thumbnail image information) responding to the request signal. As illustrated in FIG. 16B, the controller 140, based on the received image content may control the first display unit 121 to reduce and display the first mobile terminal icon 1610, and display the thumbnail image 1620-1 to 1620-6 of the image content stored in the first mobile terminal 1200-1 corresponding to the first mobile terminal icon 1610. According to various embodiments of the present disclosure, the controller 140 may control the first display unit 121 to enlarge and display the first mobile terminal 1610.

Figure 16C:
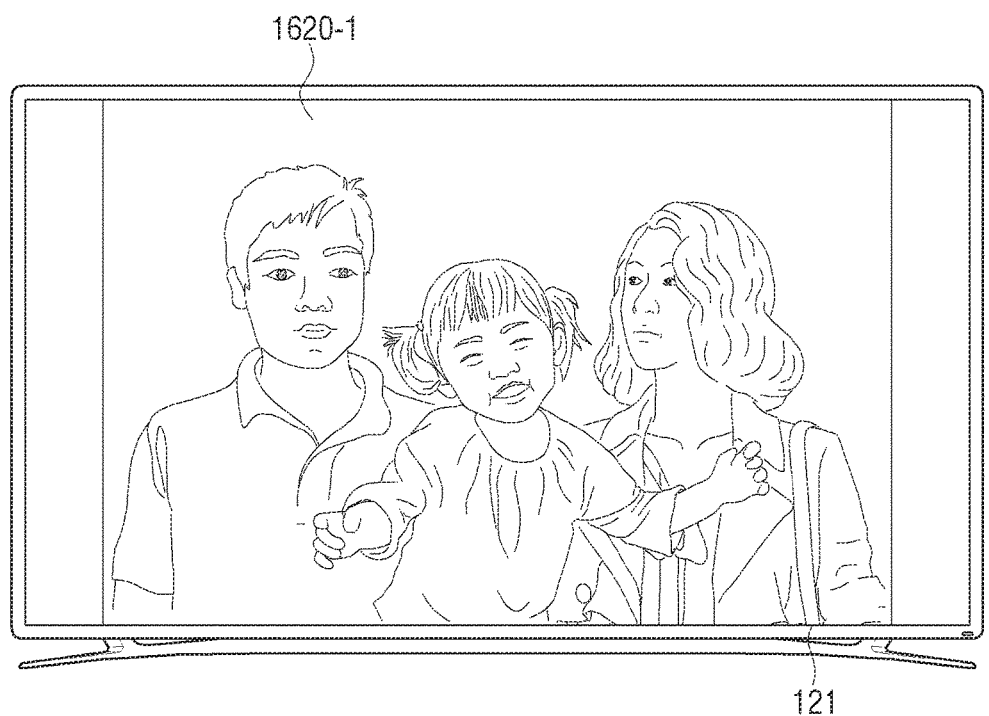

According to various embodiments of the present disclosure, as illustrated in FIG. 16C, when a command to select the first thumbnail image 1620-1 from among the thumbnail images 1620-1 to 1620-6 of the image content stored in the first mobile terminal 1200-1 is input through the input unit 130 (e.g., in response to selection of the first thumbnail image 1620-1), the controller 140 may control the first display unit 121 to display the first thumbnail image 1620-1.

Figure 16D:
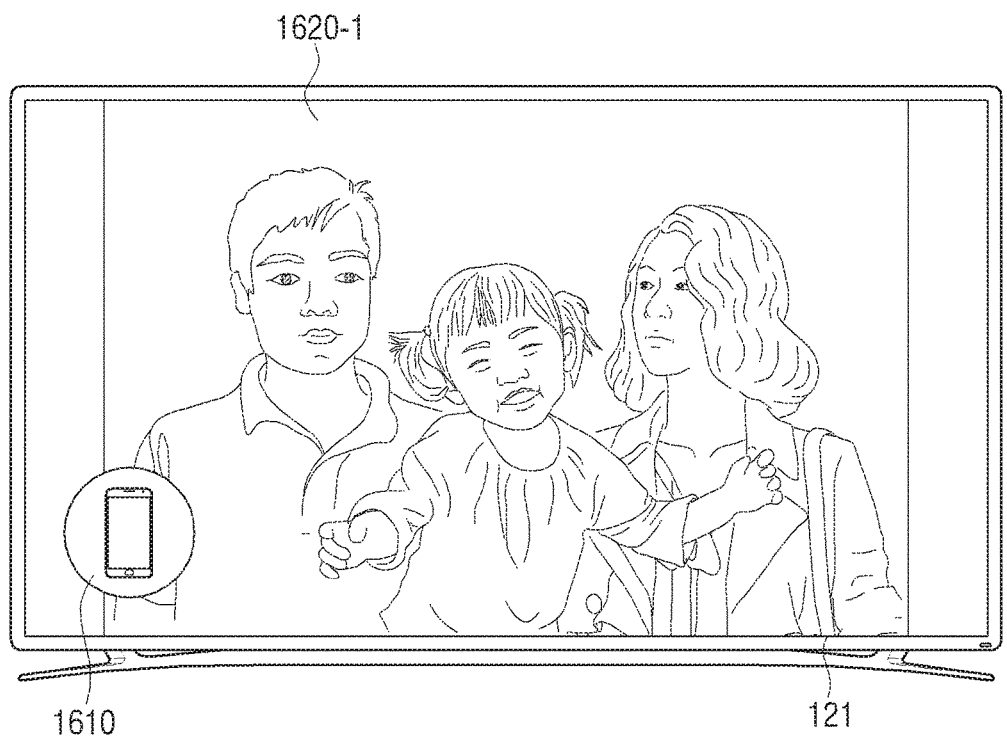

According to various embodiments of the present disclosure, as illustrated in FIG. 16D, the controller 140 may control the first display unit 121 to display the selected first mobile terminal icon 1610 along with the first thumbnail image 1620-1. For example, the controller 140 may control the first display unit 121 to provide an indication of the device (e.g., the first mobile terminal 1200-1) from which the content associated with the first thumbnail image 1620-1 was received. According to various embodiments of the present disclosure, the controller 140 may control the first display unit 121 to display a content list stored in the first mobile terminal 1200-1 corresponding to the first mobile terminal icon 1610.

Figure 17A:
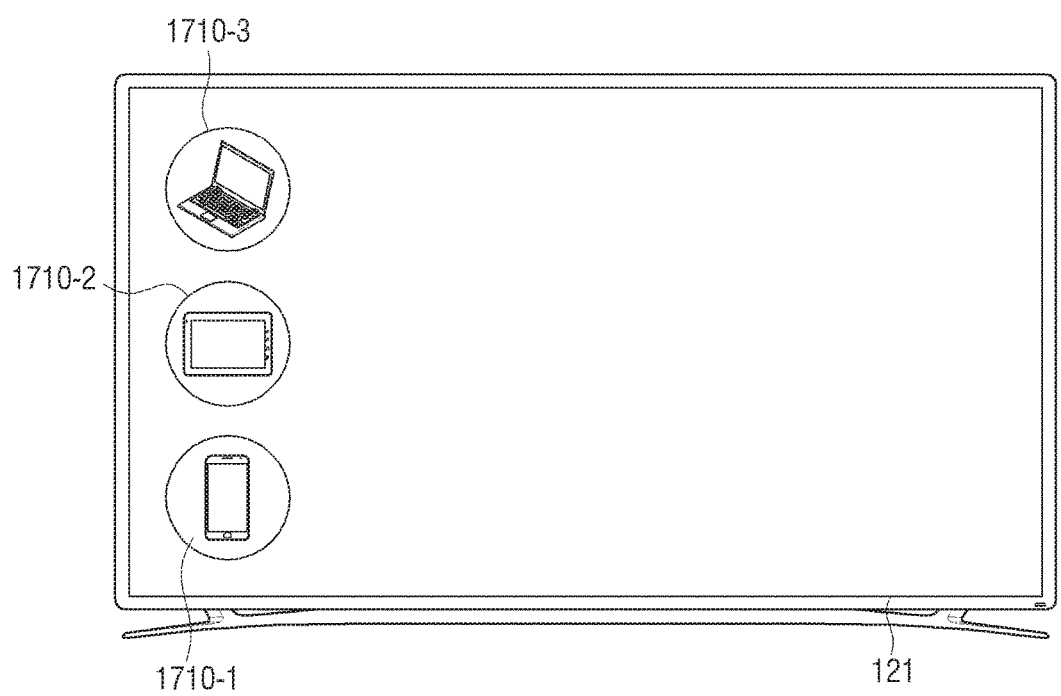

According to various embodiments of the present disclosure, as illustrated in FIG. 17A, while the display apparatus 100 keeps standby mode, when the plurality of mobile terminals 1200-1 to 1200-3 are connected to the display apparatus 100 (e.g., in response to one or more of the plurality of mobile terminals 1200-1 to 1200-3 being connecting the display apparatus 100), the controller 140 may control the first display unit 121 to display a plurality of mobile terminal icons 1710-1 to 1710-3 which correspond to the plurality of mobile terminals 1200-1 to 1200-3 to the left of the first display unit 121. In this case, the plurality of mobile terminal icons 1710-1 to 1710-3 may include an image corresponding to type of the mobile terminal, but this is merely an example, and may include various information such as user information of the first mobile terminal.

Figure 17B:
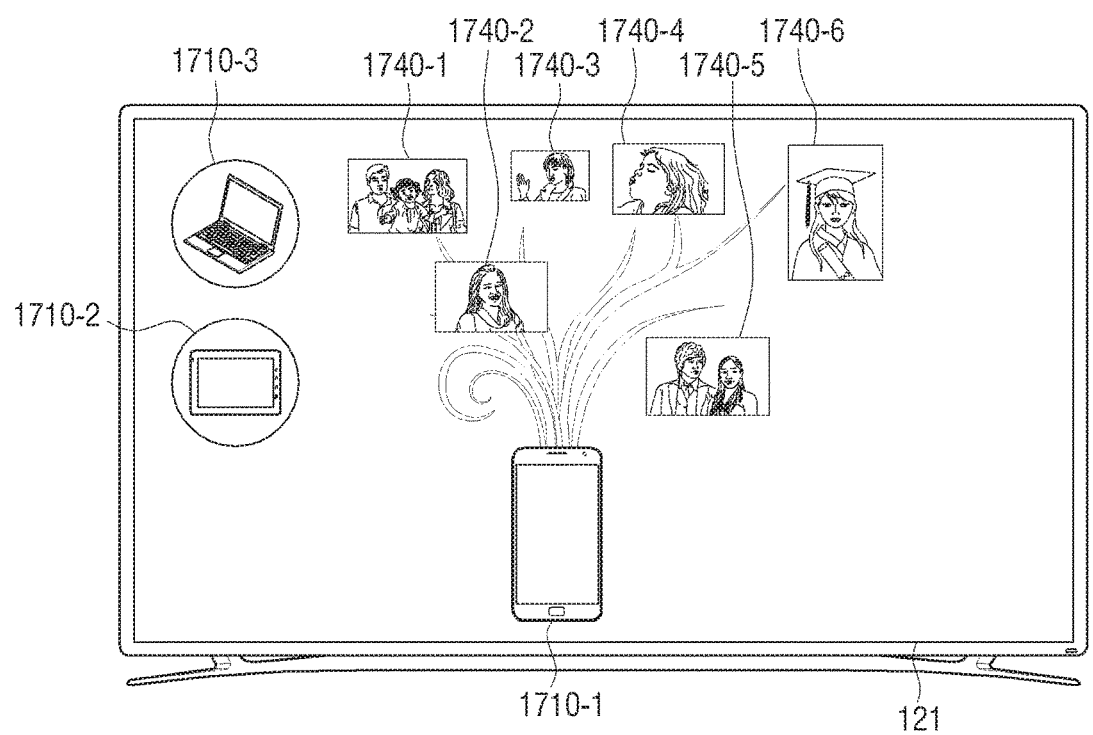

According to various embodiments of the present disclosure, when a user command to select the first mobile terminal icon 1710-1 is input through the input unit 130 (e.g., in response to selection of the first mobile terminal icon 1710-1), the controller 140 may control the communicator 160 to transmit to the first mobile terminal 1200-1 a request signal requesting image content information, and receive image content information (such as thumbnail image information) responding to the request signal. As illustrated in FIG. 17B, the controller 140, based on the received image content may control the first display unit 121 to reduce and display the first mobile terminal icon 1710-1, and display the thumbnail image 1740-1 to 1740-6 of the image content stored in the first mobile terminal 1200-1 corresponding to the first mobile terminal icon 1710-1. According to various embodiments of the present disclosure, the controller 140 may control the first display unit 121 to enlarge and display the first mobile terminal 1710.

Figure 17C:
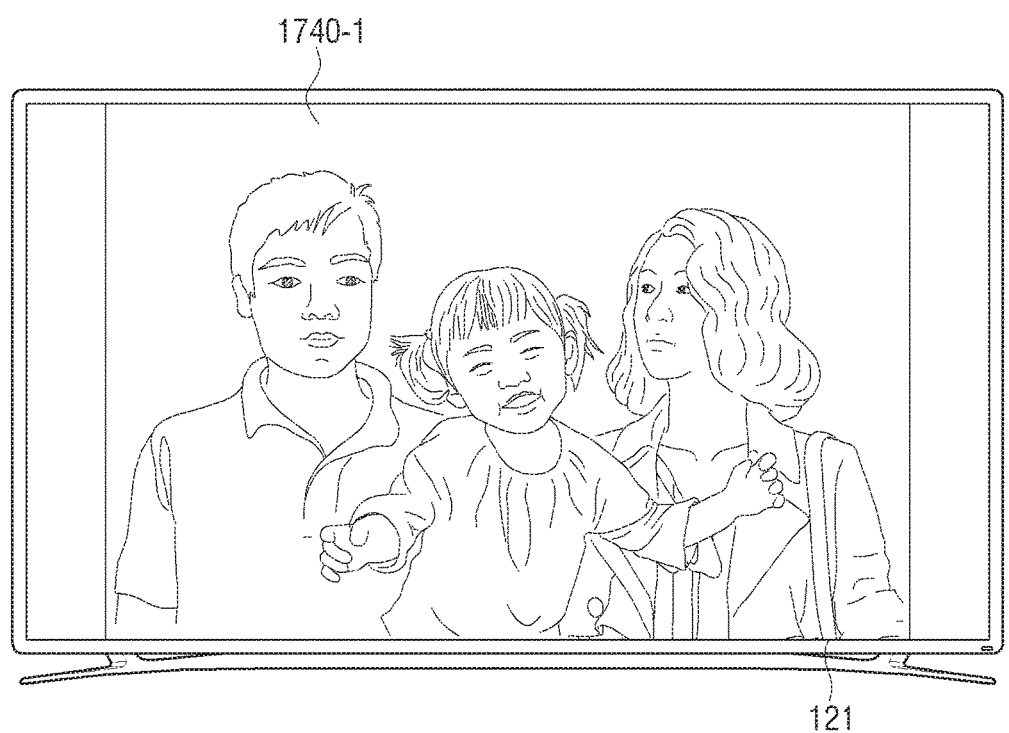
Figure 17D:
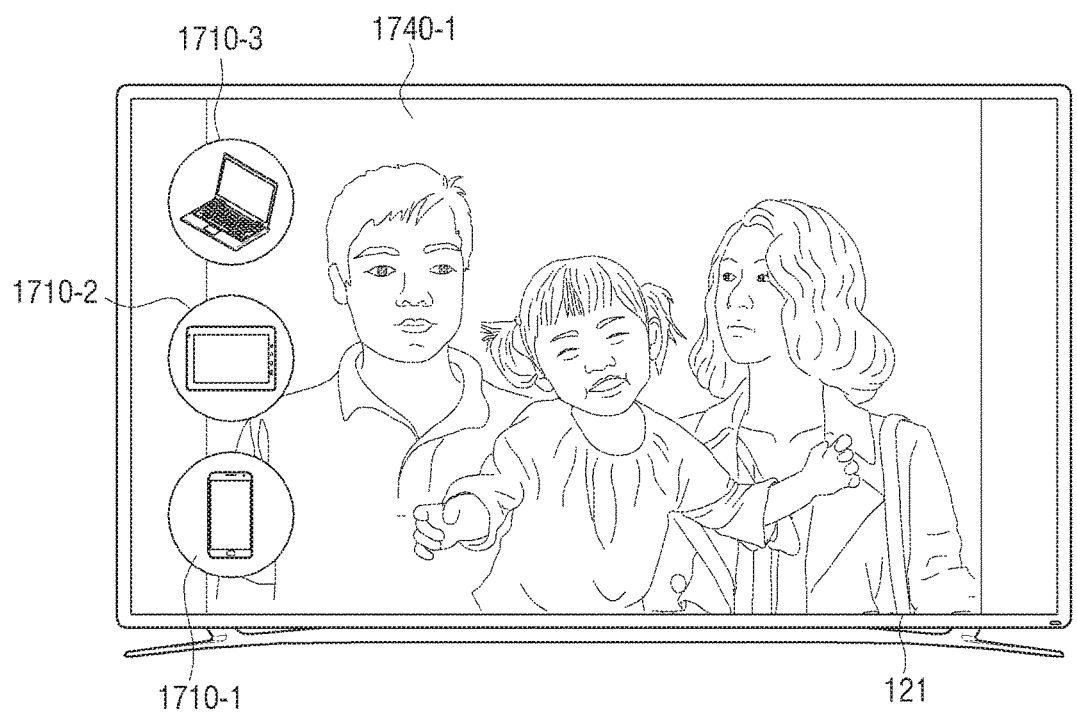

According to various embodiments of the present disclosure, as illustrated in FIG. 17C, when a user command to select the first thumbnail image 1740-1 from among the thumbnail images 1740-1 to 1740-6 of the image content stored in the first mobile terminal 1200-1 is input through the input unit 130 (e.g., in response to selection of the first thumbnail image 1740-1), the controller 140 may control the first display unit 121 to display the first thumbnail image 1740-1.

According to various embodiments of the present disclosure, as illustrated in FIG. 17C, the controller 140 may control the first display unit 121 to display the selected first mobile terminal icon 1710-1 along with the first thumbnail image 1740-1. According to various embodiments of the present disclosure, the controller 140 may control the first display unit 121 to display a content list stored in the first mobile terminal 1200-1 corresponding to the first mobile terminal icon 1710-1.

In the above-mentioned various embodiments, it has been described that, while the display apparatus 100 keeps (e.g., is in) the standby mode, an icon corresponding to at least one mobile terminal is displayed on the first display 110, but this is merely an example, and, while the display apparatus 100 displays an image content through the first display unit 100, an icon corresponding to at least one mobile terminal may be displayed on the first display unit 121.

Figure 18A:
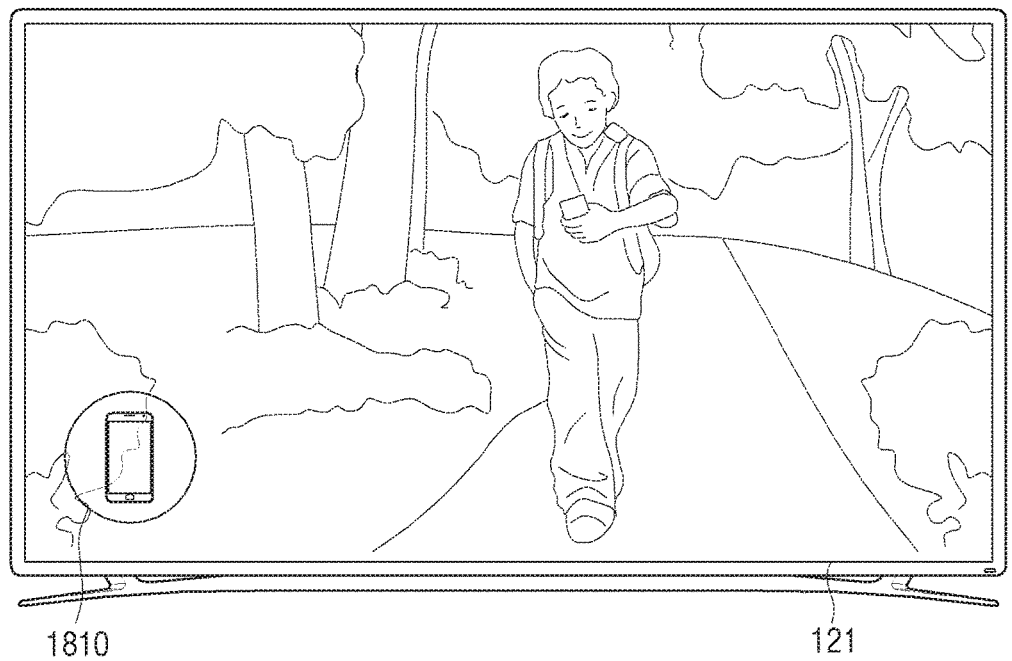

According to various embodiments of the present disclosure, as illustrated in FIG. 18A, while the display apparatus 100 displays an image content through the first display unit 121, when one mobile terminal 1200-1 is connected to the display apparatus 100 (e.g., in response to the first mobile terminal 1200-1 being connected to the display apparatus 100), the controller 140 may control the first display unit 121 to darken a displayed image content and display the mobile terminal icon 1810 corresponding to the first mobile terminal 1200-1 at bottom left of the first display unit 121. In this case, the mobile terminal icon 1810 may include an image corresponding to type of the first mobile terminal, but this is merely an example, and may include various information such as user information of the first mobile terminal.

Figure 18B:
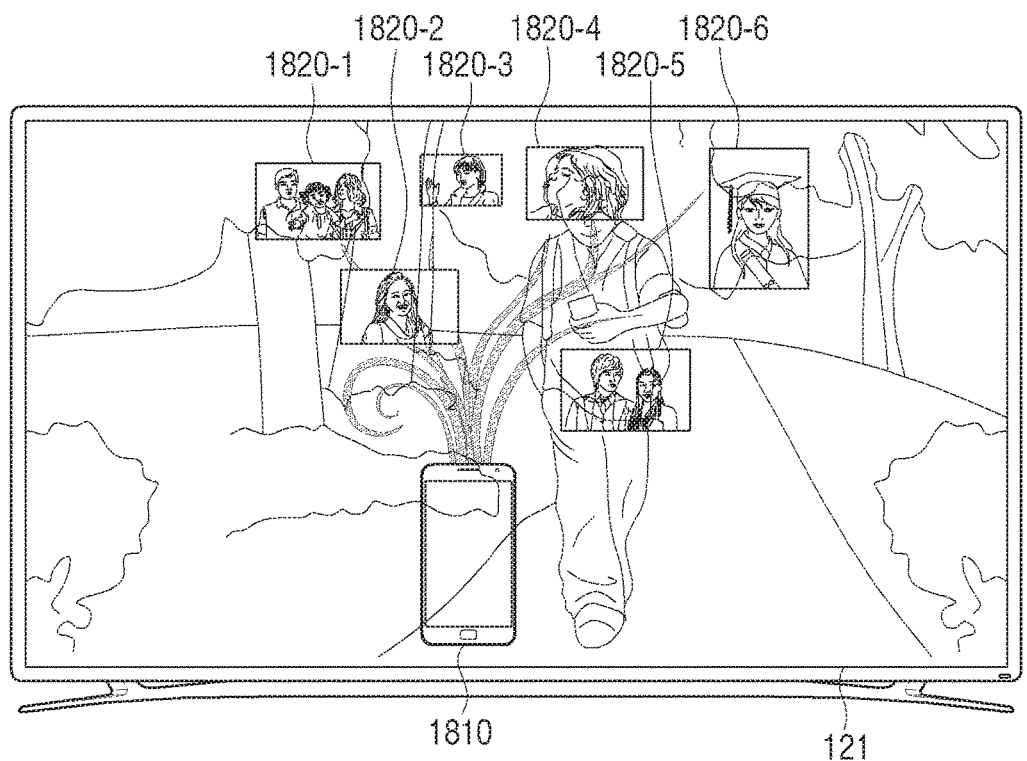

According to various embodiments of the present disclosure, when a user command to select the first mobile terminal icon 1810 is input through the input unit 130 (e.g., in response to selection of the first mobile terminal icon 1810), the controller 140 may control the communicator 160 to transmit to the first mobile terminal 1200-1 a request signal requesting image content information, and receive image content information (such as thumbnail image information) responding to the request signal. As illustrated in FIG. 18B, the controller 140, based on the received image content may control the first display unit 121 to reduce and display the first mobile terminal icon 1810, and display the thumbnail image 1820-1 to 1820-6 of the image content stored in the first mobile terminal 1200-1 corresponding to the first mobile terminal icon 1810. According to various embodiments of the present disclosure, the controller 140 may control the first display unit 121 to enlarge and display the first mobile terminal 1810.

Figure 18C:
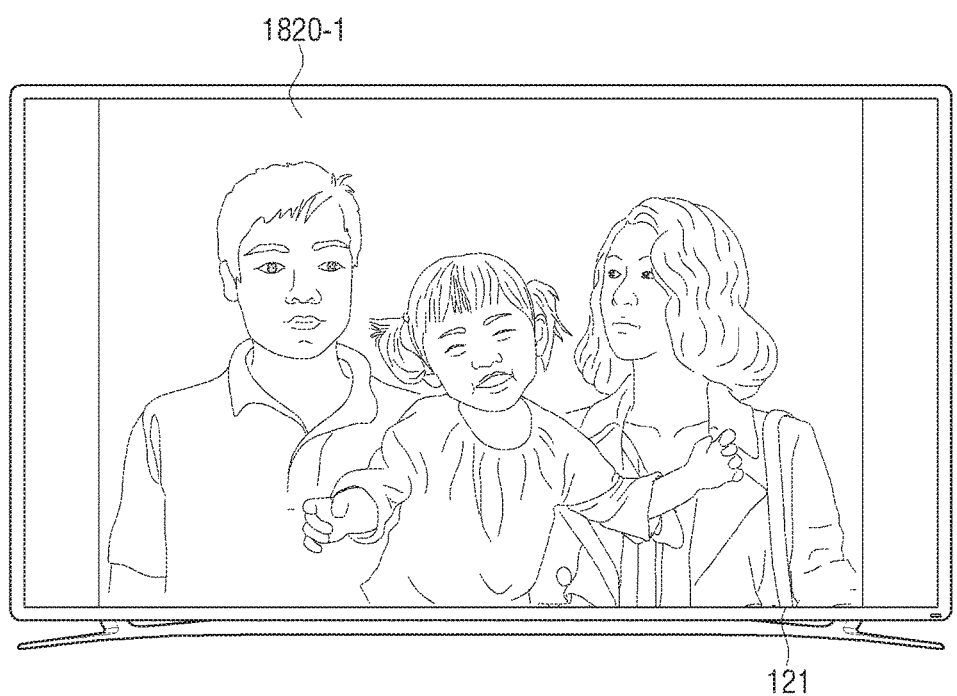

According to various embodiments of the present disclosure, as illustrated in FIG. 18C, when a user command to select the first thumbnail image 1820-1 from among the thumbnail images 1820-1 to 1820-6 of the image content stored in the first mobile terminal 1200-1 is input through the input unit 130 (e.g., in response to selection of the first thumbnail image 1820-1), the controller 140 may control the first display unit 121 to display the first thumbnail image 1820-1.

Figure 18D:
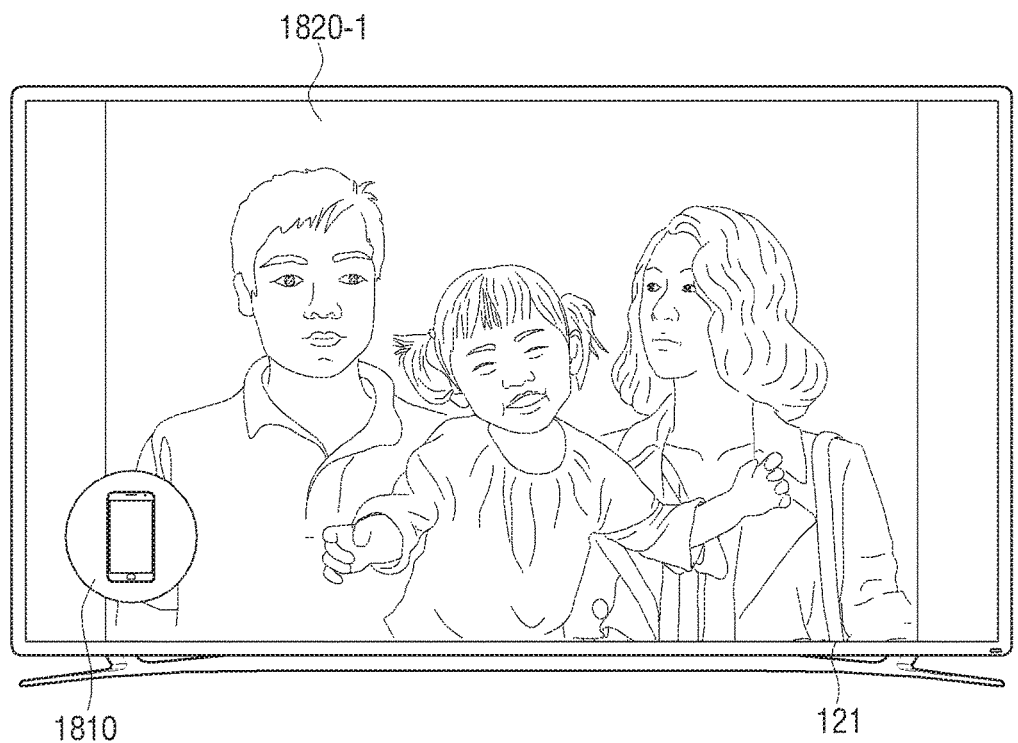

According to various embodiments of the present disclosure, as illustrated in FIG. 18D, the controller 140 may control the first display unit 121 to display the selected first mobile terminal icon 1810 along with the first thumbnail image 1820-1.

According to various embodiments of the present disclosure, the controller 140 may control the first display unit 121 to display a content list stored in the first mobile terminal 1200-1 corresponding to the first mobile terminal icon 1810.

Figure 19A:
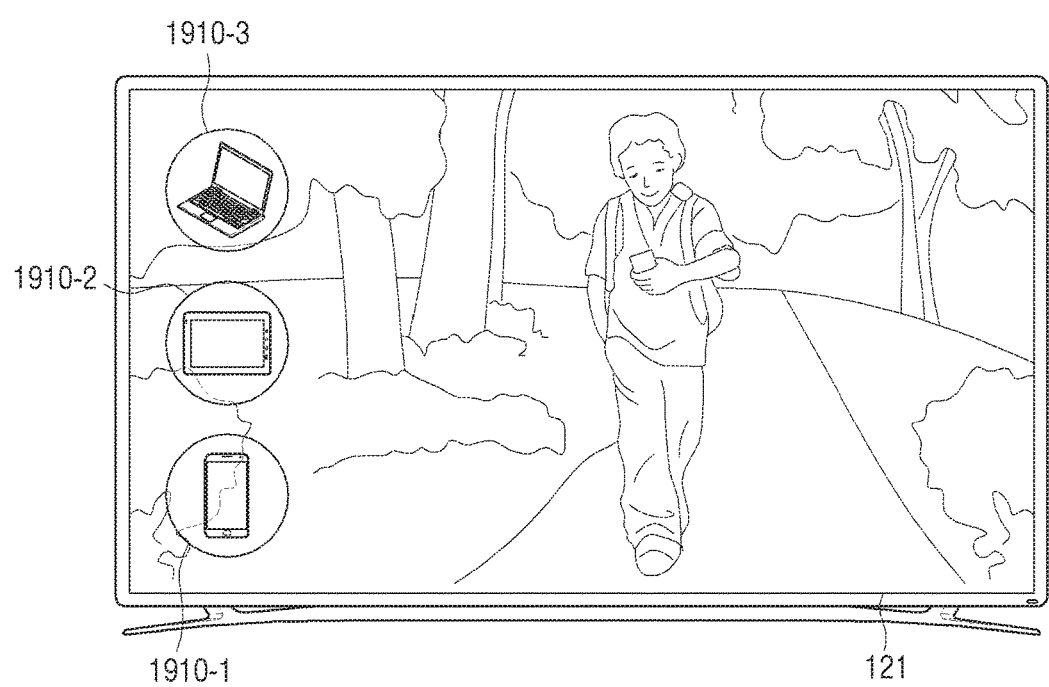

According to various embodiments of the present disclosure, as illustrated in FIG. 19A, while the display apparatus 100 display an image content through the first display unit 121, when a plurality of mobile terminals 1200-1 to 1200-3 are connected to the display apparatus 100 (e.g., in response to one or more of the plurality of mobile terminals 1200-1 to 1200-3 being connected to the display apparatus 100), the controller 140 may control the first display unit 121 to darken a currently-displayed image content, and display the mobile terminal icons 1910-1 to 1910-3 corresponding to a plurality of mobile terminals 1200-1 to 1200-3 at the left of the first display unit 121. According to various embodiments of the present disclosure, the plurality of mobile terminal icons 1910-1 to 1910-3 may include an image corresponding to type of the mobile terminal, but this is merely an example, and may include various information such as user information of the first mobile terminal. According to various embodiments of the present disclosure, the controller 140 may control the first display unit 121 to display one or more of the mobile terminal icons 1910-1 to 1910-3 corresponding to a plurality of mobile terminals 1200-1 to 1200-3 so as to be over-laid with the currently-displayed image content (e.g., a background wallpaper, and/or the like).

Figure 19B:
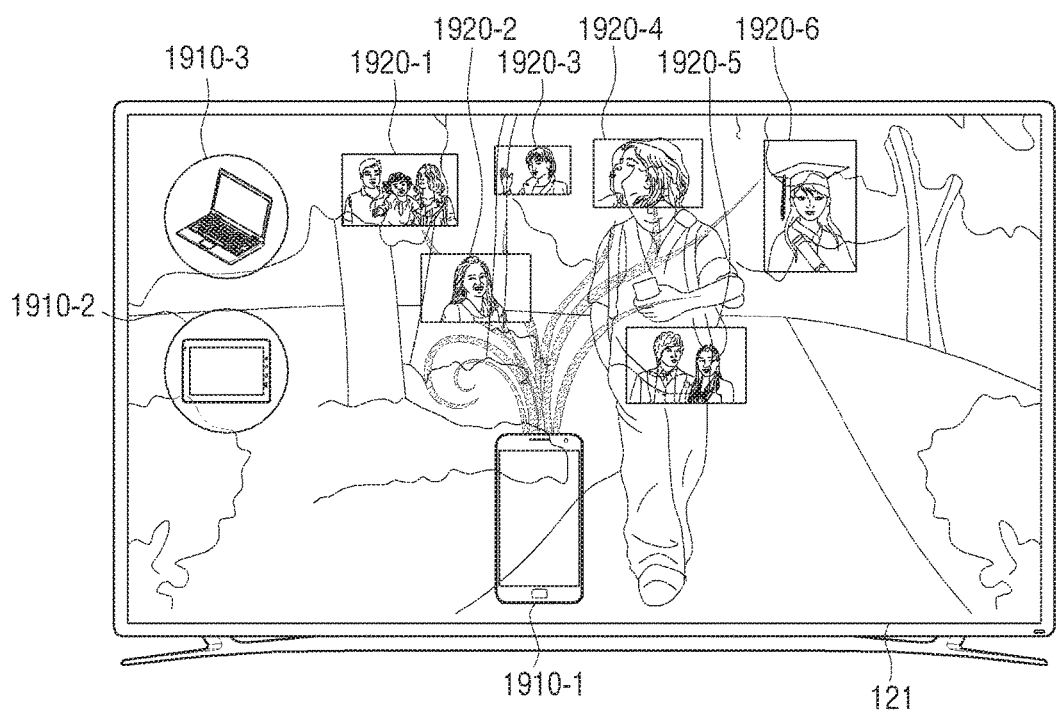

According to various embodiments of the present disclosure, when a user command to select the first mobile terminal icon 1910-1 is input through the input unit 130 (e.g., in response to selection of the first mobile terminal icon 1910-1), the controller 140 may control the communicator 160 to transmit to the first mobile terminal 1200-1 a request signal requesting image content information, and receive image content information (e.g., thumbnail image information, and/or the like). As illustrated in FIG. 19B, the controller 140, based on the received image content, may control the first display unit 121 to reduce and display the first mobile terminal icon 1910-1, and display the thumbnail images 1920-1 to 1920-6 of the image content stored in the first mobile terminal 1200-1 which correspond to the first mobile terminal icon 1910-1. According to various embodiments of the present disclosure, the controller 140 may control the first display unit 121 to enlarge and display the first mobile terminal 1910. According to various embodiments of the present disclosure, the controller 140 may control the first display unit 121 to display one or more of the thumbnail images 1920-1 to 1920-6 of the image content stored in the first mobile terminal 1200-1 which correspond to the first mobile terminal icon 1910-1 so as to be over-laid with the currently-displayed image content (e.g., a background wallpaper, and/or the like).

Figure 19C:
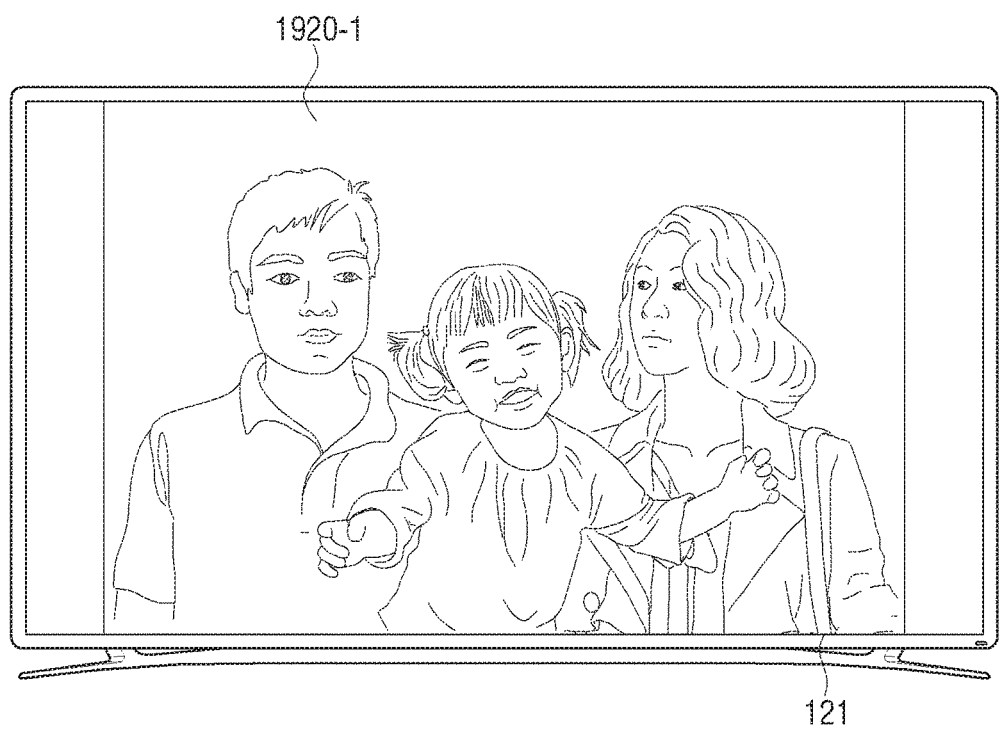

According to various embodiments of the present disclosure, as illustrated in FIG. 19C, when a user command to select the first thumbnail image 1920-1 from among the thumbnail images 1920-1 to 1920-6 stored in the first mobile terminal 1200-1 is input through the input unit 130 (e.g., in response to selection of the first thumbnail image 1920-1), the controller 140 may control the first display unit 121 to display the first thumbnail image 1920-1.

Figure 19D:
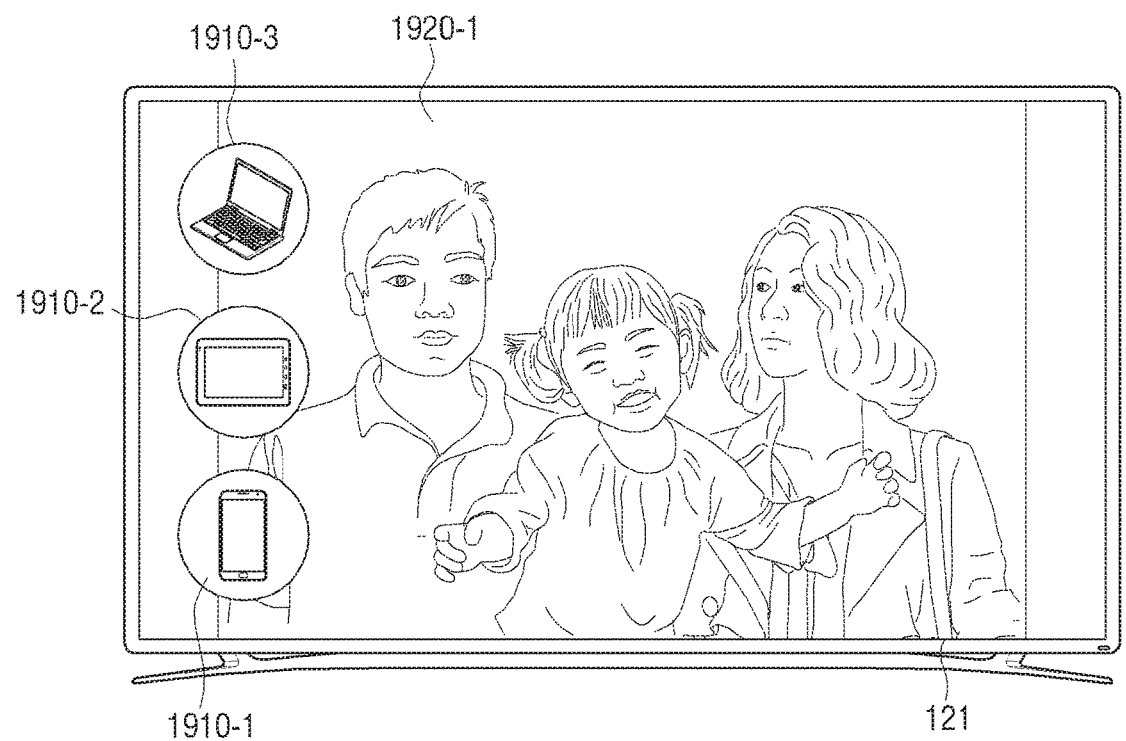

According to various embodiments of the present disclosure, as illustrated in FIG. 19D, the controller 140 may control the first display unit 121 to display the selected first mobile terminal icon 1910-1 along with the first thumbnail image 1920-1.

According to various embodiments of the present disclosure, the controller 140 may control the first display unit 121 to display a content list stored in the first mobile terminal 1200-1 corresponding to the first mobile terminal icon 1910-1. It has been described in the above-mentioned various embodiments that information on content stored in at least one mobile terminal is provided through the first display unit 121, but information on the content stored in that at least one mobile terminal may be provided by using both of the first display unit 121 and the second display unit 123.

Figure 20A:
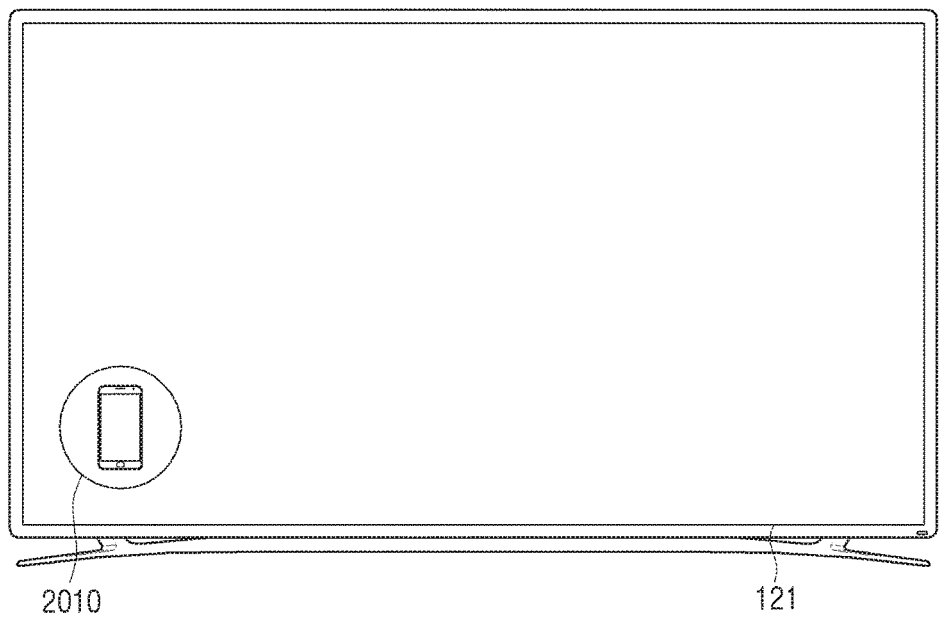

According to various embodiments of the present disclosure, as illustrated in FIG. 20A, while the display apparatus 100 keeps the standby mode, when one mobile terminal 1200-1 is connected to the display apparatus 100 (e.g., in response to the first mobile terminal 1200-1 being connected to the display apparatus 100), the controller 140, may control the first display unit 121 to display a mobile terminal icon 2010 at bottom left of the first display unit 121. The mobile terminal icon 2010 may correspond to the first mobile terminal 1200-1.

Figure 20B:
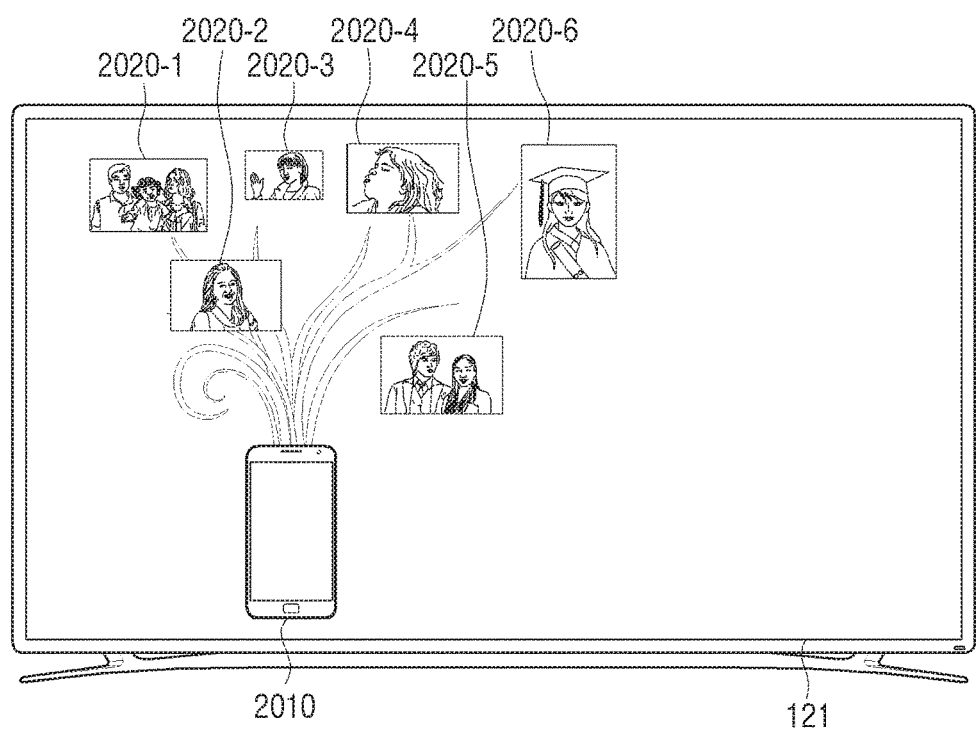

According to various embodiments of the present disclosure, when a user command to select the first mobile terminal icon 2010 is input through the input unit 130 (e.g., in response to selection of the first mobile terminal icon 2010), the controller 140 may control the communicator 160 to transmit to the first mobile terminal 1200-1 a request signal requesting image content information, and receive image content information (such as thumbnail image information) responding to the request signal. As illustrated in FIG. 20B, the controller 140, based on the received image content may control the first display unit 121 to reduce and display the first mobile terminal icon 2010, and display the thumbnail image 2020-1 to 2020-6 of the image content stored in the first mobile terminal 1200-1 corresponding to the first mobile terminal icon 2010. According to various embodiments of the present disclosure, the controller 140 may control the first display unit 121 to enlarge and display the first mobile terminal 2010.

Figure 20C:
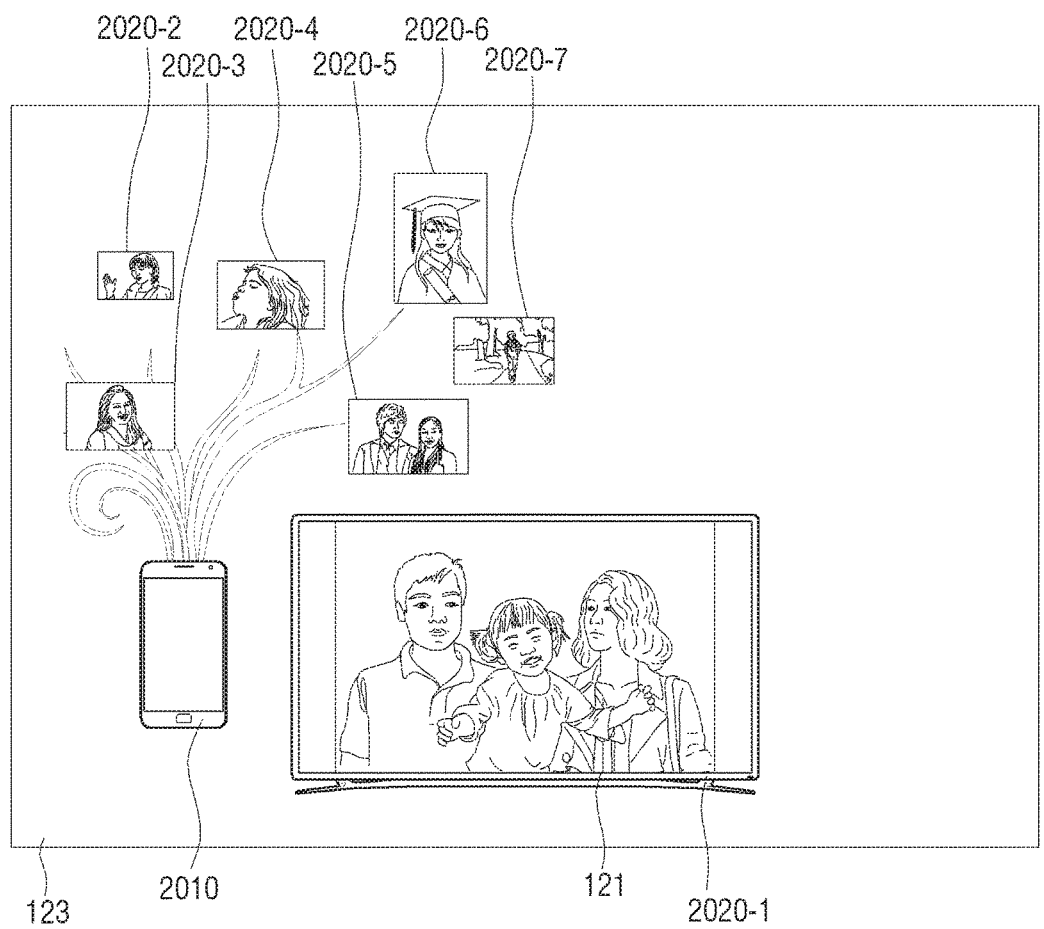

According to various embodiments of the present disclosure, as illustrated in FIG. 20C, when a user command to select the first thumbnail image 2020-1 from among the thumbnail images 2020-1 to 2020-6 of the image content stored in the first mobile terminal 1200-1 is input through the input unit 130 (e.g., in response to selection of the first thumbnail image 2020-1), the controller 140 may control the first display unit 121 to display the first thumbnail image 2020-1. The controller may control the second display unit 123 to display the first mobile terminal icon 2010 corresponding to the first mobile terminal 1200-1 and a plurality of thumbnail images 2020-2 to 2020-7 of image content stored in the first mobile terminal 1200-1.

Figure 21A:
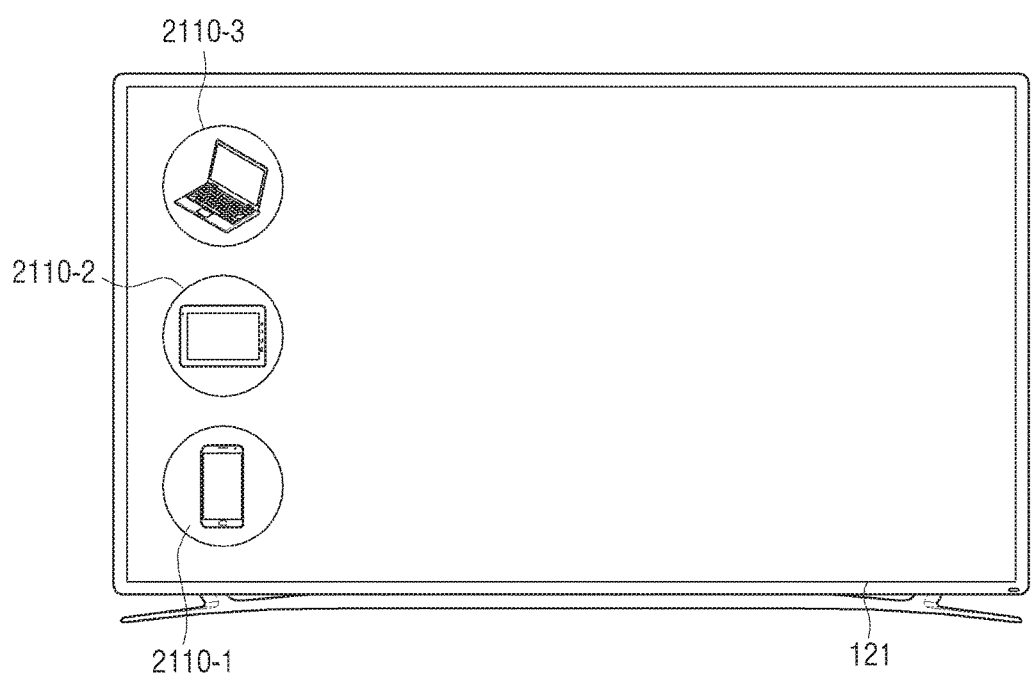

According to various embodiments of the present disclosure, as illustrated in FIG. 21A, while the display apparatus 100 keeps standby mode, when the plurality of mobile terminals 1200-1 to 1200-3 are connected to the display apparatus 100 (e.g., in response to one or more of the plurality of mobile terminals 1200-1 to 1200-3 being connected to the display apparatus 100), the controller 140 may control the first display unit 121 to display a plurality of mobile terminal icons 2110-1 to 2110-3 which correspond to the plurality of mobile terminals 1200-1 to 1200-3 to the left of the first display unit 121.

Figure 21B:
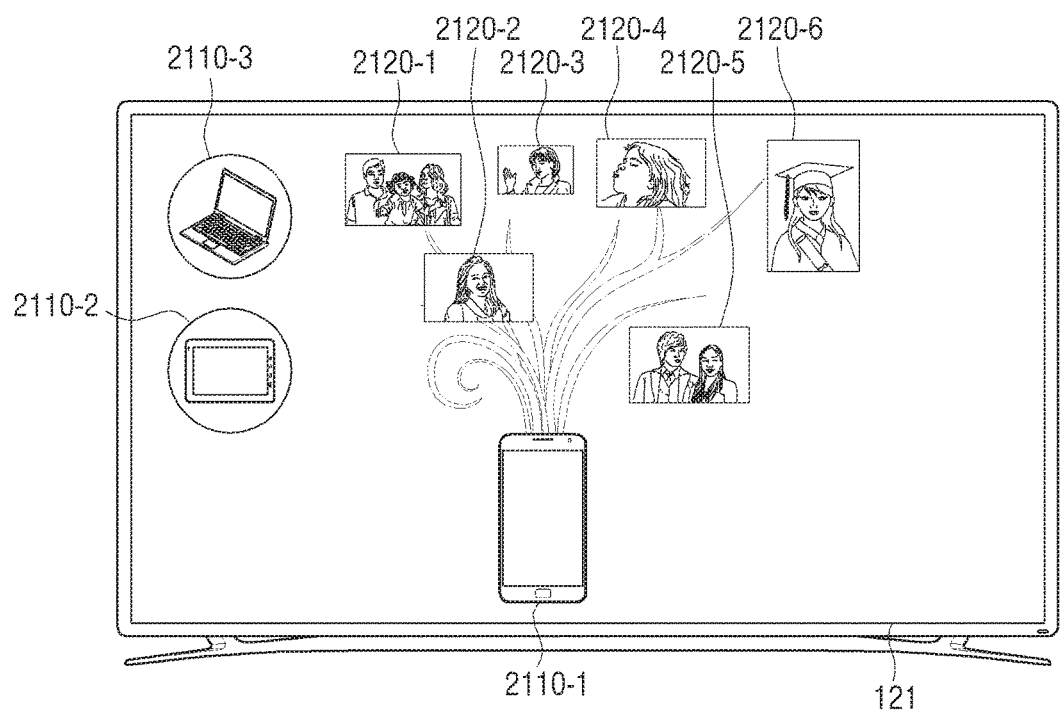

According to various embodiments of the present disclosure, when a user command to select the first mobile terminal icon 2110-1 is input through the input unit 130 (e.g., in response to selection of the first mobile terminal icon 2110-1), the controller 140 may control the communicator 160 to transmit to the first mobile terminal 1200-1 a request signal requesting image content information, and receive image content information (such as thumbnail image information) responding to the request signal. As illustrated in FIG. 21B, controller 140, based on the received image content may control the first display unit 121 to reduce and display the first mobile terminal icon 2110-1, and display the thumbnail image 2120-1 to 2120-6 of the image content stored in the first mobile terminal 1200-1 corresponding to the first mobile terminal icon 2110-1. According to various embodiments of the present disclosure, the controller 140 may control the first display unit 121 to enlarge and display the first mobile terminal 2110.

Figure 21C:
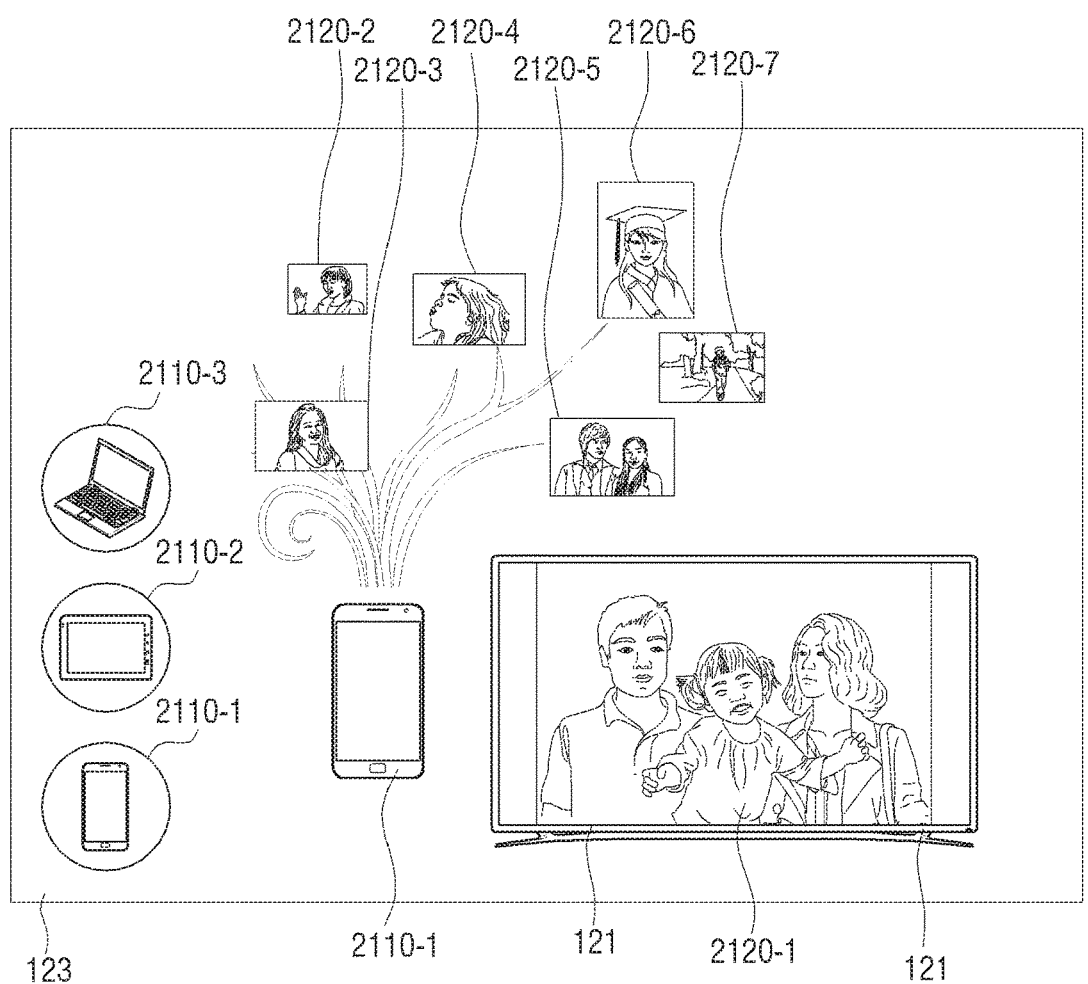

According to various embodiments of the present disclosure, as illustrated in FIG. 21C, when a user command to select the first thumbnail image 2120-1 from among the thumbnail images 2120-1 to 2120-6 of the image content stored in the first mobile terminal 1200-1 is input through the input unit 130 (e.g., in response to selection of the first thumbnail image 2120-1), the controller 140 may control the first display unit 121 to display the first thumbnail image 2020-1. The controller may control the second display unit 123 to display the first mobile terminal icon 2110-1 corresponding to the first mobile terminal 1200-1 and a plurality of thumbnail images 2120-2 to 2120-7 of an image content stored in the first mobile terminal 1200-1.

Figure 22A:
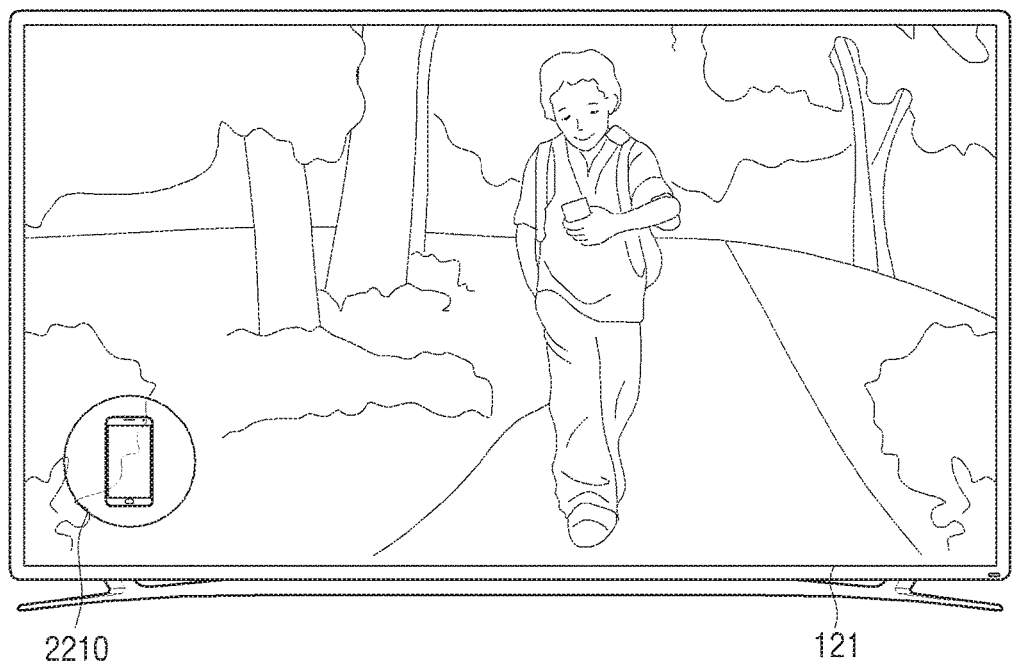

According to various embodiments of the present disclosure, as illustrated in FIG. 22A, while the display apparatus 100 display an image content through the first display unit 121, when one mobile terminal 1200-1 is connected to the display apparatus 100 (e.g., in response to the first mobile terminal 1200-1 being connected to the display apparatus 100), the controller 140 may control the first display unit 121 to darken a displayed image content, and display the mobile terminal icon 2210 corresponding to the first mobile terminal 1200-1 at the left of the first display unit 121. According to various embodiments of the present disclosure, the controller 140 may control the first display unit 121 to display the mobile terminal icon 2210 corresponding to the first mobile terminals 1200-1 so as to be over-laid with the currently-displayed image content (e.g., a background wallpaper, and/or the like).

According to various embodiments of the present disclosure, when a user command to select the first mobile terminal icon 2210 is input through the input unit 130 (e.g., in response to selection of the first mobile terminal icon 2210), the controller 140 may control the communicator 160 to transmit to the first mobile terminal 1200-1 a request signal requesting image content information, and receive image content information (such as thumbnail image information) responding to the request signal.

Figure 22B:
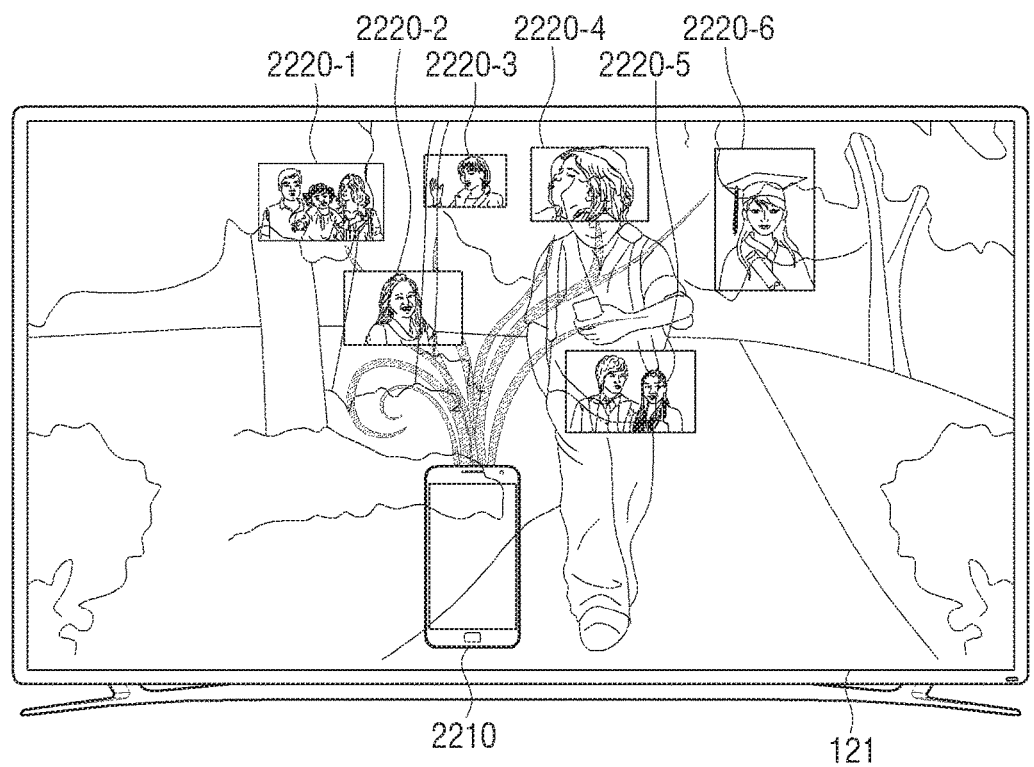

According to various embodiments of the present disclosure, as illustrated in FIG. 22B, the controller 140, based on the received image content, may control the first display unit 121 to reduce and display the first mobile terminal icon 2210, and display the thumbnail image 2220-1 to 2220-6 of the image content stored in the first mobile terminal 1200-1 corresponding to the first mobile terminal icon 2210. According to various embodiments of the present disclosure, the controller 140 may control the first display unit 121 to enlarge and display the first mobile terminal 2210.

Figure 22C:
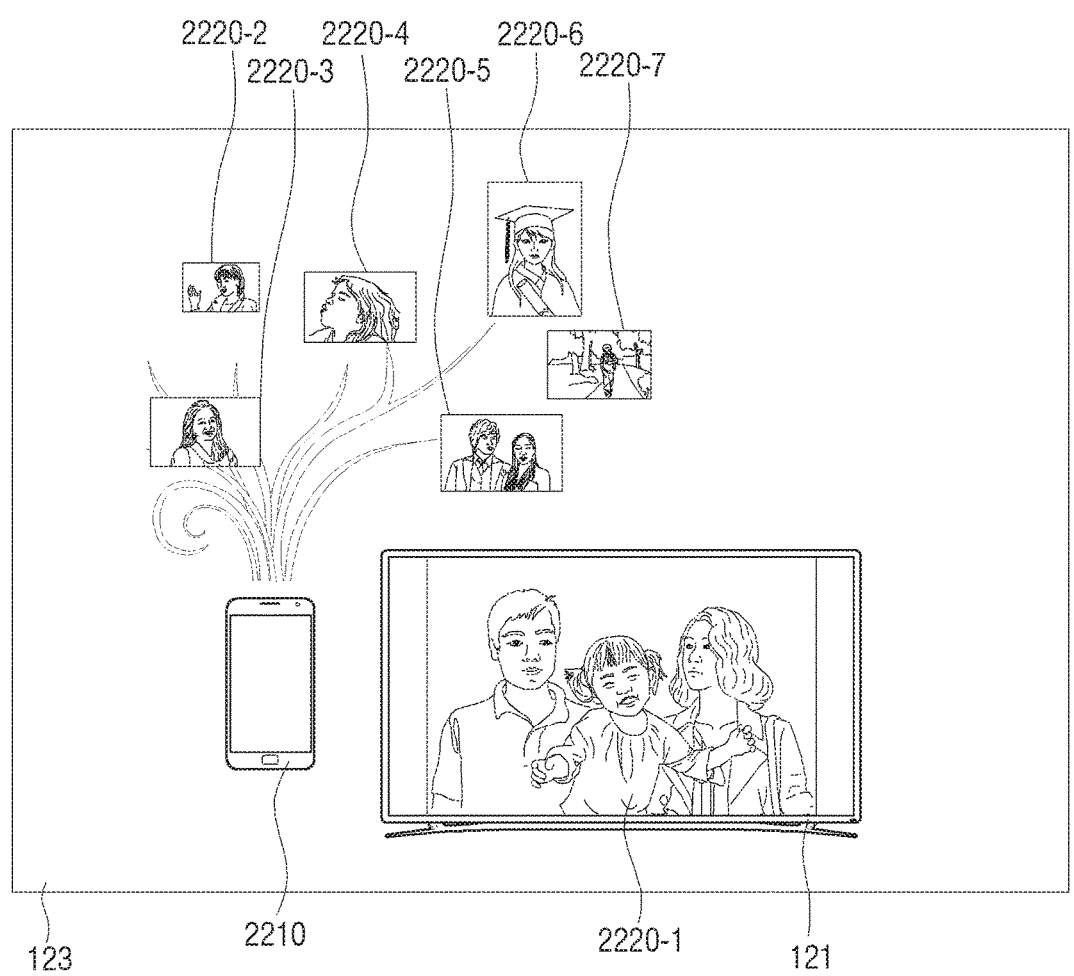

According to various embodiments of the present disclosure, as illustrated in FIG. 22C, when a user command to select the first thumbnail image 2220-1 from among the thumbnail images 2220-1 to 2220-6 of the image content stored in the first mobile terminal 1200-1 is input through the input unit 130 (e.g., in response to selection of the first thumbnail image 2220-1), the controller 140 may control the first display unit 121 to display the first thumbnail image 2220-1. The controller may control the second display unit 123 to display the first mobile terminal icon 2210-1 corresponding to the first mobile terminal 1200-1 and a plurality of thumbnail images 2220-2 to 2220-7 of an image content stored in the first mobile terminal 1200-1.

Figure 23A:
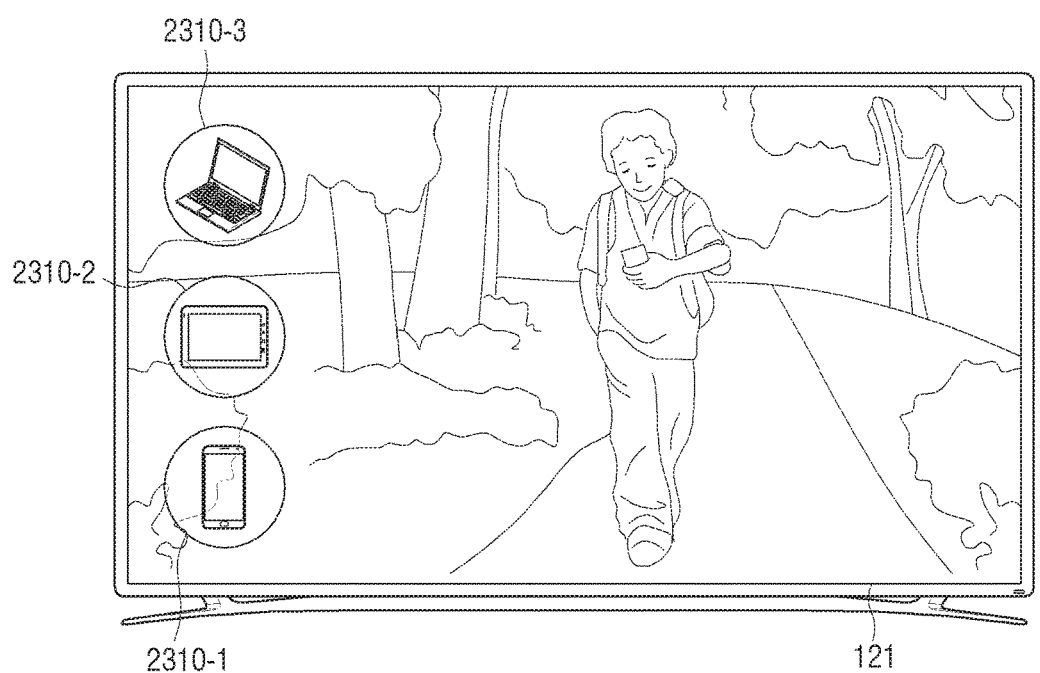

According to various embodiments of the present disclosure, as illustrated in FIG. 23A, while the display apparatus 100 display an image content through the first display unit 121, when a plurality of mobile terminals 1200-1 to 1200-3 are connected to the display apparatus 100 (e.g., in response to one or more of the plurality of mobile terminals 1200-1 to 1200-3 being connected to the display apparatus 100), the controller 140 may control the first display unit 121 to darken a displayed image content, and display a plurality of mobile terminal icons 2310-1 to 2310-3 corresponding to the plurality of mobile terminal 1200-1 to 1200-3 at the left of the first display unit 121.

Figure 23B:
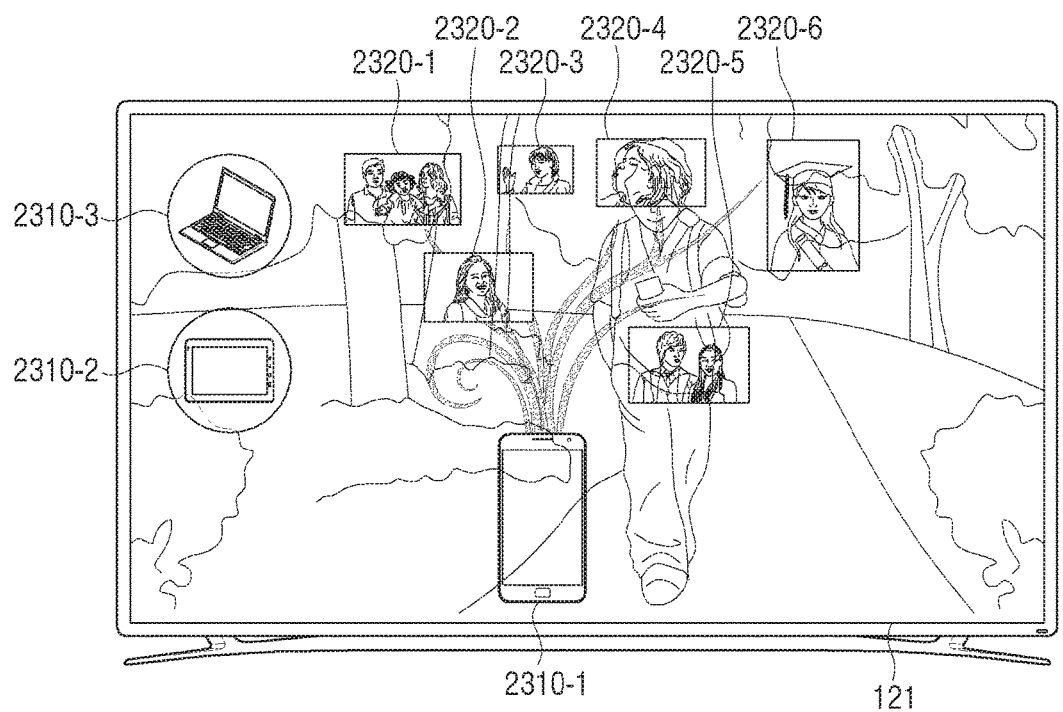

According to various embodiments of the present disclosure, a user command to select the first mobile terminal icon 2310-1 is input through the input unit 130 (e.g., in response to selection of the first mobile terminal icon 2310-1), the controller 140 may control the communicator 160 to transmit to the first mobile terminal 1200-1 a request signal requesting image content information, and receive image content information (such as thumbnail image information) responding to the request signal. As illustrated in FIG. 23B, the controller 140, based on the received image content may control the first display unit 121 to reduce and display the first mobile terminal icon 2310-1, and display the thumbnail image 2320-1 to 2320-6 of the image content stored in the first mobile terminal 1200-1 corresponding to the first mobile terminal icon 2310-1. According to various embodiments of the present disclosure, the controller 140 may control the first display unit 121 to enlarge and display the first mobile terminal 2310.

Figure 23C:
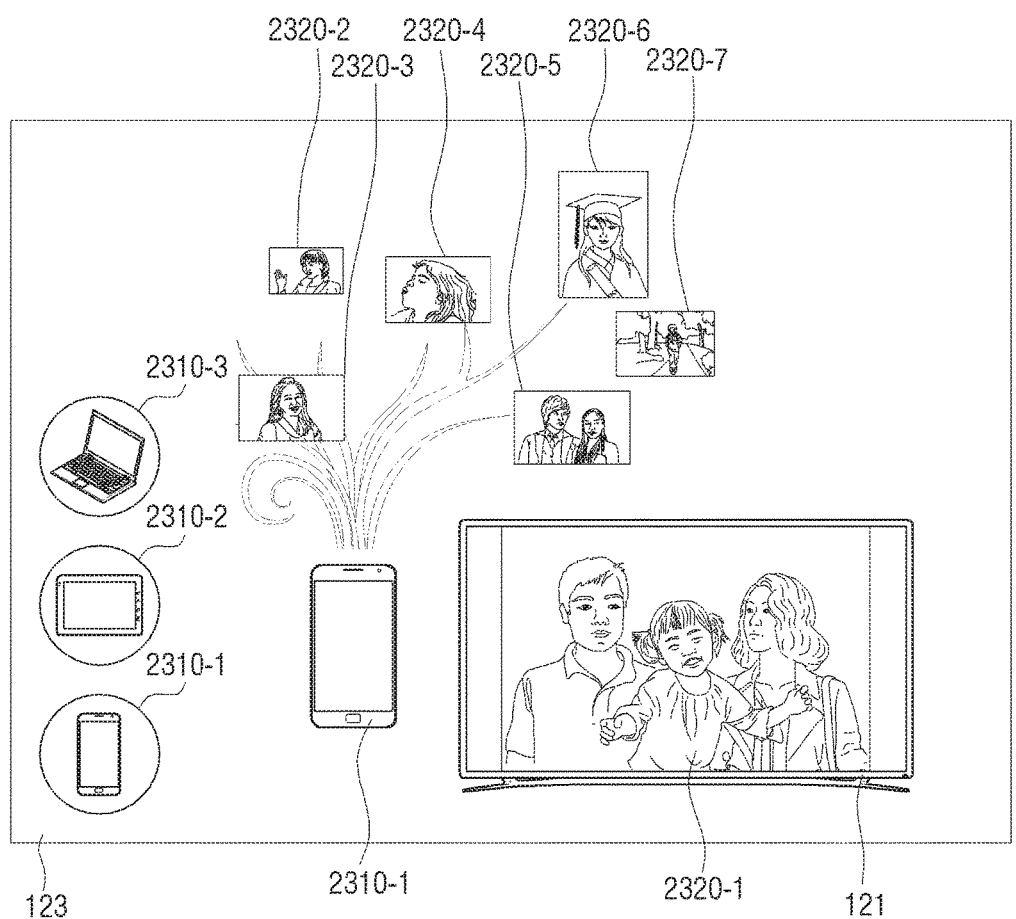

According to various embodiments of the present disclosure, as illustrated in FIG. 23C, when a user command to select the first thumbnail image 2320-1 from among the thumbnail images 2320-1 to 2320-6 of the image content stored in the first mobile terminal 1200-1 is input through the input unit 130 (e.g., in response to selection of the first thumbnail image 2320-1), the controller 140 may control the first display unit 121 to display the first thumbnail image 2320-1. The controller may control the second display unit 123 to display the first mobile terminal icon 2310-1 corresponding to the first mobile terminal 1200-1 and a plurality of thumbnail images 2320-2 to 2320-7 of an image content stored in the first mobile terminal 1200-1.

In other words, as described above, an object for controlling the display apparatus 100 may be provided to the user in the standby mode through various methods besides a second display unit using a projector apparatus.

According to various embodiments of the present disclosure as described above, even when a display apparatus keeps a standby mode, a user may easily and conveniently perform a function of the display apparatus by using an object displayed in an area of a display unit. In addition, the object may be provided to a detected user to provide a user-customized service.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

A method of controlling a display apparatus according to the above-mentioned various embodiments may be realized as a program and then provided to the display apparatus. The program including the method of controlling the display apparatus may be provided through a non-transitory computer-readable medium.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a display apparatus, the method comprising:
   connecting communication with a mobile terminal while a display does not provide information;
   activating, in response to the connection of communication with the mobile terminal while the display does not provide information, a first area of the display to display thumbnail images of the plurality of content stored in the mobile terminal;
   displaying the thumbnail images on the first area of the display while a second area of the display does not provide information;
   selecting one of the thumbnail images based on a user input; and
   displaying, in response to the selecting of one of the thumbnail images, a content corresponding to the selected thumbnail image on the second area of the display.

2. The method of claim 1, wherein the display comprises:
   a first display; and
   a second display configured to display an image outside the first display,
   wherein in response to the connection of communication with the mobile terminal, the second display is activated to display the thumbnail images on the second display.

3. The method of claim 2, wherein the display apparatus comprises:
   a main processor; and
   a sub processor configured to display the thumbnail images,
   wherein in response to the connection of communication with the mobile terminal while the display does not provide information, the sub processor is activated to display the thumbnail images on the second display.

4. The method of claim 3, wherein in response to the selecting of one of the thumbnail images, the main processor is configured to be activated and control the first display in order to display the content corresponding to the selected thumbnail image.

5. The method of claim 2, further comprising:
   displaying an object for controlling the connected mobile terminal on the second display.

6. The method of claim 2, further comprising:
   displaying, when the display apparatus stores reserved viewing information and in response to arrival of a reserved viewing time included in the stored reserved viewing information, an object showing reserved viewing on the second display.

7. The method of claim 2, wherein the second display is configured to display an image outside the first display through a projector apparatus.

8. The method of claim 1, further comprising:
   determining whether a user registered in the display apparatus is detected,
   wherein the displaying of the thumbnail images comprises:
   acquiring user information of the detected user; and
   displaying at least one object based on the acquired user information.

9. The method of claim 8, wherein the determining of whether a user registered in the display apparatus is detected comprises:
   detecting one or more of a face of the user, a fingerprint of the user, and an iris of the user; and
   determining whether the detected one or more of the face of the user, the fingerprint of the user, and the iris of user matches user identification information registered for a user registered with the display apparatus.

10. The method of claim 9, wherein the user information comprises at least one of preferred channel information, reserved viewing information, content use information using an external apparatus, recommendation content information, or social network service (SNS) information.

11. The method of claim 9, wherein the displaying of the at least one object comprises:
    determining whether a message corresponding to the detected user is stored; and
    displaying, when the message corresponding to the detected user is stored, an object corresponding to the message,
    wherein in response to the selecting of one of the at least one object corresponding to the message, the display apparatus is controlled to play the message.

12. A display apparatus comprising:
    a communicator configured to perform communication with a mobile terminal;
    a display configured to display an image;
    an input receiver configured to receive a user command; and
    a processor configured to:
    activate, in response to connection of communication with the mobile terminal while the display does not provide information, a first area of the display to display thumbnail images of the plurality of content stored in the mobile terminal,
    display the thumbnail images on the first area of the display while a second area of the display does not provide information, select one of the thumbnail images based on a user input through the input receiver, and display, in response to the selection of one of the thumbnail images through the input receiver, a content corresponding to the selected thumbnail image on the second area of the display.

13. The display apparatus of claim 12, wherein the display comprises:

a first display; and a second display configured to display an image outside the first display, wherein in response to the connection of communication with the mobile terminal, the processor is further configured to control the second display to be activated to display the thumbnail images on the second display.

14. The display apparatus of claim 13, wherein the processor comprises:

a main processor; and a sub processor configured to display the thumbnail images, wherein in response to the connection of communication with the mobile terminal while the display does not provide information, the sub processor is activated and controls the second display to display the thumbnail images.

15. The display apparatus of claim 14, wherein in response to the selection of one of the thumbnail images, the main processor is configured to be activated and control the first display to display a content corresponding to the selected thumbnail image.

16. The display apparatus of claim 13, wherein the processor is further configured to control the second display to display an object for controlling the connected mobile terminal.

17. The display apparatus of claim 13, further comprising:

a memory configured to store reserved viewing information, wherein in response to arrival of a reserved viewing time included in the storage reserved viewing information, the processor is further configured to control the second display to display an object showing reserved viewing.

18. The display apparatus of claim 13, wherein the second display is configured to display an image outside the first display through a projector apparatus.

19. The display apparatus of claim 12, further comprising:

a sensor configured to detect a user; and a memory configured to store user information, wherein the processor is further configured to:

determine whether a user registered in the display apparatus is detected, acquire user information corresponding to the detected user through the memory, and control the second display to display at least one object based on the acquired user information.

20. The display apparatus of claim 19, wherein the sensor is configured to detect one or more of a face of the user, a fingerprint of the user, and an iris of the user, and wherein the processor is further configured to determine whether the detected one or more of the face of the user, the fingerprint of the user, and the iris of user matches user identification information registered for a user registered with the display apparatus.

* * * * *